United States Patent [19]

Makus

[11] Patent Number: 5,182,709

[45] Date of Patent: Jan. 26, 1993

[54] SYSTEM FOR PARSING MULTIDIMENSIONAL AND MULTIDIRECTIONAL TEXT INTO ENCODED UNITS AND STORING EACH ENCODED UNIT AS A SEPARATE DATA STRUCTURE

[75] Inventor: Peter M. Makus, Methuen, Mass.

[73] Assignee: Wang Laboratories, Inc., Lowell, Mass.

[21] Appl. No.: 488,528

[22] Filed: Feb. 28, 1990

Related U.S. Application Data

[63] Continuation of Ser. No. 208,815, Jun. 16, 1988, abandoned, which is a continuation of Ser. No. 879,729, Jun. 27, 1986, abandoned, which is a continuation-in-part of Ser. No. 846,667, Mar. 31, 1986, abandoned.

[51] Int. Cl.⁵ .................. G06F 3/023; G06F 3/14
[52] U.S. Cl. .................. 364/419; 395/146; 395/147; 400/109; 400/110; 400/111; 364/225.6; 364/225.8; 364/DIG. 1
[58] Field of Search .......... 364/419; 400/109, 110, 400/111; 395/146, 147

[56] References Cited

U.S. PATENT DOCUMENTS

3,927,752 12/1975 Jones et al. .................. 400/109
4,124,843 11/1978 Bramson et al. .................. 340/711

(List continued on next page.)

FOREIGN PATENT DOCUMENTS

44854/79 3/1979 Australia.

OTHER PUBLICATIONS

IBM Technical Disclosure Bulletin, vol. 27, No. 10B, Mar. 1985, "Implicit Object Definition in a Multiple Data Editor".
R. G. Bluethman, "Formatter for Formula Output", IBM Technical Disclosure Bulletin, vol. 26, No. 12, May, 1984, pp. 6391-6394.
R. G. Bluethman, "Method for Inputting Formulas in a Word Processing System," IBM Disclosure, vol. 26, No. 12, May, 1984, pp. 6387-6390.
"Full Page Overlay Technique for Half Indexing and Overstrike," IBM Disclosure, vol. 30, No. 3, Aug. 1987, p. 1101.

Primary Examiner—Thomas C. Lee
Assistant Examiner—Paul Harrity
Attorney, Agent, or Firm—Michael H. Shanahan

[57] ABSTRACT

A method and apparatus editing and creating multidirectional or multidimensional text includes an editor responsive to keystrokes representing text characters and editing commands for generating a string of codes defining a text and a parser responsive to operation of the editor for reading the codes of the string and parsing the codes into encoded units. Each encoded unit is made up of a group of codes defining a group of characters that are positioned in an expression as a unit and the system further generates a unit structure for each encoded unit. Each unit structure contains information defining a visual representation of the corresponding encoded unit. The parser is responsive to operation of the editor for reading the unit structures and corresponding codes of the string and generating a visually displayable representation of the text. The codes in the string of codes representing a text include character codes representing the characters or symbols of the text, and operator codes defining properties of the text. Each unit structure includes structural identification fields containing information relating the unit structure to the group of codes in the text string comprising the corresponding encoded unit, structural pointers information fields containing information identifying other unit structures associated with the unit structure, and property identification fields containing information defining attributes which apply to the characters or symbols of the corresponding encoded unit. Each unit structure includes a location field containing information identifying the location of the corresponding encoded unit upon a page.

35 Claims, 18 Drawing Sheets

U.S. PATENT DOCUMENTS

| | | | |
|---|---|---|---|
| 4,195,338 | 3/1980 | Freeman | 395/144 |
| 4,244,657 | 1/1981 | Wasylyk | 400/109 |
| 4,310,840 | 1/1982 | Williams et al. | 340/724 |
| 4,393,463 | 7/1983 | Aiken, Jr. | 395/146 |
| 4,397,572 | 8/1983 | Barnes et al. | 400/3 |
| 4,464,730 | 8/1984 | Lawrence et al. | 364/900 |
| 4,490,789 | 12/1984 | Leban et al. | 364/419 |
| 4,498,143 | 2/1985 | Strzelecki | 364/900 |
| 4,505,602 | 3/1985 | Wong | 400/110 |
| 4,507,734 | 3/1985 | Kaldas | 364/419 |
| 4,539,653 | 9/1985 | Bartlett et al. | 364/900 |
| 4,555,699 | 11/1985 | Citron et al. | 340/707 |
| 4,559,615 | 12/1985 | Goo et al. | 364/900 |
| 4,584,574 | 4/1986 | Beausoleil | 340/744 |
| 4,603,330 | 7/1986 | Horne et al. | 340/375 |
| 4,604,712 | 8/1986 | Orrhamma | 364/900 |
| 4,606,664 | 8/1986 | Pascoe | 400/904 |
| 4,621,340 | 11/1986 | Pokorny et al. | 364/900 |
| 4,648,047 | 3/1987 | Berkland et al. | 395/112 |
| 4,660,029 | 4/1987 | Houda et al. | 340/744 |
| 4,670,842 | 6/1987 | Metwaly | 364/419 |
| 4,677,571 | 6/1987 | Riserman et al. | 395/109 |
| 4,680,578 | 7/1987 | Hornig et al. | 340/731 |
| 4,684,926 | 8/1987 | Yong-Min | 400/110 |
| 4,689,737 | 8/1987 | Grant | 364/200 |
| 4,689,764 | 8/1987 | Daniels | 364/419 |
| 4,707,801 | 11/1987 | Barnes et al. | 364/419 |
| 4,723,217 | 2/1988 | Nakano et al. | 364/518 |

| SLANT ANGLE 202 |
|---|
| SCRIPT SIZE 204 |
| SCRIPT DEPTH 206 |
| RESIZE STEP 208 |
| PROPORTIONAL SPACING FLAG 210 |
| FITCH 212 |
| DISPLAY MAGNIFICATION 214 |
| DEFAULT KEYBOARD 216 |
| KEYBOARD DISPLAY 218 |
| FRAME BOX 220 |

| BASE SIZE 302 |
|---|
| FONT 304 |
| FORMAT LINE 306 |

LBH 132

EB 128 — EUs 134: (x)(op-supscr)(2)(PRET)

FIG. 4A

$$\frac{x}{y}$$

EB 128 — EUs 134: (op-lnsplt)(p-1)(x)(PRET)(y)(PRET)

FIG. 4B

$$123^{xyz}abc$$

EB 128 — EUs 134: (1)(2)(3)(a)(op-presupscr)(op-resizonbase)...
(p- -)(x)(y)(z)(op-resizonbase)(p- +1)...
(PRET)(b)(c)

EB 128 — EUs 134: (A)(op-supscr)(i)(PRET)(op-subscr)(x)...
(op-subscr)(l)(PRET)(PRET)

FIG. 4D

$$e^{2x}y + \left(\frac{2+y}{1+x}\right)$$

EB 128 — EUs 134: (e)(op-supscr)(2)(x)(PRET)(y)(+)...
(op-resizoncntr)(p- +2)(()(op-resizoncntr)...
(p- -2)(op-lnsplt)(p- 1)(2)(+)(y)(PRET)...
(1)(+)(x)(PRET)(op-resizoncntr)(p- +2)())...
(op-resizoncntr)(p- -2)(PRET)

FIG. 4E

| Group | Field |
|---|---|
| STRUCTURE IDENTIFICATION GROUP 502 | STARTPUS 516 |
| | STARTCHAR 518 |
| | ELTLENGTH 520 |
| PROPERTY IDENTIFICATION GROUP 504 — UNIT GENERAL INFORMATION SUB-GROUP 506 | STARTLOC 522 |
| | UNITDIMS 524 |
| | EXTENDEDDIMS 526 |
| | LINESPLITNUM 528 |
| | LINESPLITLOC 530 |
| | SCRIPTDEPTH 532 |
| UNIT BEGINNING STATE SUB-GROUP 508 | BEGFONT 534 |
| | BEGFONT RESIZE FACTOR ON BASELINE 536 |
| | BEGFONT RESIZE FACTOR AROUND CENTER 538 |
| | BEGITALIC FLAG 540 |
| UNIT ENDING STATE SUB-GROUP 510 | ENDFONT 542 |
| | ENDFONT RESIZE FACTOR ON BASELINE 544 |
| | ENDFONT RESIZE FACTOR AROUND CENTER 546 |
| | ENDITALIC FLAG 548 |
| STRUCTURAL FLAGS 512 | STRUCTURAL FLAG 512 |
| STRUCTURAL POINTERS GROUP 514 | SUPERSCRIPTUNIT 550 |
| | SUBSCRIPTUNIT 552 |
| | PRESUPERSCRIPT UNIT 554 |
| | PRESUBSCRIPT UNIT 556 |
| | OVERSCRIPT UNIT 558 |
| | UNDERSCRIPT UNIT 560 |
| | LINESPLITUNIT 562 |
| | BARUNIT 564 |
| | NEXTUNIT 566 |
| | PREVUNIT 568 |

FIG. 5 — US 136

UNIT TEXTS:
- UNIT 1 = "e"
- UNIT 2 = "2x"
- UNIT 3 = "y+("
- UNIT 4 = "2+y"
- UNIT 5 = "1+x"
- UNIT 6 = ")"

ABBREVIATED SUMMARY OF CONTENTS OF USs 136

| UNIT | 1 | 2 | 3 | 4 | 5 | 6 |
|---|---|---|---|---|---|---|
| STARTPOS 516 | — | 3 | 6 | 15 | 19 | 23 |
| STARTCHAR 518 | — | 3 | 6 | 15 | 19 | 25 |
| ELTLENGTH 520 | — | 3 | 5 | 4 | 4 | 4 |
| STARTLOC 522 | | | | | | |
| X | 0 | 7 | 14 | 37 | 38.5 | 57 |
| Y | -15 | -8 | -15 | -10 | -20 | -15 |
| UNITDIMS 524 | | | | | | |
| MIN X0 | 0 | 0 | 0 | 0 | 0 | 0 |
| MAX X | 7 | 7 | 23 | 20 | 17 | 10 |
| MIN Y | 0 | 0 | -5 | 0 | 0 | -5 |
| MAX Y | 10 | 5 | 15 | 10 | 10 | 15 |
| LINSPLITNUM 5280 | 0 | 0 | _ | 0 | 0 | 0 |
| RESIZEs 538/546 | 0 | 0 | 2 | 0 | 0 | _ |
| STRUCTURAL FLAGS 512 | NONE | SCR | PRED | INSPLT | INSPLT | PRED |
| POINTERS 514 | | | | | | |
| NEXT 566 | 3 | NONE | 6 | NONE | NONE | NONE |
| PREV 568 | NONE | _ | _ | 3 | 3 | 3 |
| SCRIPT 550 | 2 | NONE | NONE | NONE | NONE | NONE |
| SPLIT LINE 562 | NONE | NONE | 4 | NONE | NONE | NONE |

NOTE: POINTERS INDICATE EITHER LOCATIONS BY POSITION NUMBER OF TERM IN EB 128 OR TO ASSOCIATED UNIT STRUCTURES BY UNIT NUMBER

FIG. 7

| | |
|---|---|
| PROFILES 802 | SYSTEM PROFILE POINTER 824<br>SYSTEM DOCUMENT PROFILE POINTER 825<br>DOCUMENT PROFILE POINTER 826 |
| FONT INFORMATION 804 | FONT MAP 827<br>KEYBOARD 828<br>CHARACTER PROPERTIES 829<br>FONT IDENTIFICATION 830 |
| EQUATION IDENTIFICATION 806 | EQUATION NAME 831<br>EQUATION FILE NAME 832<br>CHARTER FILE NAME 833<br>EQUATION EXTENT 834<br>THIS EQUATION 835 |
| CURRENT SCREEN 808 | SCREEN DATA POINTERS 836<br>CURRENT SCREEN POINTER 837<br>NUMBER OF LINES 838<br>LINE DATA POINTERS 839<br>CURRENT LINE INDEX 840<br>AVAILABLE UNIT 841<br>UNIT DATA POINTERS 842<br>CURRENT UNIT DATA POINTER 843 |
| CURRENT OPERATIONAL STATE 810 | CURRENT KEYBOARD 844<br>CURRENT KEYSTROKE 845<br>PREVIOUS KEYSTROKE 846<br>AUTOMATA INSTATE 847<br>AUTOMATA INPUT 848<br>AUTOMATA FUNCTION 849<br>AUTOMATA FUNCTION RETURN 850<br>CURRENT USER OPERATION 851 |
| DISPLAY STATE 812 | CURRENT CHARACTER BUFFER POSITION 852<br>CURRENT CHARACTER BUFFER BEGINNING 853<br>CURRENT CHARACTER BUFFER END 854<br>CURRENT BEGINNING OF TEXT 855<br>CURRENT END OF TEXT 856<br>END OF UNUSED BUFFER 857<br>CURRENT BUFFER POSITION 858<br>CURRENT CHARACTER 859<br>CURRENT CHARACTER ATTRIBUTE 860<br>CHARACTER POSITION 861<br>OVERSTRUCK CHARACTER 862<br>OVERSTRUCK CHARACTER FLAG 863<br>CHARACTER IN UNIT FLAG 864<br>CURRENT CURSOR POSITION 865 |

FIG. 8A

| | |
|---|---|
| CURRENT ENVIRONMENT 814 | CURRENT FONT ID 866<br>CURRENT SIZE ON BASELINE 867<br>CURRENT SIZE AROUND CENTER 868<br>CURRENT ITALIC STATE 869<br>CURRENT SCRIPT DEPTH 870 |
| CURRENT FUNCTIONAL STATE 816 | INSERT LEVEL 871<br>INSERT POINTS POINTERS 872<br>BEGIN DELIMIT 873<br>END DELIMIT 874<br>BEGIN DELIMIT END POSITION 875<br>END DELIMIT END POSITION 876 |
| LOCATION VALUES 818 | CHARACTER TO POSITION TO 877<br>LOCATE TYPE 878<br>REQUIRED REFRESH 879 |
| PARAMETERS 820 | CURRENT VECTORS 880<br>CURRENT CHARACTER BOX 881<br>CURRENT BASE BOX 882 |
| SCREEN DIMENSIONS 822 | SCREEN EXTENTS 883<br>FORMAT LINE HEIGHT 884<br>FORMAT CHARACTER WIDTH 885<br>FORMAT SCREEN Y POSITION 886<br>INTERLINE SPACING 887 |
| UNIT INFORMATION 887 | LOCATION OF EARLIEST OVERSTRIKE UNIT 888<br>EQUATION BASE CHARACTER DECENDER 889<br>UNFINISHED LINE SPLIT ON LAST LINE 890<br>DEFINED ALIGNMENT STEP NUMERATOR 891<br>DEFINED ALIGNMENT STEP DENOMINATOR 892<br>APPEND BLOB DIMENSIONS 893<br>APPEND BLOB DIMENSIONS 894 |

FIG. 8B

```
START POSITION 902
START UNIT OF LINE POINTER 904
START LOCATION 906
LINE DIMENSIONS 908
FONT 910
FONT RESIZE ON BASELINE 912
FONT RESIZE AROUND CENTER 914
ITALIC FLAG 916
FORMAT LINE 918
```

FIG. 9 - LINE DATA STRUCTURE 162

```
START POSITION 1002
SCREEN TOP 1004
START LOCATION 1006
CURRENT LOCATION 1008
FONT 1010
FONT RESIZE ON BASELINE 1012
FONT RESIZE AROUND CENTER 1014
ITALIC FLAG 1016
FORMAT LINE POINTER 1018
```

FIG. 10 - SCREEN DATA STRUCTURE 164

```
LOCATION FROM END 1102
POSITION OF BREAK 1104
PRESERVATION POSITION 1106
INSERT TYPE 1108
SAVE RESIZE ON BASELINE 1110
SAVE RESIZE AROUND CENTER 1112
BEGINNING OF TEXT 1113
PRELOCATION LINE HEIGHT 1114
POST LOCATION LINE HEIGHT 1116
PRELOCATION SUBLINE HEIGHT 1117
POST LOCATION SUBLINE HEIGHT 1118
NUMBER PRESERVED LINESPLIT RETURNS 1119
MINOR LAST LINE LINESPLIT 1120
```

FIG. 11 INERT/HIDE DATA ARRAY 166

SYSTEM FOR PARSING MULTIDIMENSIONAL AND MULTIDIRECTIONAL TEXT INTO ENCODED UNITS AND STORING EACH ENCODED UNIT AS A SEPARATE DATA STRUCTURE

This is a continuation of co-pending application Ser. No. 07/208,815 filed on Jun. 16, 1988, now abandoned, which is a continuation of Ser. No. 06/879,729 filed on Jun. 27, 1986 now abandoned, which is a continuation-in-part of Ser. No. 06/846,667 filed Mar. 31, 1986, now abandoned.

CROSS REFERENCES TO RELATED APPLICATIONS

The present patent application is related to the following U.S. patent applications:

| U.S.S.N. | Filing Date |
|----------|-------------|
| 846,667  | 3/31/86     |
| 879,700  | 8/8/86      |
| 879,729  | 6/27/86     |
| 880,607  | 10/14/86    |
| 122,615  | 11/19/87    |

All of the above patent applications have been abandoned.

BACKGROUND OF THE INVENTION

1. Field of the Invention

The present invention relates to text editors and, more particularly, to a text editor allowing word processing like operation with multidimensional or multidirectional text, such as text comprised of scientific and technical characters and symbols, including those used in the mathematical, physical and chemical fields, and the text of non-European languages.

2. Discussion of the Prior Art

The most common means for presenting, communicating and storing information is through visual representations of the information, for example, printed texts and images and, more recently, through equivalent electronic displays such as CRT screens connected from computer systems. In recent years, the facility with which texts and graphics images can be created and edited and printed, communicated and stored has been greatly facilitated by various word processing and graphics editor programs operating upon computers system. Both word and graphics processing systems have become well known and are readily and commonly available to the extent that practically any reasonable user requirements of system, features, operation and cost can be readily met.

A recurring problem with such systems, however, is that each type of system, that is, word processing or graphics processing, can operate only within a narrow range of information type and presentation. For example, word processing systems generally can operate only with standard text of the forms generally used in the European languages, such as English, that is, standard alpha-numeric characters of uniform, standard sizes and shapes arranged on a page in standard lines and columns to form lines and paragraphs. Within this constraint, however, the word processing programs are generally quite efficient and easy to use. Graphics programs, in contrast, deal with symbols and figures of variable shapes and sizes and their visual appearance and location upon a page. Such programs provide a means by which a user may define shapes and their sizes and locations upon the page and may place, move and change such shapes but are relatively more difficult for a user to learn and use.

This separation between word processing and graphics processing programs arises because the word processing data structures and data structure editors which are best adapted for creating and editing standard text are incompatible with the graphics data structures and data structure editors which best adapted to creating, editing and representing graphics symbols and figures. As described above, word processors are designed to operated with simple strings of standard, uniform elements arranged within a fixed array of possible locations on a page while graphics processors deal with variable lines and shapes which may be located anywhere on a page.

There is an area of information processing and presentation, however, which is neither strictly word processing nor strictly graphics processing and which is not adequately satisfied by systems of either of the types described above. This area of information processing and presentation may be generally defined as being comprised of those forms of text which are either multidimensional or multidirectional, or both. A primary and commonly seen example of such text is scientific text and symbols in the traditionally accepted forms, for example, equations, expressions or diagrams as used in the mathematical, chemical or physical fields and using the symbols and terms used in these fields. Other example, as previously described, include those languages wherein the text, that is, the positioning of the characters and symbols on the page and their logical and physical relationships to one another do not follow the one dimensional, monodirectional conventions of, for example, English, German, French or Italian. Examples such such foreign language texts may include the branches of the Indic language groups, such as used in India, and the texts of such countries as Sri Lanka, Burma, Thailand, and such languages as Chinese, Japanese and the various branches of the Arabic languages.

It is apparent from a study of a page of a text of this nature, for example, a page of scientific text, that the text is comprised of logical groupings of one or more character or symbol elements arranged in a meaningful manner relative to one another. It is further apparent, however, that the characters and symbols are of variable shape and size and that their locations relative to one another are also variable. It is yet further apparent that the geometric area occupied by a group of characters or symbols, and the location of that area on a page, will be determined by the structure of the group of characters or symbols and of the other groups of characters or symbols on the page, in particular the preceding groups on the page and perhaps the following groups on the same line.

In the prior art, the editors for such texts have generally fallen into one of the two types described before, that is, the word processing type or the graphics processing type. In the word processing type of text editor of the prior art, the editors have most frequently been adaptations of simple word processors, with some addition of characters and symbols to the standard character sets and formatting commands. This type of word processing text editor has been unsatisfactory because of the limited powers of expression available therefrom.

That is, the characters and symbols are forced into the standard character sizes and proportions and may occupy only the positions generally provided in word processing, for example, simple superscripts and subscripts. Some word processing type text editors have attempted to provide a wider range of characters, symbols and expression, but have been markedly more difficult to use and generally cannot provide a representation of the appearance of the final page to the user during the creation and editing operations. That is, the wider range of expression is achieved by embedding control codes in the text during text creation and editing, but the user must actually print the page to have a representation of the true appearance of the page.

While graphics processing systems are much more flexible than word processing type systems in terms of the range of characters, symbols and expressions which may be created and presented, they are generally much more difficult to use, primarily because of their greater flexibility. In effect, the user must draw each individual character, symbol or line individually, or at least create a template of each type to appear in an expression, and then must position each character, symbol or line individually on the page. In terms of text editing, this approach is little better than having a template of characters and symbols, a piece of paper and a pen.

As will be described in the following, the text editor of the present invention overcomes these and other problems of the prior art by providing a text editor having a word-processor-like document creation and editing functionality together with a graphics-like visual representation suitable for creating and editing text and expressions which are multidimensional or multidirectional, or both, in their traditionally accepted forms, for example, equations, expressions or diagrams as used in the mathematical, chemical or physical fields and using the characters, symbols and terms commonly accepted and used in these fields.

It is therefore an object of the present invention to provide an improved text editing system for use with text which is multidimensional or multidirectional, or both.

It is a further object of the present invention to provide an improved text editing system for multidimensional or multidirectional text which provides a word-processor-like document creation and editing functionality.

It is another object of the present invention to provide an improved text processing system for multidimensional or multidirectional text which provides a visual representation suitable for creating and editing such texts and expressions in their traditionally accepted forms.

SUMMARY OF THE INVENTION

The present invention provides a method and apparatus editing and creating multidirectional or multidimensional text wherein the system includes an input receiver responsive to keystrokes representing text characters and editing commands for generating a string of codes defining a text and a parser responsive to operation of the input receiver for reading the codes of the string and parsing the codes into encoded units. Each encoded unit is comprised of a group of codes defining a group of one or more characters that are positioned in an expression as a unit and the system further generates for each encoded unit a unit structure wherein each unit structure contains information defining a visual representation of the corresponding encoded unit. In a further aspect, the parser means is further responsive to operation of the editor means for reading the unit structures and corresponding codes of the string and generating a visually displayable representation of the text.

The codes in the string of codes representing a text include character codes representing the characters or symbols of the text, and operator codes defining properties of the text. In a first aspect of the invention, the operator codes comprise prefix operators operating upon a following character, group of characters or unit or group of units, postfix operators operating upon a preceding character, group of characters or unit or group of units, and infix operators operating concurrently upon two characters, groups of characters or units or group of units. In another aspect of the invention, the operator codes comprise structural operators defining organizational relationships between the units of the text and environmental operators defining attributes of the characters and symbols of the text.

In this respect, the structural operators comprise unit operators defining spatial relationships between units of the text, wherein the structural unit operators comprise initiating operators initiating corresponding units defined by the operators and corresponding terminating operators terminating the units initiated by the initiating operators.

In further aspects of the structural operators, the structural operators comprise associative operators defining an association between characters and symbols, wherein an associative operator operates to associate a character or symbol with another character or symbol to become a part of the definition of that other character or symbol.

The environmental operators comprise both attribute switching operators which operate to turn on or turn off a corresponding attribute and, in another aspect, attribute modification operators which operate to modify a continuously existing attribute.

In further aspects of the unit structures, each unit structure further comprises structural identification fields containing information relating the unit structure to the group of codes in the text string comprising the corresponding encoded unit, structural pointers information fields containing information identifying other unit structures associated with the unit structure, and property identification fields containing information defining attributes which apply to the characters or symbols of the corresponding encoded unit. Finally, each unit structure further comprises a location field containing information identifying the location of the corresponding encoded unit upon a page.

Other features, objects and advantages of the present invention will be understood by those of ordinary skill in the art after reading the following descriptions of a present implementation of the present invention, and after examining the drawing, wherein:

BRIEF DESCRIPTION OF THE DRAWING

FIG. 2 is a diagrammic representation of a document profile of the present text editor;

FIG. 3 is a diagrammic representation of an encoded buffer header of the present text editor;

FIGS. 4A, 4B, 4C, 4D, and 4E are diagrammic representation of encoded units for exemplary scientific expressions;

FIG. 5 is a diagrammic representation of a unit structure of the present text editor.

FIG. 7 presents a summary of the data stored in the unit structures for an exemplary parsed expression.

FIGS. 8A and 8B are a system status data structure containing information relating to present operations of the system;

FIG. 9 is a line data structure containing information relating to a line presently being operating within;

FIG. 10 is a screen data structure containing information relating to a screen;

FIG. 11 is an insert/hide data structure containing information relating to present insert and hide operations;

DETAILED DESCRIPTION

Figure 1:
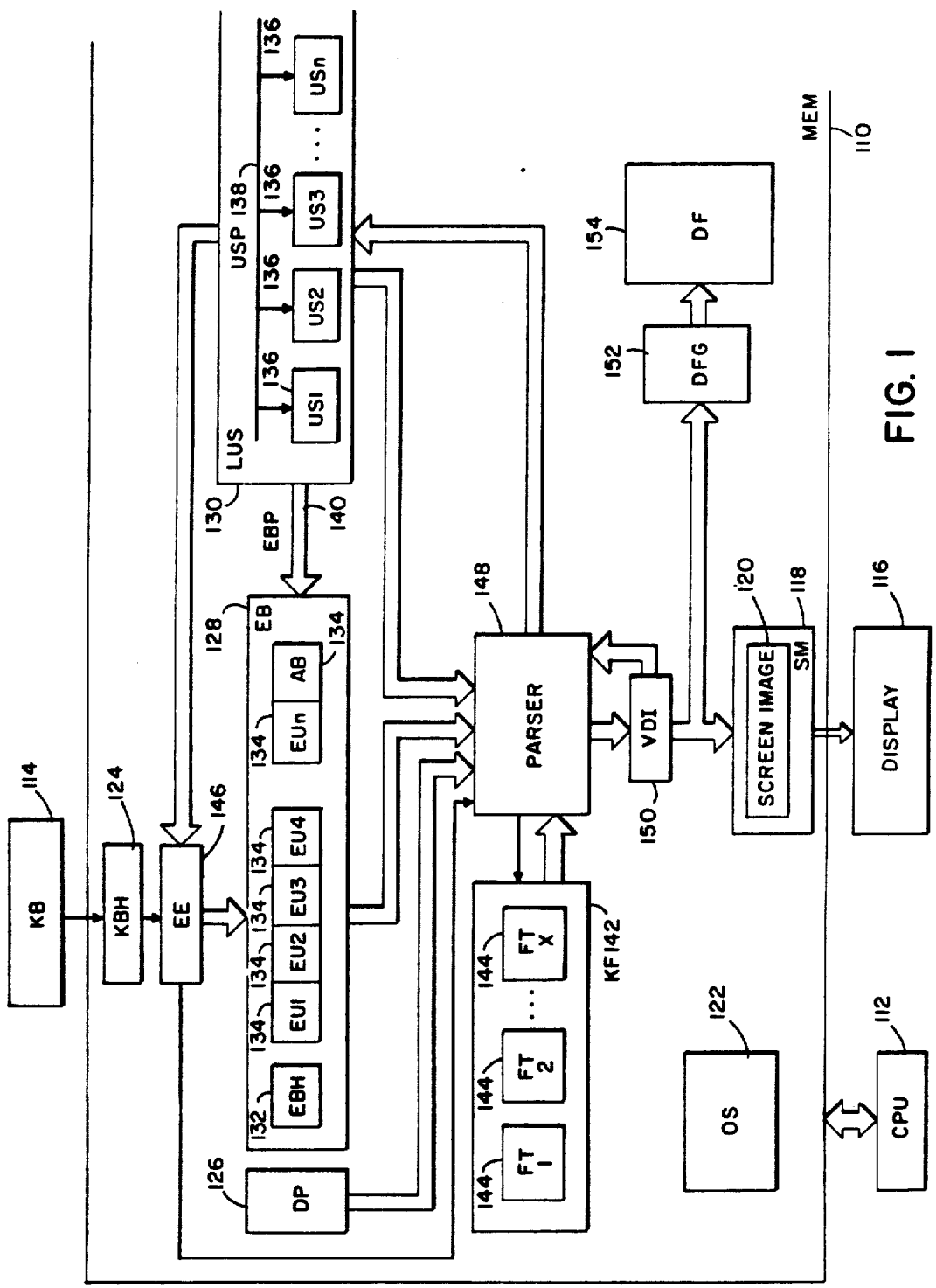
FIG. 1 is a block diagram of a computer system incorporating the present invention.

The following description presents the structure and operation of a computer system incorporating a presently preferred embodiment of the present invention. In the following description, certain terms and concepts necessary to describe the present invention will be described first. Then the overall structure and operation of the system will be presented at a block diagram level, followed by further detailed descriptions of certain fundamental features and principles of operation of the invention.

Certain reference number and drawing conventions are used throughout the following descriptions to enhance the clarity of presentation. First, interconnections between related portions of the system may be indicated by either common names or references or by drawn interconnection representations. Secondly, reference numbers referring to system elements appearing in the figures are assigned to their corresponding elements the first time the elements appear in the description. The reference number assigned to a particular element will then be used throughout the remainder of the description or figures whenever that element is referred to or shown in a figure. Finally, all reference numbers are comprised of either three or four digits. The two least significant (rightmost) digits identify a particular element appearing in a particular drawing and the most significant (leftmost) digit or digits refer to the figure in which that element first appears. For example, a particular system element may first appear as the 12th element in FIG. 1; that element would then be referred to by the reference number 112 and will be so referred to throughout the remainder of the description and figures; similarly, the first element in FIG. 12 would be referred to by the reference number 1202 throughout the present description.

A. GENERAL DESCRIPTION (FIG. 1)

The following will first describe the present text editor at a general level, including a definition of certain terms and concepts appearing herein and an overall description of system operation. Certain elements and operations of the system and editor will then be described in further detail as required to describe the present editor to one of ordinary skill in the art.

A. 1 DEFINITIONS OF TERMS AND CONCEPTS

As previously described, the purpose of the present text editing system is to generate document pages containing text which may be either multidimensional or multidirectional, or both. A primary and commonly seen example of such text is scientific text and symbols in the traditionally accepted forms, for example, equations, expressions or diagrams as used in the mathematical, chemical or physical fields and using the symbols and terms used in these fields. Other example, as previously described, include those languages wherein the text, that is, the positioning of the characters and symbols on the page and their logical and physical relationships to one another do not follow the one dimensional, monodirectional conventions of, for example, English, German, French or Italian. Examples such as foreign language texts may include the branches of the Indic language groups, such as used in India, Sri Lanka, Burma, Thailand, and such languages as Chinese, Japanese and the various branches of the Arabic languages. Because of familiarity to the usual reader, the following descriptions and discussions of the present editor will use scientific text for illustrative purposes; it is to be understood, however, that the present editor may use any arbitrary font or set of characters and symbols, including those of the languages mentioned above and any other definable set of characters and symbols. In terms of these texts, a document may be considered as being comprised of one or more pages wherein each page is comprised of one or more lines of text wherein a line is a generally linearily oriented array of related symbols or characters. The present implementation of the text editor presented herein defines a document to contain one page; other implementations, however, may accommodate documents of more than one page in the manner well known in the prior word processing art.

The present text editor is intended to be similar in general use to present computer based word processing systems. That is, the text resides in computer memory as it is entered and edited and is visually displayed to the user through a display device, such as a CRT, during this process. For this reason, a page may further be considered as comprised of one or more "screens" wherein a screen is a portion of a page which is presently being operated upon and displayed to the user.

For the purposes of the following descriptions, there are three types of "characters" which may appear in a text. Firstly, a "character" is defined to be any symbol or letter which is to appear in the final, printed document, that is, on a printed page. It should be noted that this concept of "character" includes "null" characters, that is, a space which would be occupied by a character but which contains no actual printed or displayed symbol or character.

A "control character" is a character used, for example, in formatting the page and which may appear to the user during creation and editing of the document but which will generally not appear on a final, printed page.

Examples of control characters include tabs and pseudo-returns.

Finally, "diacritic characters" or marks are characters or symbols attached to or associated with other characters and which serve to change or define the meaning of the characters with which they appear. Diacritic characters, or marks, may appear both over and under a given character or characters. For example, in languages diacritic marks are used to indicate or change the pronunciation of a letter, for example, a ' or an umlaut. In the sciences, diacritic characters change the nature of or define an aspect of a character with which they are associated. For example, in set theory a character with a bar over it represents the complement of the set represented by the character while in vector algebra a character with a bar over it represents a vector. In further example, in physics or math a character with a dot over it represents the first derivative of the function represented by the character and a character with two dots over it, similar to an umlaut, represents the second derivative of the function.

"Strikethrough" characters, that is, characters having another character or symbol imposed upon or through them are also allowed and, as described below, are similar to diacritic characters in their definition and use. Examples of strikethrough characters include letters with a slanting line, such as a "/", through them or letters with "x" imposed upon them.

A "baseline" is the usually horizontal line along which the main portions of one or more characters are located, for example, the characters of this line of text are located along a horizontal line defined by the bottoms of the characters, that is, the lowest parts of the main body of the characters. In this regard it should be noted that certain characters, such as "y" or "g" include "descenders" which extend below the baseline. While a baseline may generally refer to a line running across an entire page, and to which a page spanning line of words or text are oriented, there may also be local baselines. For example, a character having a string of one or more characters in a superscript may be located on a general baseline while the characters in the superscript are located upon a baseline which is local within the superscript. It should be noted that baselines may be oriented as required for a given text, that is, and for example, baselines may be defined as vertical rather than horizontal and lines as running from right to left or top to bottom or bottom to top, rather than from left to right along horizontal lines as is usually seen in scientific text.

Strings of characters may appear in association with another character or characters but located along a baseline above or below, before or behind, the character with which they are located. These characters appearing in association with, but not on the same baseline as, the parent character are referred to generally as "scripts" and the positions in which they may appear relative to the parent character or characters are referred to as the "script positions". There are six defined script positions, overscript, underscript, presuperscript, presubscript, superscript and subscript. With respect to a parent character, these positions are, respectively, directly above, directly below, before and above, before and below, after and above, and after and below, a parent character.

The above has described the characters of a text as being located relative to one another along baselines, in either the general sense or the local sense, that is, as in local baselines in script positions. There is yet another case of locating characters relative to one another by lines and that is the case of "split lines". In split lines, a base line is split into a group of two or more parallel lines, each parallel to the original baseline, with the group of lines being centered on the original baseline and one or more characters appearing on each of the split lines.

Finally, a special case of a symbols appearing in scientific text, and others, are the "overbar" and the "underbar"; these symbols being neither characters nor diacritic characters. As their names imply, an overbar is a line or bar appearing over a string of one or more characters and an underbar is a line or bar appearing under a string of one or more characters.

Having described the basic elements which comprise a page of text, the logical elements and groupings of text must be next considered. It is apparent from a study of a page of text that the text is comprised of logical groupings of one or more of the above described elements arranged in a meaningful manner relative to one another, for example, along baselines. For the purposes of the following descriptions, a "unit" is defined as a string or group of characters with associated properties that must be positioned in the document as a unit, that is, as one "thing". A unit, therefore, can be, for example, a character, a script which must be located with respect to a character, or a group of one or more characters linked by an underbar or overbar. It should be noted that certain operators do not necessarily define units per se, but instead define "segments" wherein a "segment" is an ordered group of two or more units which is dimensioned and positioned relative to a common baseline. In the present implementation, line splits, for example, form segments comprised of two or more units; in this case, each line may be a unit or may be comprised of two or more units. In another example, a script may comprise a unit or, if the script is itself comprised of two or more units, may comprise a segment. An "equation" or other expression, for example, is thereby comprised of a sequence of one or more units.

It is apparent that the geometric area occupied by a unit on a page, and the location of that area on a page, will be determined by the structure of the unit and of the other units on the page, in particular the preceding units on the page and perhaps the following units on the same line. That is, a unit comprised of a base character having a subscript of ten characters and a superscript which is a mathematical expression, for example, $(1+xy)/(z-2y)$, will require a different area than a character having a simple, single character superscript. For the purposes of the present invention, and the following descriptions, there is defined a "delimitation box", that is, a rectangular unit of area having x and y dimensions extending in the positive and negative x and y directions from the reference origin for the unit which are defined by the structure of the unit appearing therein with the x and y dimensions being such as to completely contain the unit appearing therein.

While the term "string" is generally used to mean a connected sequence of, for example, characters, the term "string" has a special meaning with respect to certain aspects of the present invention and in certain portions of the following description. In these cases, the term "string" indicates a segment of text that may span, or include, one or more unit and has the property that the beginning and end of the string are on the same baseline. A script, for example, or the string of one or more characters appearing on a line of a line split, is therefore a "string" and may be delimited and operated upon as such.

Finally, the term "operator" described a process or operation that is to be performed upon or with respect to a character or string. Operators thereby describe and define the properties of the text, that is, the structural, that is, spatial and organizational, relationship of the character and symbols and units to one another and the attributes of the characters and symbols, for example, their size, whether they are in italic, and the font from which the characters and symbols are selected. Examples of operators include scripting, that is, placing a script relative to a base character, line splitting, placing diacritic characters over or under a character, overbars and underbars, and changing the size of characters in a string. In its basic form, an operator is a code indicating an operation to be performed but may have associated with it parameters further defining the operation. For example, a line split operator will have associated with it a parameter indicating the number of lines appearing in the split. While the value of a parameter may be viewed as a parameter to the associated operator, for the present purposes it may be regarded as part of the definition of the operator.

It should be noted that the appearance of an operator usually indicates the beginning of a unit, that is, delineates between a unit and the preceding and following units. For example, a script operator indicates that the next following characters are, in themselves, a unit which is located in a script position relative to the associated base unit and the end of the script similarly indicates the end of the script unit and the beginning of the next unit. It should be noted, however, that certain operators do not necesarily define the end of a unit or the beginning of a next unit. For example, diacritic and strikethrough operators define operations to be performed with respect to characters, but do not signal a break in a unit.

While an operator is begun by an operator code and possibly an associated parameter code, the operator may be terminated in any of several ways. In some cases, for example, an over- or underbar operator, the operator is terminated by a specific bar terminator operator. In other cases, the operator is terminated by another operator of the same type; for example, a resize operator, which changes the relative size of the following characters, is terminated by another resize operator which changes the characters to another relative size, for example, the original size. In yet other cases, for example, a script or the individual line units which comprise the units of a line split unit, the script or the individual sub-lines of the line split are terminated by pseudo returns, that is, returns used specifically as operators to terminate an operator. The term pseudo return is used to indicate the greater generality that this control character has over the commonly seen return control character, which usually represents only the end of a line on a page. It should be noted that, in the present implementation, the "return" in its traditional sense is not used. The "pseudo return" is used throughout and is so designated to indicate the more global power and flexibility of the "pseudo return", the traditional "return" being encompassed within the "pseudo return". In the case of the line split, each line of the split is terminated by a pseudo return and the line split operator is itself terminated by the occurrence of a number of pseudo returns equal to the number of lines in the split as defined by the line split operator's associated parameter. In this case, the terminator may be regarded as implicit operator, that is, the operator is terminated by the occurrence of a condition rather than by an explicit terminator code. In the present invention there are three classes of operator presently defined, "prefix" operators, "postfix" operators and "infix" operators. Prefix operators operate upon a single character, string or unit, occur before the thing to be operated upon, and operate from the point of occurrence to the end of the page unless otherwise terminated. An example of a prefix operator is the resize of following characters. A postfix operator again operates upon a single character, string or unit, but occurs after the thing to be operated upon and uperates back to the previously occurring unit; an example of a postfix operator is the over- or underbar terminator operator. Infix operators operate upon two characters, strings or units concurrently, usually to define a relationship between the things operated upon, and appear between the things operated upon. An example of an infix operator is the script operators, wherein the operator appears between the base character or unit and the script. The script operator defines the preceding character or unit as the base, the following character, unit or string as a script, and the script position of the script relative to the base.

The terms infix, prefix and postfix described operational characteristics of the operators with respect to the characters or symbols and the units. The operators may also be described, in terms of their effect upon the characters, symbols and unit of the text, as either structural or environmental operators. That is, a structural operators defines a spatial or organization relationship between character, symbols or units which an environmental operator defines certain attributes of the characters or symbols, such as their size, whether they are in italic, and their font.

Structural operators, by their nature, generally define the start and end of units and the relationships between units, such as, as described below, the script, linesplit and bar operators. Such operators usually occur in pairs, that is, a first operator which initiates a unit and a second operator which terminates the operator. For example, a script operator will initiate and mark the beginning of a script unit and there will be a corresponding pseudoreturn operator which terminates the script unit. In further example, a bar start operator will initiate and mark the start of a bar unit and there will be a corresponding bar end operator which terminates the bar unit.

It should be noted that, as will be described in the following descriptions of the editor, there are certain structural operators which are associative. That is, these associative structural operators do not initiate units, but relate or associate certain characters or symbols with other characters or symbols, effectively combining the characters or symbols into what are structurally single characters of symbols. An example of such operators is seen in the operation of the present editor with respect to diacritics, as described below.

Finally, environmental operators define certain attributes of the characters and symbols of the text rather then defining relationships between characters, symbols and units. Examples of such operators include the operators which determine the size of the characters and symbols, whether they are in italic and their font. Certain of these operators cause a discrete or radical change of state in the text, that is, the attribute is turned on or off, and the operator's parameter may be viewed as being an on or off flag. An example of such a discrete environmental operator is the italic function.

There are other environmental operators which cause a modification to a continuous state of the characters and symbols of the text, rather than a discrete, or on/off type of change. These operators include, for example, the operators defining the size of the characters and symbols. That is, there is always an operator in effect which defines the size of the characters and symbols and the attribute defined by these operators change, or is modified, rather than turned on or off. In this case, the operator's parameter is a value rather than an on/off flag or command.

It should be noted that, in addition to the defined operators, described below, there are certain implicit operators, that is, operators which are defined by context rather than by a specific code. For example, at the beginning and end of a unit there is an implicit operator linking that unit to, respectively, the preceding and following units, in effect PREVIOUS and NEXT operators. These relationships between units are not, as described, specified, but are implied; that is, the end of a unit is indicated when all operators therein have been terminated and this occurrence implies the beginning and connection to a next unit. As will be described in below, the present editor maintains two main data structures which contain, in one, the characters, symbols, operators and terminators defining the units in the form of a single string of words and, in the other, information defining the physical sizes and locations of the units on a page. In the first, the relationship between units is implied by their location in the string and by, for example, the final terminator of the unit implying the beginning of a next unit. In the second, the units are linked one to the other in sequence by pointers, the pointers serving as implied operators that, for example, a unit is ended and the next unit beginning.

The operators defined for the present implementation of the present invention include, but are not limited to:

FORMAT LINE—a prefix operator defining the general formatting of a page, for example, the locations of tabs and returns;

DEFINE BASE SIZE—a prefix operator defining the base line size of characters;

SIZE ON BASELINE—a prefix operator indicating the size relative to the BASE SIZE of following characters located on a baseline;

SIZE AROUND CENTER—a prefix operator indicating the size relative to the BASE SIZE of following characters located around a center baseline;

FONT—a prefix operator defining what font of characters and symbols is to be used;

ITALIC ON—a prefix operator indicating that following characters are to be in italic style;

ITALIC OFF—a postfix operator which operates upon a preceding ITALIC ON operator and indicates that following characters are not to be in italic style;

RADICAL—a prefix operator indicating that the following unit is to be enclosed within a radical symbol;

OVERBAR/UNDERBAR—prefix operators indicating that the following unit is to have an overbar or an underbar;

BAR TERMINATOR—a postfix operator which operates as a terminator for a preceding OVERBAR/UNDERBAR operator;

OVER/UNDER DIACRITIC—infix operators indicating that a diacritic character or mark is to be placed above or below the receding character or unit;

OVERSTRIKE—an operator similar to the diacritic operators but indicating that the associated character or characters are to appear with other characters or symbols through or imposed upon them; the overstrike operator is accompanied by a parameter defining the character or symbol which is to be overstriken onto the base character or characters;

OVER-, UNDER-, SUPER-, SUB-, PRESUPER- and PRESUB-SCRIPTs—infix operators indicating that the preceding character or unit is a Base character or unit and that the following character, unit or string is a Script to occupy a script position with regard to the base character or unit, the position being determined by the particular SCRIPT operator;

LINE SPLIT—an infix operator accompanied by a parameter value n which indicates that the present baseline is to be split into a group of n parallel lines, each parallel to the original baseline, with the group of lines being centered on the original baseline and one or more characters appearing on each of the split lines; in the present implementation, the values of n range from 2 to 10, inclusive, with n=1 reserved to indicated a LINESPLIT into two lines with a fraction line imposed therebetween;

NULL—is a prefix operator used to indicate or represent a non-existent character, that is, a space; a NULL may be used, for example, as a base character for a following SCRIPT operator to provide a virtual base character for the SCRIPT operator; and, TAB, DECTAB and CENTER—are both control characters effecting formating and operators in that they break a unit.

APPEND BLOB—an infix operator used to indicate the point at which following characters, strings or units will be appended to the existing characters, strings or units; the APPEND BLOB always appears at the present end of the text to be edited, for example, and is distinct from the editing cursor, which indicates where a present editing operation is being performed, such as an overstrike, insert, delete, copy or move of existing text.

Having described certain terms and concepts used in the following descriptions of the present invention, the description will continue with a description of the overall structure and operation of a text editing system incorporating the present invention.

A.2 GENERAL STRUCTURE AND OPERATION (FIG. 1)

Referring to FIG. 1, therein is presented a block diagram of a information processing system, that is, a computer system, incorporating the present invention. The system includes a Memory (MEM) 110 wherein reside programs for directing operations of the system and data structures which are operated upon by certain of the programs. A Central Processing Unit (CPU) 112 is responsive to the programs for performing the system's operations while a Keyboard (KB) 114 is provided for user inputs through keystrokes and a Display 116 is provided for providing visual representations of operations to the user. Examples of such systems may include the Wang Professional Computer from Wang Laboratories, Inc. of Lowell, Mass., the IBM Personal Computer, and many other similar computer systems available from other computer companies, including computers with user terminals connected therefrom.

Because of the nature of the characters and symbols which appear in the types of text with which the present editor is intended to operate, the present system is intended to operate with a bit mapped display, wherein a pixel by pixel representation of a present screen is stored in the memory space of the system for display. This function is provided by Screen Memory (SM) 118, which resides in the addressable memory space of the system, either directly in MEM 110 or in a separate memory, and stores a bit mapped Screen Image (SM) 118 of the screen or screens comprising a present page of a document. As indicated in FIG. 1, an SI 120 is written into SM 118 by the text editor and associated programs, described in the following, and is read from SM 118 to Display 116 to provide a visual representation of the present screen to the user. It should be noted that the system may also operate with vector terminals, that is, terminals which do not generate bit mapped displays but instead draw line segments upon the display.

Referring now to the programs and data structures represented in FIG. 1, certain of these programs are well known in the art and do not require a detailed discussion in describing the present text editor. For example, Operating System (OS) 122 essentially directs, supervises and coordinates the operations of the other programs operating in the present system, as is well known in the art. Keyboard Handler (KBH) 124, associated with KB 114, is similarly well known in the art and accepts keystroke inputs from KB 114, passing these keystroke code inputs to the present text editor, the text editor in turn being responsive to the keystroke codes to perform the editing functions. The remaining elements of the system illustrated in FIG. 1 are more directly concerned with the present invention and will be described in further detail below.

B. GENERAL DESCRIPTION OF EDITOR DATA STRUCTURES AND MECHANISMS (FIG. 1)

The structure and operation of the present text editor will be most readily understood after an overall description and discussion of the data structures and mechanisms generated and used by the editor to generate a document containing text and a visual display, that is, screens, representing the document. As will be described below, the editor data structures and their associated mechanisms are comprised of two groups of data structures with related editor mechanisms, those associated directly with a document and those used by the editor in operating upon and with a document. These data structures will be described below, in that order, and will be referred to hereafter as, respectively, the document data structures and mechansims and the editor operation data structures and mechanisms.

B. 1 DOCUMENT DATA STRUCTURES AND MECHANISMS (FIG. 1)

B. 1. a Document Data Structures (FIG. 1)

Considering first the data structures directly associated with a document, as previously described the data structures which are most readily and efficiently created and edited by a word processing type editor are incompatible with the data structures best adapted to representing the graphic-like symbols and characters of, for example, scientific text. The present text editor provides a word processor like document creation and editing functionality together with a graphics-like visual representation suitable for scientific and technical text characters and symbols, and those of other languages, by generating and operating with a plurality of interlinked and, through the editor, interactive data structures.

Although there are other data structures resulting from operation of the present text editor, such as Screen Image 120, there are three primary data structures which together define a text document and are used by the editor to create, edit and display the document, together with a fourth which defines the characters and symbols themselves. As also described above and described in further detail below, there is also a group of data structures which are associated with the operations of the editor rather than directly with the document.

The text itself is defined by the data structures comprised of Document Profile (DP) 126, Encoding Buffer (EB) 128 and Linked Unit Structures (LUS) 130, which will be described next below. As will be described below, DP 126 contains information generally defining certain aspects of a document as a whole, certain information pertaining to Screen Image 120 and other information used by the editor in creating and editing a document.

EB 128, again described in detail below, stores the codes comprising an equation in an "encoded" form as a string of character, operator and terminator codes similar, in certain respects, to the character strings comprising a word processing document file. As shown in FIG. 1, EB 128 contains an Encoding Buffer Header (EBH) 132 containing certain additional information pertaining to an equation as a whole. The string of character, operator, parameter and terminator codes which comprise an equation or expression are indicated as residing in EB 128 as a string of Encoded Units (EUs) 134, wherein each EU 134 contains a string of character, operator and terminator codes defining a single unit. It should be recognized that this representation of the EUs 134 in EB 128 is intended as a convenience and as a conceptual aid in understanding the following descriptions of editor data structures and operation. The EUs 134 shown in EB 128 and referred to in the following descriptions of the editor are, as they reside in EB 128, implicit rather than explicit data structures. That is, and as described above, the character, operator, parameter and terminator codes defining an equation or expression reside in EB 128 as a single string of codes, not divided explicitly into the indicated EUs 134. As will be described in following discussions, the codes residing in EB 128 in this string do, in fact, define units, that is, EUs 134. The definition of this string into EUs 134 is determined, however, by the particular codes residing in the string and their sequence in the string.

As indicated in FIG. 1, the last element or code in the string of EUs 134 contains an Append Blob operator code, thereby indicating where additional units are to be appended to the previously existing string of encoded units in EB 128 if the last unit in the string is upon the last line.

As is well known, the type of data structure residing in EB 128 is well adapted to word processing like editing operations, but is not well suited for generating a visual representation of the graphics-like symbols and characters of text with which the present editor is intended to operate, for example, scientific text. Associated with and linked to EB 128 is LUS 130 which contains, for each unit stored in encoded form in EB 128, a Unit Structure (US) 136 which contains information required to form a visual representation of the associated unit stored in EB 128. As indicated in FIG. 1, the USs 136 of LUS 130 are not stored as a string but as individual data structures linked through Unit Structure Pointers (USPs) 138, with each US 136 being linked to its associated USs 136 through one or more USPs 138. For example, a particular unit may, as previously described, be comprised of a single character which may have associated with it another unit representing a superscript unit and preceding and following units, which again may be single characters. The US 136 for that particular unit will therefore, as described below, be linked to its associated superscript and preceding and following character units by USP 138 pointers, one to each associated unit. Each US 136 in LUS 130 is further linked to the sub-string of codes residing in EB 128 which together comprise the corresponding EU 134 through a set of pointers, the sets of pointers linking the USs 136 to their corresponding EUs 134 being represented together in FIG. 1 as Encoding Buffer Pointers (EBPs) 140.

Finally, the editor includes Keyboard Fonts (KF) 142 which contains a one or more Font Tables (FTs) 144 containing definitions of characters and symbols. In the present implementation of the editor, for example, there may be one or more fonts for the characters set containing mathematical, physical, greek, ASCII and chemical characters and symbols. Each character code appearing in EUs 134 is, in turn, comprised of a two byte word wherein the first byte is an index indicating a particular FT 144 in which the character or symbol resides and the second byte is an offset into that FT 144, indicating the particular character or symbol within that font.

Having described in general the data structures created and used by the editor, the general operation of the editor will be described next below.

B. 1.b Document Data Structure Mechanisms and General Operation (FIG. 1)

As indicated in FIG. 1, keystrokes defining the characters and symbols of an equation and editing commands, that is, commands for controlling the creation and editing of an equation, are entered by the user through KB 114 and KBH 124 and are provided in turn to Encoding Editor (EE) 146. EE 146 in turn writes character and symbol codes and operator and terminator codes, together with any required parameters, into the string of character, operator, parameter and terminator codes defining a present expression, and, when necessary, into EBH 132, and manipulates or edits these codes and their arrangement as necessary to create or edit text. EE 146 is also used to create and modify, if necessary, the data residing in DP 126.

As described above, the character, symbol, operator, terminator and parameter codes defining an equation in encoded form are stored in EB 128 in as a string of codes with the codes and their sequence therein defining the Encoded Units (EUs) 134, wherein each EU 134 may be regarded, in turn, as being comprised of a string of character, operator and terminator codes defining a single unit. As also described above, the last code in the string of codes may contain an Append Blob operator code if it represents the end of the page, thereby indicating where additional units are to be appended to the previously existing string of codes in EB 128, or may contain a return code if the end of a line is represented.

As described, the data structure residing in EB 128 and defining an equation in "encoded" form is well adapted to the word processing like editing operations well known in the prior art, that is, to editing programs for operating upon strings of character codes, as are the data structures residing in EBH 132 and DP 126. As known, these operations may include, for example, the appending of character, operator, parameter and terminator codes to a string and the insertion, deletion, copying and moving of codes or strings of codes within the string. Such editing programs are well known in the art, examples being the word processing programs available from Wang Laboratories, Inc. of Lowell, Mass., and from most other major computer companies and many software companies. The structure and operation of EE 146 is generally similar to such programs and will not be described in further detail in the following descriptions.

The data structure stored in EB 128 and representing an equation in encoded form is not, however, as described above, well suited for directly generating a visual representation of the graphics-like symbols and characters of the scientific and other texts with which the present editor is intended to operate. As such, and as also previously described, the data structure which resides in LUS 130 and which is associated with and linked to the EB 128 data structure contains, for each unit stored in encoded form in EB 128, a Unit Structure (US) 136 which contains information required to form a visual representation of the associated unit stored in encoded form in an EU 134 of EB 128. These USs 136 are generated by Parser 148 from the basic, encoded equation description residing in EB 128 as a string of character, operator, parameter and terminator codes, with the assistance of the document information residing in DP 126 and the character/symbol information residing in the FTs 144 of KF 142. In certain instances, described below, Parser 148 is assisted in this operation by Virtual Device Interface (VDI) 150.

As described, DP 126 contains information relating to the present document as a whole, EB 128, including EBH 132 and the EUs 134, contain basic, encoded information describing an equation and the units thereof, and FTs 144 contain information identifying the characters and symbols appearing in the units. As indicated in FIG. 1 and described further in the following descriptions, Parser 148 is responsive to the operation of EE 146 to read this information from DP 126, EB 128 and FTs 144 through the respective indicated data paths, generates the corresponding USs 136, and writes the USs 136 into LUS 130 through the indicated data path.

In regard to the above, it should be noted that Parser 148 reads the character, operator, parameter and terminator codes from the string of codes residing in EB 128 a word at a time and in the sequence that they are stored in the string therein. As Parser 148 reads the codes defining the present expression or equation from EB 128, it operates upon the codes as determined by their content and context and parses the codes into the encoded units represented implicitly as EUs 134 in EB 128, so that the encoded units represented as EUs 134 in EB 128 become explicit data structures during this operation.

The character/symbol information residing in FTs 144 is read from FTs 144 by Parser 148 during this operation in response to the character/symbol codes appearing in the string read from EB 128. That is, and as previously described, each character code appearing in EUs 134 is comprised of a two byte word wherein the first byte is an index indicating a particular FT 144 in which the character or symbol resides and the second byte is an offset into that FT 144, indicating the particular character or symbol within that font. Parser 148 provides these indexes and offsets to FTs 144 through the path indicated in FIG. 1 and receives in return the corresponding character/symbol information through the indicated path.

As will be describe further below, the majority of the information required to define the physical organization of the characters and symbols of an equation on a page are contained in DP 126 and EB 128, and in particular EBH 132. For example, the characters and symbols are generally and initially assumed to be of a standard size and shape, that is, to fit within a rectangle of fixed dimensions, and the line spacing and pitch, that is, horizontal spacing of the characters and symbols, are identified by the information residing in DP 126 and EBH 132. The characters and symbols may, however, be made to differ from these standard dimensions; for example, the characters or symbols appearing in a superscript may be made smaller that of the base character or symbol or a character or symbol, or group of characters or symbols, may be made larger than standard. In these cases, the dimensions of the resulting units, and the characters and symbols appearing therein must be calculated.

In these cases, the operations of Parser 148 are assisted by certain routines residing in VDI 150. As is well known in the art, VDI 150 is essentially a set of graphics routines which accept as inputs various commands and codes representing a graphic-like image and generate, independent of the characteristics of the device upon which they are running, a corresponding graphical representation which may be visually displayed. In the present case, the information from EB 128 and FTs 144 pertaining to the non-standard size characters and symbols are passed to the VDI 150 routines by Parser 148, together with information form EB 128 relating to the changes from the standard dimensions. The routines of VDI 150 are then used to generate, in effect, a graphical representation of the non-standard sized characters and symbols and to "measure" the dimensions of the resulting characters and symbols. This dimensional information is then passed back to Parser 148 through the indicated data path and is used by Parser 148 to generate the corresponding US 136 to be written into LUS 130.

As shown in FIG. 1, Parser 148, and VDI 150, are also used to generate outputs representing a document in its final form, for example, as a visual representation stored in Screen Image 120 in Screen Memory 118. In this operation, Parser 148 reads the USs 136 describing the physical, visual representations of the units from LUS 130 in the sequence determined by the USP 138 pointers linking the USs 136. The corresponding encoded strings containing the character, operator, parameter and terminator codes of the units are concurrently read from the EUs 134 of EB 128 through use of the EBP 140 pointers which link each US 136 to the corresponding unit string in an EU 134. The general document and equation information is read by Parser 148 from DP 126 and EBH 132, and the character/symbol information from FTs 144 in the manner described above. These inputs read into Parser 148 essentially comprise all the commands, codes and information required to generate a visually displayable representation of the present equation and page and are passed by Parser 148 to VDI 150. Again, VDI 150 includes a set of graphics routines which accept as inputs the various commands, codes and information representing the present equation and page and generate a corresponding graphical representation which may be visually displayed, that is, displayed upon a CRT screen or printed upon a page. Also again, VDI 150 and the characteristics and operation thereof are well known in the art, being commonly employed in computer systems for generating graphics images, and need not be described in further detail herein.

As shown in FIG. 1, the output of VDI 150 is passed to SM 118 to be stored therein as a Screen Image 120 which may be displayed as a visual representation of the present equation and page by Display 116. As is well known in the art, this output may also be passed to a printer to display the image in printed form on a page.

It should be noted that the page and equation, or expression, presently being operated upon by the text editor, that is, by EE 146 and Parser 148, will change as the user enters and edits the present equation. Because of this, Parser 148 is, as described above, responsive to the operation of EE 146 and to the entry of new characters, symbols and operators, or the modification of existing characters, symbols and operators, by generating new USs 136 or modifying existing USs 136 in the manner described above and as required by the operations of the user. Parser 148 also reads the contents of DP 126, EB 128, LUS 130 and FTs 144 to VDI 150 as necessary as the present page and equation are created and edited by the user so that Screen Image 120 is updated by VDI 150 during the user's operations to reflect those operations. In certain editing operations, however, an editing change to the existing expression or equation does not require the regeneration of the corresponding US 136, that is, these operations do not effect the physical location and dimensions of the expression on a page. An example of such a change is the replacement of one character with another character, for example, replacing an "A" in an expression with a "B", wherein the new character is of the same dimensions, font, style and so forth as the original character. In such cases, the change is passed by Parser 148 directly from the EU 134 to VDI 150 and VDI 150 makes the corresponding change in the displayable representation of the expression.

It should also be noted that certain information residing in the USs 136 of LUS 130 is used by EE 146, as indicated, when EE 146 is performing editing operations upon the string of character, operator, parameter and terminator codes stored in EB 128. EE 146 may, for example, use character position information from a corresponding US 136 of LUS 130 to locate a particular character code in the string of codes in EB 128 in order to operate upon the code.

At the end of an editing session, the document created or edited may be saved for later use or editing by storing the contents of DP 126 and EB 128 and perhaps information from one or more FTs 144, all other information which defines the document being generated, as described above, from these data structures. It may be desirable, however, to transform the document into another form, for example, for storage in a particular format, to communicate to another system or to incorporate into a word processing document. For this reason, the system may further include the means to perform this transformation.

These means are represented in FIG. 1 by Document File Generator (DFG) 152 and the means for storing the results of the transformation, that is, and for example, a data structure suitable for incorporation into a word processing document, as Document File (DF)

154. As previously described, VDI 150 accepts from Parser 148 all commands, codes and information necessary to define a text page or document in a final form and operates upon these inputs to generate an output representing this final form of the page or document. In addition to the previously described visual display output of VDI 150, VDI is shown in FIG. 1 as also providing an output to DFG 152, which, in the manner well known in the art, accepts the document description output of VDI 150 and transforms this data structure into the desired final data structure which is stored in DF 154 for final use. The operation of such routines as DFG 152 is well known and common in the art and thereby needs no further detailed description herein.

B.2 EDITOR OPERATION DATA STRUCTURES AND MECHANISMS (FIG. 1)

As described, the editor data structures and their associated mechanisms may be regarded as being comprised of two groups, those associated directly with defining a document and those associated with the operations of the editor in general and in operating upon a document. Having described the data structures and related mechanisms directly associated with creating and defining a document, that is, EB 128 and LUS 130 together with EE 146 and Parser 148, the editor operation data structures and mechanisms, that is, those associated with the editor in general and with the operations of the editor upon a document, will be described next below.

As indicated in FIG. 1, the present editor includes, in addition to EE 146 and Parser 148, a related group of Editor Routines (ER) 156 which both direct the overall operations of the present editor and, in particular, control the text creation and editing processes. As indicated ER 156 receives data inputs from DP 126, EB 128, LUS 138 and Parser 148 and provides control and data outputs to these elements.

Associated with ER 156 is Editor Data Structures (EDS) 158, which includes System State Structure (SSS) 160, Line Data Structure (LDS) 162, Screen Data Structure (SDS) 164 and Insert/Hide Data Structure (IHDS) 166. As will be described in further detail below, SSS 160 contains information relating to the present state of operations of the editor and used by the editor in performing the current operation or operations. LDS 162 in turn contains information relating to a present line being operated within while SDS 164 contains information relating to the present screen. Finally, IHDS 166 contains information relating to the insert and Hide editing operations, which will be described in further detail below.

Also associated with ER 156 are Beginning of Editable Text Pointer (BOTP) 168, which contains a pointer to the present beginning of text which may be operated upon, and Cursor Pointer (CP) 170, which contains a pointer to the present location of a cursor. As will be described in the following, the cursor indicates the location within the text at which an operation may be initiated or performed. The cursor and cursor position are used, for example, to indicate the point in text at which text is to be inserted or to indicate the beginning and end points of text to be deleted, moved or copied and, in the move or copy operations, the points to which text is to be moved or copied.

Having described the overall structure and operation of the text editor of the present invention, certain portions of that editor will be described in further detail below, including certain of the data structures, for example, EB 128 and USs 136, and Parser 148.

C. DETAILED DESCRIPTIONS OF DOCUMENT DATA STRUCTURES (FIGS. 2 TO 4)

The following will now described certain of the document data structures of the present text editor in further detail, such as DP 126, EB 128, including EBH 132 and the EUs 134, and the USs 136 of LUS 130. These data structures will be described in that order, and will be illustrated with figures where figures will enhance an understanding of the following descriptions.

C.1 DOCUMENT PROFILE (DP) 126 (FIG. 2)

As previously described, DP 126 contains certain information pertaining to and defining a document as a whole. Referring to FIG. 2, the data fields of DP 126 are represented diagrammically therein and may include, but are not limited to:

SLANT ANGLE 202—a field defining the slant in degrees from vertical of characters and symbols appearing in an equation;

SCRIPT SIZE 204—a field defining the standard size of the characters and symbols in percent of a defined size;

SCRIPT DEPTH 206—a field defining the number of script levels that will change size by the factor defined by SCRIPT SIZE 204 before stabilizing at a fixed size;

START LOCATION 207—a field defining the location of a script relative to its base character; in the present implementation a script may be located above the base character or at ⅜ the height of the base character above the base character's baseline;

RESIZE STEP 208—a field defining the number of steps by which a character is changed in size when resized;

PROPORTIONAL SPACING FLAG 210—a field containing a flag indicating whether characters and symbols are to be proportionally spaced, for example, in right justified text;

PITCH 212—a field defining the pitch of characters and symbols in the text, the number of characters or symbols per inch;

DISPLAY MAGNIFICATION 214—a field defining the magnification of the displayed Screen Image 120 relative to a corresponding printed page;

DEFAULT KEYBOARD 216—a field identifying the default character/symbol font;

KEYBOARD DISPLAY 218—a field indicating whether Screen Image 118 shall contain a visual representation of the keyboard (font) in use with the characters/symbols indicated upon the images of the keys; and FRAME BOX 220—a field indicating whether delimiter boxes of units should be displayed.

C.2 ENCODING BUFFER (EB) 128 DATA STRUCTURES (FIG. 3 AND 4)

As described previously, EB 128 includes Encoding Buffer Header (EBH) 132 containing information regarding an equation as a whole and a string of Encoded Units (EUs) 134 with each EU 134 containing a string of character, operator, parameter and terminator codes defining a single unit.

C.2.a Encoding Buffer Header (EBH) 132 (FIG. 3)

Referring to FIG. 3, therein is presented a diagrammic representation of EBH 132 and the data fields therein. In the present implementation, EB 132 may include, but is not limited to:

BASE SIZE 302—a field defining the base size of the characters and symbols in points;

FONT 304—a field defining the primary font of characters and symbols to be used in the equation; and FORMAT LINE 306—a field containing a format for the page upon which the equation is to appear, that is, the locations of tabs, returns and similar format control characters.

C.2.b Encoded Units (EUs) 134 (FIGS. 4A to 4E)

As previously described, EB 128 contains a string of character, operator, parameter and terminator codes which implicitly define Encoded Units (EUs) 134, wherein each EU 134 may be regarded as comprised of a sub-string of character/symbol, operator, parameter and terminator codes which together define a single unit. The sequence in which the codes reside in EB 128, together with the sequence in which the character/symbol, operator, parameter and terminator codes defining the encoded units reside in their sub-strings, define the basic form of an equation.

The specific content of EB 128 in any particular instance is thereby determined by the particular equation being created or edited. As such, the data structure of EB 128, that is, of the encoded units implicit therein, is best illustrated through the use of the examples of equations shown in FIGS. 4A to 4E and described below. Each of the examples presented in FIGS. 4A to 4E includes a visual representation of an example equation as it might appear in Screen Image 120 or upon a printed page and, below the visual representation of the equation, a representation of the equation as it may appear in encoded form in EB 128.

In the following illustrations, the strings of character/symbol, operator, parameter and terminator codes corresponding to each of the illustrative equations of FIGS. 4A to 4E are presented as they may appear in EB 128, using the following conventions:

Each code, whether for a character/symbol, operator, parameter or terminator is enclosed within square brackets, that is, [], to delineate the code;

Within each set of brackets:

A character or symbol code is represented by the character or symbol itself;

Each operator is represented by op-XXX, wherein op-indicates an operator and XXX indicates the particular operator;

The operators which are used to illustrate EUs 134 in FIGS. 4A to 4E have been previously defined and described; the operators used in these illustrative examples include:

SUPERSCRIPT—op-supscr;
LINE SPLIT—op-lnsplt;
PRE-SUPER SCRIPT—op-presupscr;
RESIZE ON BASE—op-resizonbase;
SUB-SCRIPT—op-subscr; and,
RESIZE ON CENTER—op-resizoncntr.

A parameter associated with an operator is enclosed within brackets of its own, it associated with the preceding operator, and takes the form p- X where p- indicates the existence of a parameter and X indicates the value of the parameter;

There is a single type of explicit terminator used in the present example, the PSEUDO-RETURN; this terminator is indicated by PRET.

Referring now to the illustrative equations shown in FIGS. 4A to 4E, FIG. 4A illustrates an equation having single character, that is, "x", with a superscript of 2 on the x. The EB 128 string which would correspond to the encoded form of Equation 4A is shown in FIG. 4A just below the visual representation of Equation 4A.

Reading this illustrative string from left to right, the [x] is the character appearing on the baseline of the equation. [op-supscr] indicates a superscript operator. The [2] is the character appearing upon a local baseline in the superscript and the [PRET] is the terminator terminating the superscript operator.

Referring to FIG. 4B, FIG. 4B demonstrates the use of a simple line split operator to generate the fraction x/y. The EB 128 string which would correspond to the encoded form of Equation 4B is shown in FIG. 4B just below the visual representation of Equation 4B.

Again reading this string from left to right, the [op-lnsplt] indicates a line split operator, that is, the present base line is to be split into two or more lines centered upon and parallel to the original baseline. The following [p- 1] is the parameter associated with the line split operator and indicates the previously defined special line split operation wherein the split is into two lines with a fraction line between. The [x] is the character residing upon the topmost line of the line split and this line of the line split is terminated by the following [PRET]. The [y] following the first [PRET] is the character residing on the second line of the line split and the following [PRET] terminates this line of the line split. The occurrence of this second [PRET] also, as previously described, terminates the line split operator.

Referring to FIG. 4C, FIG. 4C illustrates a string of characters with one character, the "a", having a presuperscript of "xyz" wherein the characters in the presuperscript are reduced in size from the base characters. The EB 128 string which would correspond to the encoded form of Equation 4C is shown in FIG. 4C just below the visual representation of Equation 4C.

Again reading this string from left to right, the [1], [2] and [3] are, of course, the characters preceding the "a" to which the presuperscript is attached; it should be noted that the three characters (1, 2 and 3) together comprise a unit. That a presuperscript is attached to the "a" is indicated by the presuperscript operator code [op-presupscr] following the [a]. The characters appearing in the presuperscript, however, are reduced in size from the 1, 2, 3, a, b, and c appearing on the baseline, so that the character codes for the presuperscript characters, [x], [y] and [z] are preceded by the operator and parameter codes for a resize on base operation, that is, by [op-resizonbase] and [p- −1] wherein the parameter value −1 indicates a reduction is size of character from the base size. There is to be a return to normal, or base, character size following the presuperscript, so that the resize on base operator preceding the presuperscript character codes and which reduces the size of the presuperscript characters is terminated by another resize on base operator which enlarges any following characters relative to the presuperscript characters, that is, returns following characters to the base size. This terminator is the second resize on base operator [op-resizonbase], which has a parameter [p- +1] with a value of +1.

Referring to FIG. 4D, therein is presented an example of an equation having a base character to which are attached a superscript and a subscript with the subscript in turn having a subscript. The EB 128 string which would correspond to the encoded form of Equation 4D is shown in FIG. 4D just below the visual representation of Equation 4D.

Reading this string from left to right, the [A] is, of course, the base character and the following superscript operator [op-supscr] indicates that there is a superscript attached to the base character. The first [i], following the first superscript operator, is the character appearing in the superscript attached to the base character "A" and the immediately following terminator [PRET] terminates this superscript. The subscript operator code [op-subscr] following the first [PRET] indicates another operator. The only possible character code which might be a base character for this subscript is the [A]; that is, the [i] appearing between the [A] and the first [op-subscr] is a part of the superscript operator, which has been terminated by the first [PRET] and therefore is not available as a base character for this subscript operator. This first subscript therefore attaches to the "A". The character code for this first subscript, [i], is immediately followed by a second subscript operator code, that is, the second [op-subscr]. This first subscript has not been terminated before the occurrence of this second subscript operator, so that the [i] of the subscript attached to the [A] is available as the base character to this second subscript and the second subscript accordingly attaches to the second [i], that is, the subscript "i". The second subscript code is followed by the character appearing as a subscript to the subscript "i", that is, [x], and this character is followed by two terminators, [PRET] and [PRET] which terminate the two subscript operators.

Finally, FIG. 4E presents an example of a somewhat more complex equation than those illustrated in FIGS. 4A through 4D. The elements of Equation 4E and the resulting encoded form of Equation 4E which would appear in EB 128 are similar to those described above, so that Equation 4E will not be discussed in full detail. The EB 128 string which would correspond to the encoded form of Equation 4E is shown in FIG. 4E just below the visual representation of Equation 4E.

Of some interest in example Equation 4E is the resizing operations performed on the units "2=y" and "1+x" and the curved brackets enclosing the fraction formed from these units. The resizing of "2+y" and "1+x" are rather similar to that performed upon the unit "xyz" in Equation 2C, but is performed around center rather than base. The "("and")" appearing around the fraction formed of these two units is performed so that the "("and")" are of a size to enclose the fraction.

C.3 UNIT STRUCTURES (USs) 136 (FIG. 5)

As previously described, associated with and linked to EB 128 is LUS 130 which contains, for each unit stored in encoded form in EB 128, a Unit Structure (US) 136 which contains information required to form a visual representation of the associated unit stored in encoded form in EB 128. USs 136 of LUS 130 are not stored as a string but as individual data structures linked through Unit Structure Pointers (USPs) 138, with each US 136 linked to associated USs 136 through one or more USPs 138. Each US 136 in LUS 130 is further linked to its associated EU 134, that is, the sub-string of codes together comprising the corresponding encoded unit, in EB 128 through a set of pointers, which are together represented as Encoding Buffer Pointers (EBPs) 140.

Referring to FIG. 5, therein is presented the data fields of a US 136. The information fields contained in a US 136 are structured into four groups which contain information relating the US 136 to its corresponding encoded unit in EB 128, information describing certain properties of the unit, including a description if its physical dimensions and location on a page, and information linking the US 136 to the USs 136 of associated units.

As indicated in FIG. 5, Structure Identification Group 502 contains pointers which link the US 136 to the corresponding unit sub-string in EB 128 and a field identifying the number of elements or terms, that is, codes, in the corresponding sub-string. The pointers residing in Structure Identification Group 502 are the previously described EBP 140 pointers for that unit which link that unit's US 136 to the unit's EU 134, that is, the sub-string of codes which together comprise the corresponding encoded unit.

Property Identification Group 504 identifies certain properties of the unit which effect its graphical representation. This group is in turn divided into three sub-groups, General Information Sub-Group 506 containing general information about the unit, Beginning State Sub-Group 508 containing information pertaining to state at the beginning of the unit, and Ending State Sub-Group 510 containing information pertaining to state at the end of the unit.

Structural Flags 512 identify the reason for the separation of the unit from the parent or preceding unit, and Structural Pointers Group 514 contain the previously described USP 138 pointers which link the US 136 to all associated USs 136; if, for example, the unit is a base character, the USP 138 pointers residing in Structural Pointers Group 514 would point, for example, to any associated units containing sub- and superscripts associated from that base character, or associated multiple line split base units, and to the next preceding and following units.

Considering now the data fields of a US 136 in further detail, these data fields may include, but are not limited to:

STRUCTURE IDENTIFICATION GROUP 502

STARTPOS 516—A field containing an offset into EB 128 identifying the location in EB 128 of the element, character or operator, which starts the unit;

STARTCHAR 518—A field containing an offset into EB 128 identifying the location of the text element, that is, character or symbol, which begins the unit;

ELTLENGTH 520—A field identifying the number of elements in the sub-string comprising the encoded unit in EB 128, that is, the number of characters/symbol, operator, parameter and terminator code words between STARTPOS, and the end of the sub-string;

PROPERTY IDENTIFICATION GROUP 504

Unit General Information Sub-Group 506

STARTLOC 522—A group of two fields containing the absolute x and y location on the page for the section of line containing the unit;

UNITDIMS 524—A group of 4 fields containing the maximum and minimum x and y extents in each direction around STARTLOC, that is, dimensions, of the unit;

EXTENDEDDIMS 526—A group of 4 fields containing maximum and minimum x and y extents, that is, dimensions, of the unit plus all scripts, line splits and bar units associated from the unit in each direction around STARTLOC;

LINESPLITNUM 528—A field containing the number of lines in a linesplit in the unit, if the unit contains a line split;

LINESPLITLOC 530—A field containing the x and y coordinates of the line split character base, if there is a line split in the unit;

SCRIPTDEPTH 532—A field containing the number of levels down in script the characters/symbols of the unit are from the base size;

UNIT BEGINNING STATE INFORMATION SUB-GROUP 508

BEGFONT 534—A field identifying the beginning font for the unit;

BEGFONT RESIZE FACTOR ON BASELINE 536—A field containing the base resizing factor for this string;

BEGFONT RESIZE FACTOR AROUND CENTER 538—A field containing the base resizing factor for this string around center;

BEGITALIC FLAG 540—A field containing a flag indicating that the following characters/symbols are in italic style;

UNIT ENDING STATE INFORMATION SUB-GROUP 510

ENDFONT 542—A field identifying the font in use at the end of the unit;

ENDFONT RESIZE FACTOR ON BASELINE 544—A field containing the base resizing factor for the next string;

ENDFONT RESIZE FACTOR AROUND CENTER 546—A field containing the base resizing factor around center for the next string;

ENDITALIC FLAG 548—A field containing a flag ending the italic style;

STRUCTURAL FLAGS 512: A field containing information identifying the reason the present group is separated from the parent or preceding unit;

STRUCTURAL POINTERS GROUP 514

Scriptunits

SUPERSCRIPTUNIT 550,
SUBSCRIPTUNIT 552,
PRESUPERSCRIPTUNIT 554,
PRESUBSCRIPTUNIT 556,
OVERSCRIPTUNIT 558, and
UNDERSCRIPTUNIT 560

A group of six fields containing logical pointers to the six script locations; pointers are entered into the corresponding fields if the unit has associated script units;

LINESPLITUNIT 562—A group of 10 fields containing logical pointers to each of the starting units in each of the 10 possible sublines of a line split; a particular field will contain a pointer if there is a corresponding subline and will contain a place holding value if there is no corresponding subline in the line split;

BARUNIT 564—A field containing a logical pointer to a bar unit, used if the unit or section has an associated bar unit;

NEXTUNIT 566—A field containing a logical pointer to the next unit in sequence in the line; and, PREVUNIT 568—A field containing a logical pointer to the previous unit in sequence in the line.

Having described the data structures directly associated with the text to be created and edited, Parser 148 will be described in further detail next below.

D. DETAILED DESCRIPTION OF DOCUMENT STRUCTURE MECHANISMS—PARSER 148 (FIGS. 6A TO 6O AND 7)

As previously described, Parser 148 operates in response to the operations of EE 146 to read the character, operator, parameter and terminator codes defining the encoded units of the expression or equation from the string of codes residing in EB 128, parses the codes into encoded units, and builds the corresponding USs 136. In this regard, and as previously described, the response of Parser 148 to EE 146 depends upon the particular code keyed into EE 146 by the user. In certain cases, Parser 148 receives information from the code that the user indicated operation does not fundamentally change the present unit, for example, the user may be merely changing a character from one character to another or adding a character to a string of characters at the Append Blob; in this case, EE 146 would simply pass the character on to VDI 150 for display and would update the EXTENDEDDIMS 526 field of the corresponding US 136, bypassing Parser 148. If the code indicates a fundamental effect upon the unit, such as indicated by a RETURN or PSEUDORETURN code, Parser will correspondingly update, or rewrite the corresponding US 136 and pass the updated US 136 to VDI 150. If Parser 148 detects a format or command operator code, such as a script code, Parser 148 will terminate the present unit and US 136, updating the present US 136 as necessary, and will initiate a new US 136.

In the following, the structure and operation of Parse 148 will be described first through flow diagrams representing the structure and operation of Parser 148, and then be means of illustrative examples using the example Equations previously described with reference to FIGS. 4A to 4E.

Figure 6A:
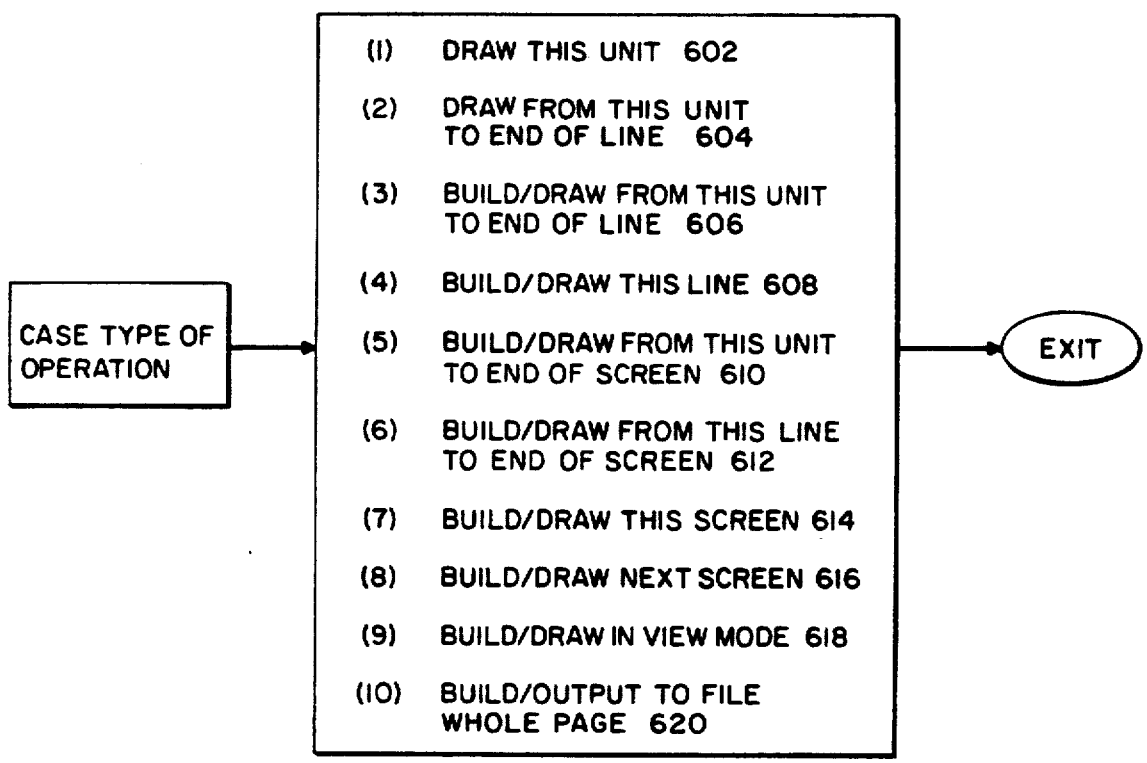
FIGS. 6A, 6B, 6C, 6D, 6E, 6F, 6G, 6H, 6I, 6J, 6K, 6L, 6M, 6N, and 6O are diagrammic representations of the parser of the present text editor.
Figure 6B:
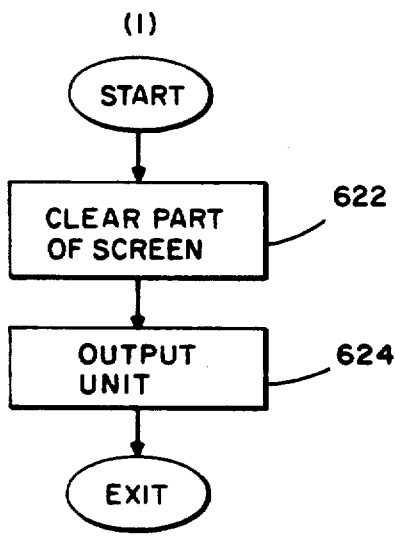
Figure 6C:
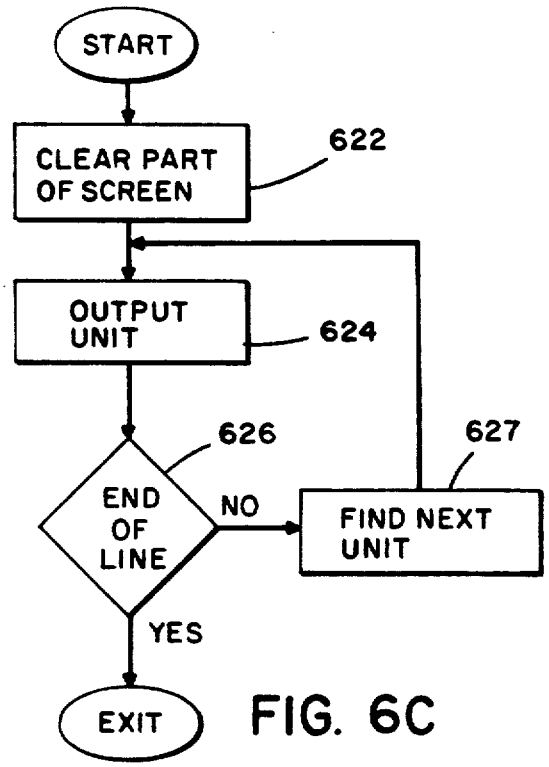
Figure 6D:
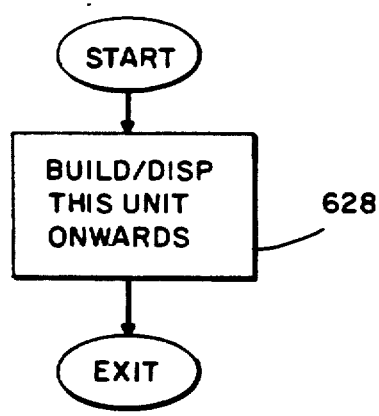
Figure 6E:
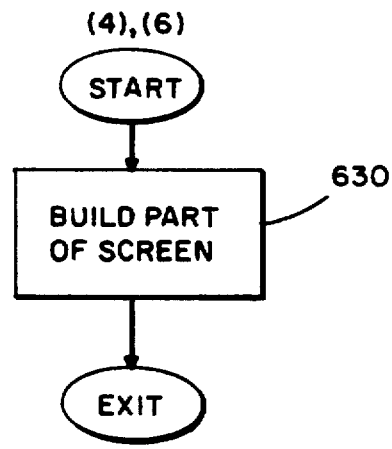
Figure 6F:
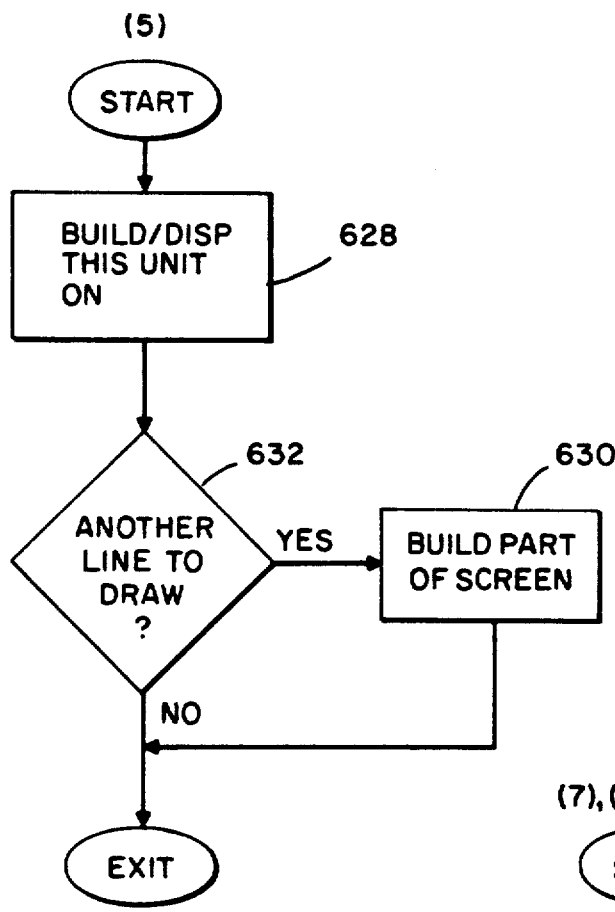
Figure 6G:
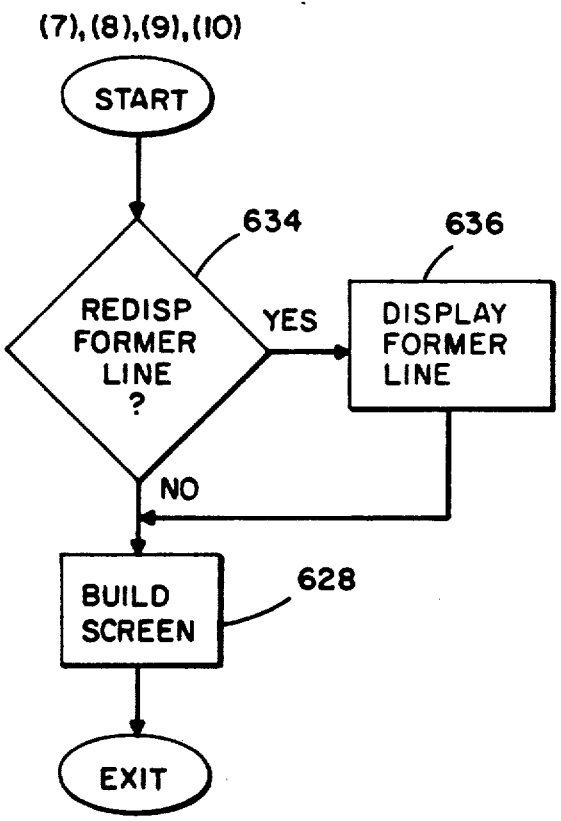
Figure 6H:
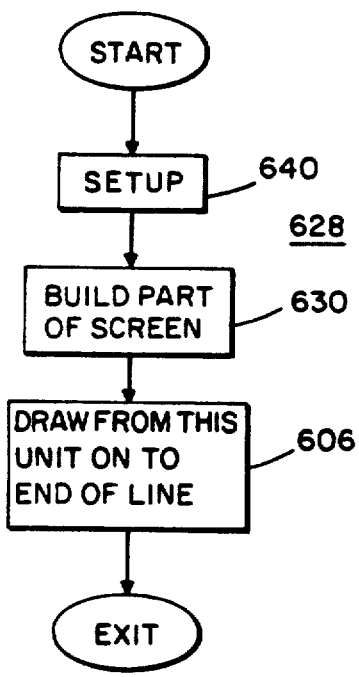
Figure 6I:
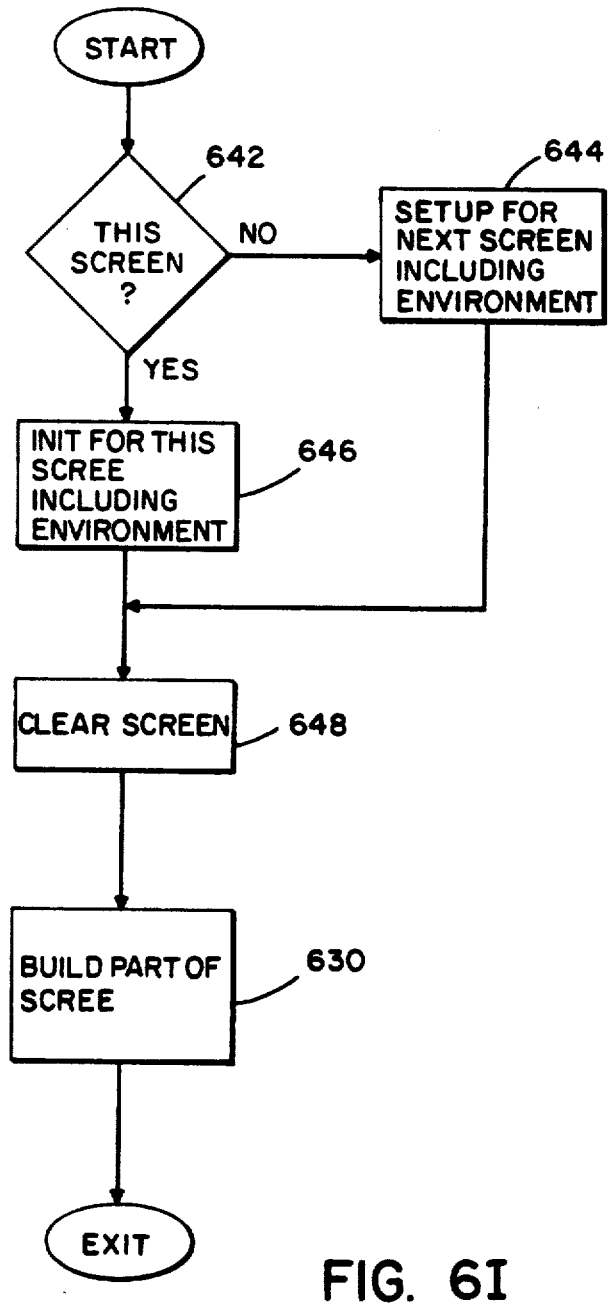
Figure 6J:
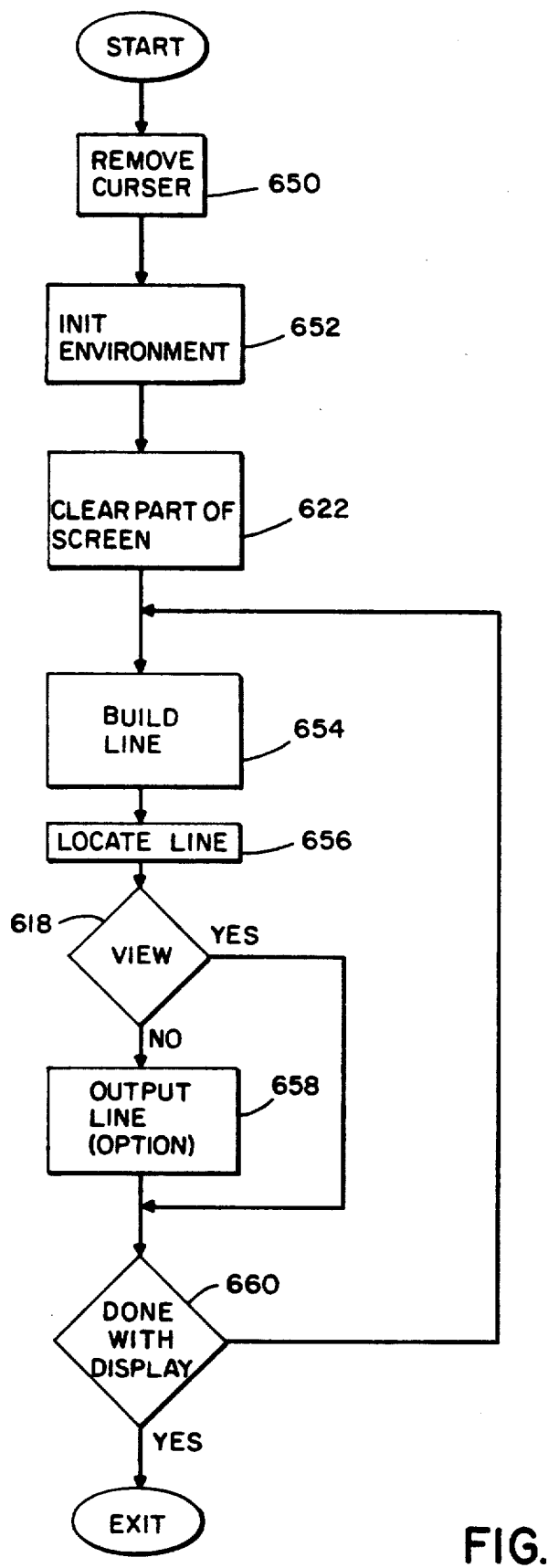
Figure 6K:
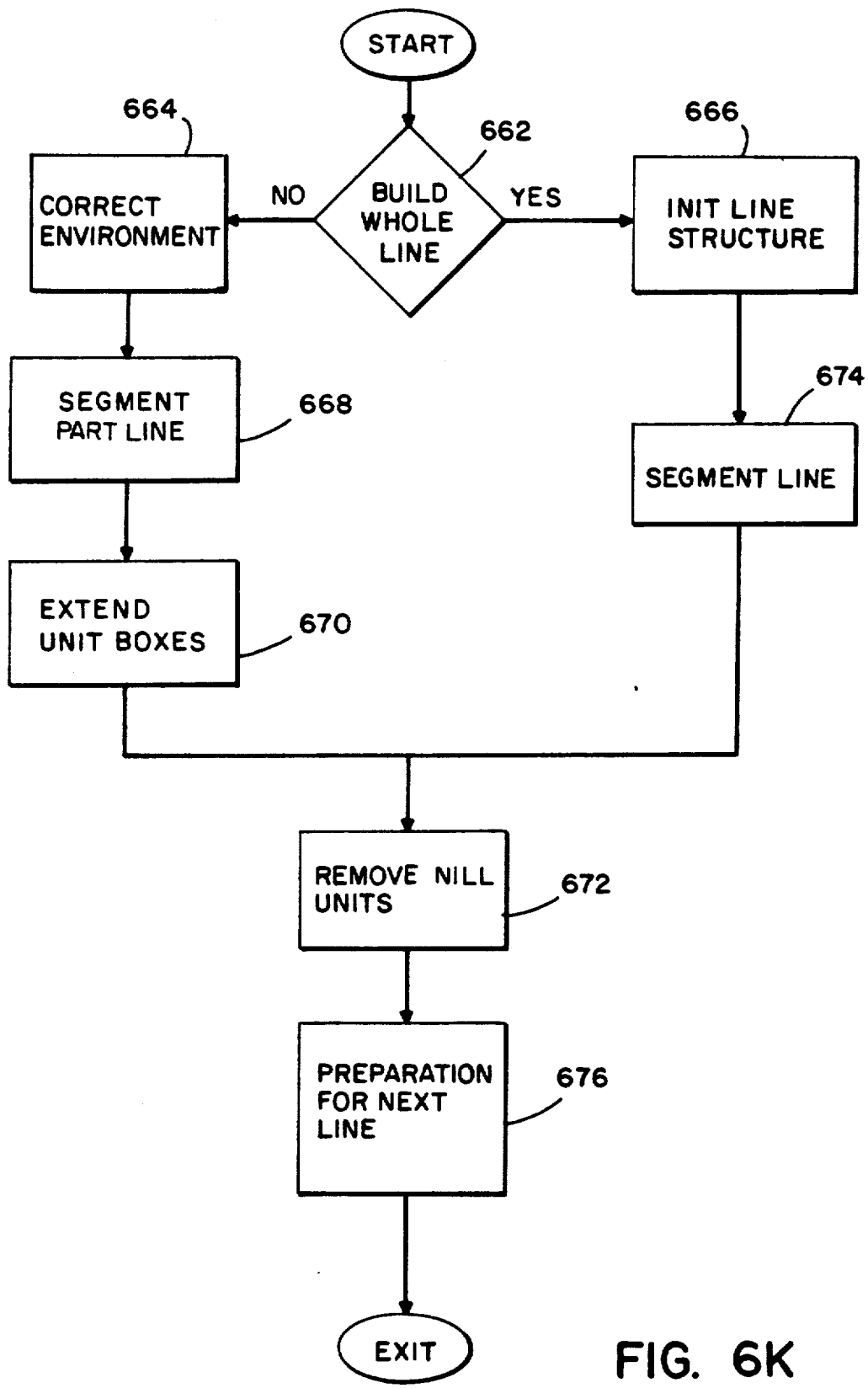
Figure 6L:
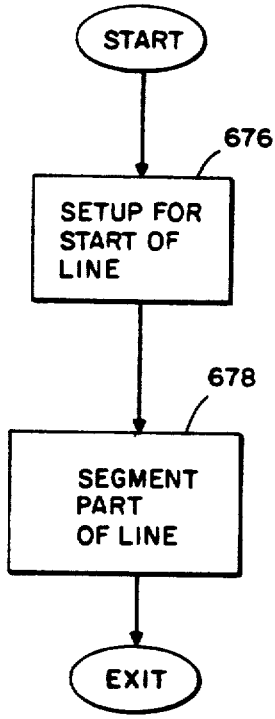
Figure 6M:
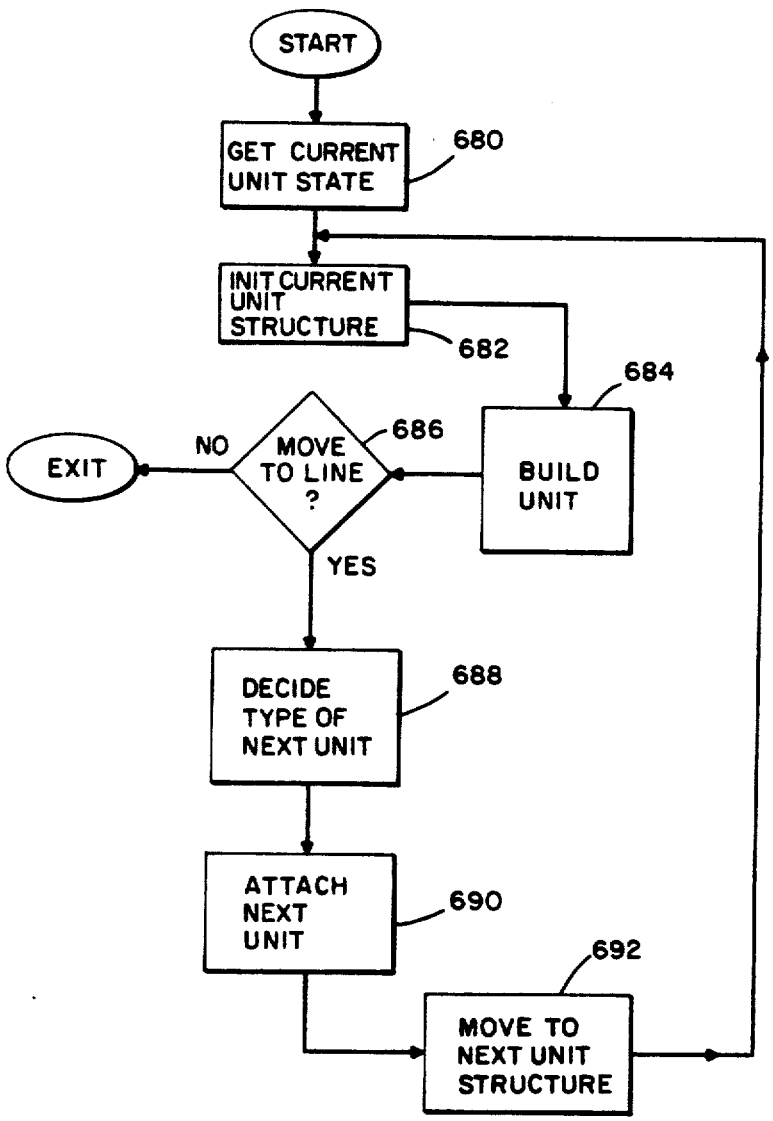
Figures 6N, 6O:
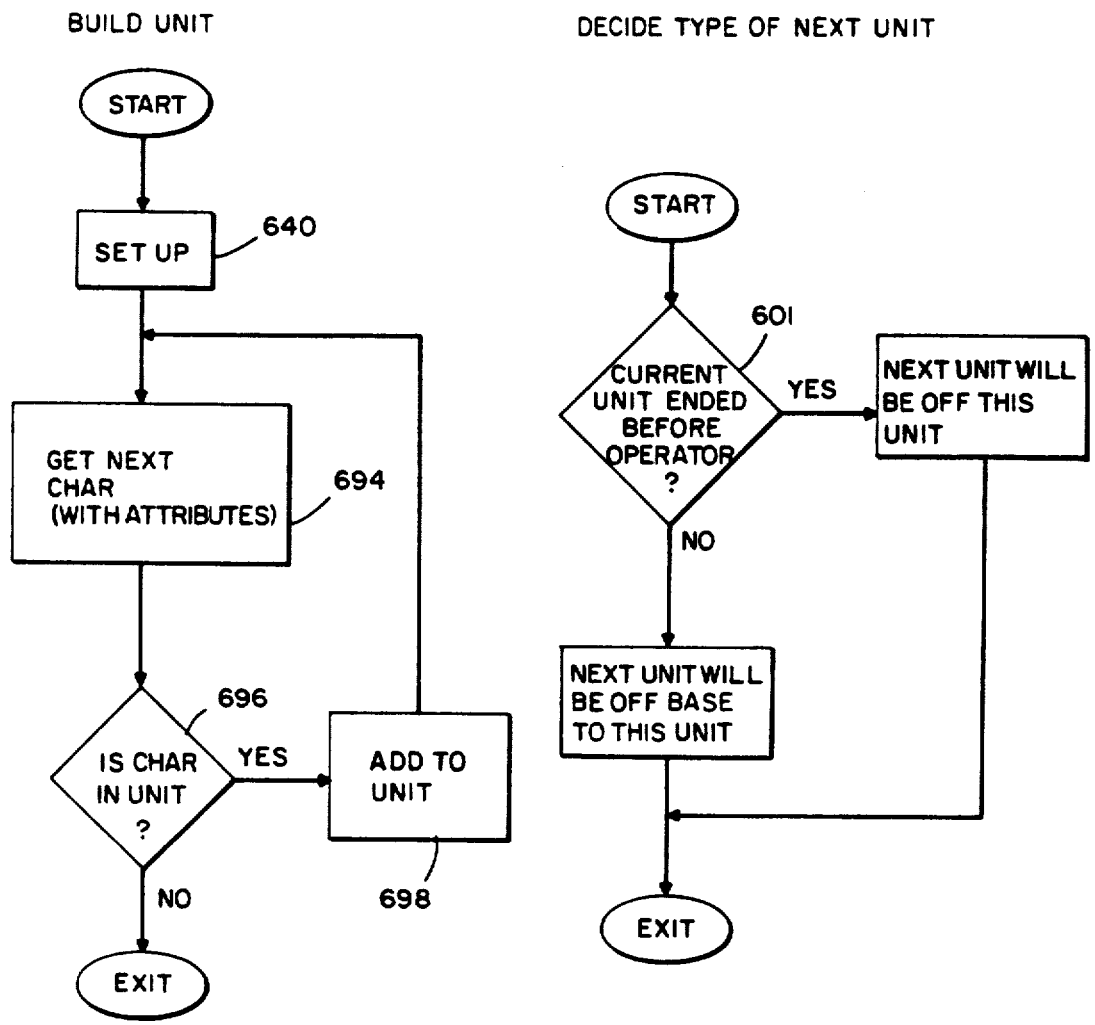

Referring to FIGS. 6A to 6O, therein are presented diagrammic representations of the structure and operation of Parser 148. It should be noted that the titles selected for the elements shown therein have been selected to be self descriptive to those of skill in the art, in particular in combination with the other parts of the present descriptions, to enhance the clarity of presentation and reduce the volume of non-drawing text required to describe Parser 148.

Referring first to FIG. 6A, therein is presented a general diagram of Parser 148. As indicated therein, Parser 148 receives information from EE 146 defining an operation to be performed and performs a CASE operation to determine the type of operation. Thereafter, Parser 148 follows one of ten possible branches, depending upon the operation, until the operation is completed and Parser 148 EXITs to await a next input from EE 146.

As indicated in FIG. 6A, the ten branches presently implemented in Parser 148 include:

(1) DRAW THE PRESENT UNIT 602;
(2) DRAW FROM THIS UNIT TO THE END OF THE PRESENT LINE 604;
(3) BUILD/DRAW FROM THIS UNIT TO THE END OF THE PRESENT LINE 606;
(4) BUILD/DRAW THIS LINE 608;
(5) BUILD/DRAW FROM THIS UNIT TO THE END OF THE SCREEN 610;

(6) BUILD/DRAW FROM THIS LINE TO THE END OF THE SCREEN 612;
(7) BUILD/DRAW THIS SCREEN 614;
(8) BUILD/DRAW NEXT SCREEN; 616
(9) BUILD DRAW IN VIEW MODE 618 (note: this is a mode wherein the visual representation on the screen is without control and editing codes, that is, as the expression would appear printed on a page.), and
(10) BUILD/OUTPUT TO FILE, WHOLE PAGE 620.

Each of these branches will be next described individually with reference certain of the remaining of FIGS. 6, and then certain routines appearing within these branches will be described in further detail.

Referring to FIG. 6B, therein is represented Case Branch (1), for DRAW THE PRESENT UNIT 602. As indicated therein, this branch is comprised of CLEAR PART OF SCREEN 622, which in turn calls OUTPUT UNIT 624 and then EXITs.

Referring to FIG. 6C, therein represented Case Branch (2), for DRAW FROM THIS UNIT TO END OF LINE. As indicated therein, this branch includes CLEAR PART OF SCREEN 622 followed by OUTPUT unit 624. This branch also contains decision module END OF LINE ? 626 following OUTPUT UNIT 624 to determine whether the end of the present line has been reached. If not, the branch returns to OUTPUT UNIT 624 through FIND NEXT UNIT 627 until the end of line is reached and, when the end of line is reached, EXITs.

Referring to FIG. 6D, therein is represented Case Branch (3) for BUILD/DRAW FROM THIS UNIT TO END OF LINE 606. As indicated therein, this branch is comprised of the module BUILD/DISPLAY THIS UNIT ONWARDS 628.

Referring to FIG. 6E, therein is represented Case Branches (4) and (6) for, respectively, BUILD/DRAW THIS LINE 608 and BUILD/DRAW FROM THIS LINE TO END OF SCREEN 612, these branches being identical. As indicated, these branches are comprised of the module BUILD PART OF SCREEN 630.

Referring to FIG. 6F, therein is represented Case Branch (5) for BUILD/DRAW FROM THIS UNIT TO END OF SCREEN 610. As indicated, this branch is comprised of BUILD/DRAW THIS UNIT ON 628 followed by decision module ANOTHER LINE TO DRAW 632. If there is not another line to be drawn, ANOTHER LINE TO DRAW 632 EXITs and, if there is another line to be drawn, ANOTHER LINE TO DRAW 632 calls BUILD PART OF SCREEN 630 which then EXITs.

Referring finally to FIG. 6G, therein is represented Case Branches (7), (8), (9), and (10) for, respectively, BUILD/DRAW FROM THIS LINE TO THE END OF THE SCREEN 612, BUILD/DRAW THIS SCREEN 614, BUILD/DRAW NEXT SCREEN 616, BUILD DRAW IN VIEW MODE 618 and BUILD/OUTPUT TO FILE, WHOLE PAGE 620, these case branches being identical. As indicated, these branches include decision module REDISPLAY FORMER LINE ? 634, which has decision branches to DISPLAY FORMER LINE 636 and BUILD SCREEN 638; as shown, DISPLAY FORMER LINE 636 also calls BUILD SCREEN 638 and BUILD SCREEN 638 in turn EXITs.

Having described the main branches of Parser 148, certain details of the modules within those branches will be described next.

Referring to FIG. 6H, therein is represented a diagram of BUILD/DISPLAY THIS MODULE ON 628. As indicated, this module includes SETUP 640, which in turn calls BUILD PART OF SCREEN 628, which in turn calls DRAW FROM THIS UNIT ON TO END OF LINE 606, which in turn EXITs.

FIG. 6I presents a diagram of BUILD SCREEN 638. As shown, this module includes decision module THIS SCREEN? which branches to SETUP FOR NEXT SCREEN, INCLUDING ENVIRONMENT 644 and to INITIALIZE FOR THIS SCREEN, INCLUDING ENVIRONMENT 646. As indicated, both SETUP FOR NEXT SCREEN, INCLUDING ENVIRONMENT 644 and INITIALIZE FOR THIS SCREEN, INCLUDING ENVIRONMENT 646 in turn call CLEAR SCREEN 648, which in turn calls the previously described BUILD PART OF SCREEN 630. BUILD PART OF SCREEN 630 in turn EXITs.

FIG. 6J presents a diagram of BUILD PART OF SCREEN 630. As indicated, BUILD PART OF SCREEN 630 begins with REMOVE CURSOR 650, which is followed by INITIALIZE ENVIRONMENT 652 and previously described CLEAR PART OF SCREEN 622. CLEAR PART OF SCREEN 622 is followed by BUILD LINE 654, which in turn is followed by LOCATE LINE 656. LOCATE LINE 656 is followed by a decision module which may calls the previously described BUILD/DRAW IN VIEW MODE 618. An affirmative decision will result in the calling of OUTPUT LINE 658, which in turn calls decision module DONE WITH DISPLAY? 660, while a negative decision results in DONE WITH DISPLAY? 660 being called directly from the decision module associated with BUILD/DRAW IN VIEW MODE 618. If the display is not done, DONE WITH DISPLAY? 660 calls BUILD LINE 654 and, if the display is done, DONE WITH DISPLAY? 660 EXITs.

Referring to FIG. 6K, therein is represented BUILD LINE 654. As indicated, BUILD LINE 654 begins with decision module BUILD WHOLE LINE? 662, which has decision branches to CORRECT ENVIRONMENT 664 and to INITIALIZE LINE STRUCTURE 666. Considering first the CORRECT ENVIRONMENT 664 branch, this branch includes SEGMENT PART OF LINE 668 and EXTEND UNIT BOXES 670, which in turn calls REMOVE NILL UNITS 672. The INITIALIZE LINE STRUCTURE 666 branch includes SEGMENT LINE 674, which in turn also calls REMOVE NILL UNITS 672, wherein a NILL UNIT is a temporary, effectively empty unit used during the building of units to link the units being built. REMOVE NILL UNITS 672, finally, calls PREPARATION FOR NEXT LINE 676, which finally EXITs.

Referring to FIG. 6L, therein is represented SEGMENT LINE 674, which is comprised of SETUP FOR START OF LINE 676 followed by SEGMENT PART OF LINE 678, which in turn EXITs.

Referring to FIG. 6M, therein is represented SEGMENT PART OF LINE 678. As indicated, SEGMENT PART OF LINE 678 begins with GET CURRENT UNIT STATE 680, followed by INITIALIZE CURRENT UNIT STRUCTURE 682 which in turn calls BUILD UNIT 684. BUILD UNIT 684 in turn calls decision module MORE TO LINE? 686, which has a negative decision branch to EXIT and an affirmative decision branch to DECIDE TYPE OF NEXT UNIT 688. DECIDE TYPE OF NEXT UNIT 688 in turn begins a branch comprised of ATTACH NEXT UNIT 690 and MOVE TO NEXT UNIT STRUCTURE 692, which in turn may call INITIALIZE CURRENT UNIT STRUCTURE 682.

Referring top FIG. 6N, therein is represented BUILD UNIT 684. As indicated, BUILD UNIT 684 begins with SETUP 640, which in turn calls GET NEXT CHARACTER WITH ATTRIBUTES 694. GET NEXT CHARACTER WITH ATTRIBUTES 694 is followed by decision module IS CHARACTER IN UNIT?, which has a negative decision branch to EXIT and an affirmative decision branch to ADD TO UNIT 698, which in turn may call GET NEXT CHARACTER WITH ATTRIBUTES 694.

Referring finally to FIG. 6O, therein is represented DECIDE TYPE OF NEXT UNIT 688. As indicated, DECIDE TYPE OF NEXT UNIT 688 begins with decision module CURRENT UNIT ENDED BEFORE OPERATOR? 601, which has an affirmative decision branch to NEXT UNIT WILL BE OFF THIS UNIT 603, which in turn EXITS. The negative decision branch from CURRENT UNIT ENDED BEFORE OPERATOR? 601 is to NEXT UNIT WILL BE OFF BASE TO THIS UNIT 605, which again EXITs.

Having described the structure and operation of Parser 148 through flow diagrams, the operation of Parser 148 in parsing the string of character/symbol, operator, parameter and terminator codes residing in EB 128 and defining a present expression or equation into encoded units will next be described by means of example, using the previously described examples of EB 128 encoded strings presented as Equations 4A to 4E. Equations 4A, 4B and 4C, in particular, will be used to illustrate this operation. It should be noted that the following examples present an abbreviated form of parsing by Parser 148 and that there are additional operations, described in a following example, in parsing a string into unit structures. It is necessary, for example, to determine the extended size of the delimitation box, that is, its length and height, and to determine the position of the box on the page.

Referring first to Equation 4A, shown in FIG. 4A in both its visual representation and in its encoded form as a string in EB 128, the encoded form of Equation 4A contains four code words, that is, [x], [op-subscr], [2] and [PRET], which appear in that sequence in EB 128.

For Equation 4A, Parser 148 executes the following sequence of operations to parse this string into units:

Start and initialize a new unit, including a new US 136;

Check the next word; this word is the character code for "x" and no update is required for the state of the string; as the first character of the string, it is automatically placed into the unit; increment to the next word of the string;

Check the next word; this word is an operator code, [op-supscr], and as a superscript operator determines a break in the unit, that is, signals the start of a new unit; place a flag in the present unit structure to indicate that a superscript is attached to the present unit; increment to the next word of the string;

Start and initialize a new unit, including a new US 136;

Check the next word; this is a character code for "2" and no update is required for the state of the string; as the first character of the unit's string, it is automatically placed in the unit; increment to the next word of the string;

Check the next word; this is a terminator operator code [PRET], a code that again determines a break in the unit as a termination of the unit back to the level of the preceding level; increment to the next word in the string and exit back to the previous level;

Detect the end of the text; text parsing is completed.

Referring to Equation 4B, this equation contains six code words, that is, [op-Insplt], [p-1], [x], [PRET], [y] and [PRET], and demonstrates the use of the line split operator to generate a fraction.

For Equation 4B, Parser 148 executes the following sequence of operations to parse this string into units:

Start and initialize a new unit, including a new US 136;

Check the next word; this is an operator code [op-Insplt] for a line split; get the next following word to obtain the operator's parameter, [p-1], and place the parameter character into the unit; increment to the next word, that is, to the operator code;

Check the next word; that is, the operator code for the line split; the parameter indicates that this line split is to be a fraction, that is, of two lines with a fraction line between; write the definition of this unit in the US 136 to have two units as "children" to the present "parent" unit; increment to the next word;

Start and initialize a new unit, including a new US 136; this is the unit for the first line of the fraction line split, that is, the numerator;

Check the next word; this is the code for the character "x"; no update is required for the state of the string; as the first character of the unit, it is put in the unit automatically; increment to the next word;

Check the next word; it is a terminator operator code [PRET] that determines a break in the unit as a termination of the unit back to the next higher level; a pseudoreturn can break lines; increment to the next word and exit back to the previous level;

Start and initialize a new unit, including a new US 136; this unit is the second line in the line split, the denominator;

Check the next word; it is a character code for "y"; no update is required for the state of the string and as the first character of a new unit it is placed in the unit automatically; increment to the next word;

Check the next word; this is a terminator operator code [PRET] and determines a break in the unit as a termination of the unit back to the next higher level; increment to the next word and exit back to the previous level;

Detect the end of the text; text parsing is completed.

Referring finally to Equation 4C in FIG. 4C, this equation contains fifteen code words which are parsed as above and accordingly will not be described in full detail. It should be noted, however, that this equation contains four units, that is, the character groups or strings "123", "xyz", "a" and "bc", and a prefix operator [op-presupscr] operating upon the "a". Because of this operator, "a" is not a part of either the first string, "123", or the last string, "bc". That is, the prefix operator separates the unit containing "a" from the units containing "123" and "bc".

Before considering a more complex and complete example of the parsing of an encoded equation and the construction of the corresponding USs 136, certain previously described factors should be reviewed. First, there are certain factors which must be determined and retained for each unit is order to generate a displayable representation of the units and equation. Among these are the properties of the unit, where to draw the unit and how the unit relates to other units.

The properties that must be defined for the current environmental state of each unit include, for example, the current font and current resize level. The starting position of the current unit in EB 128, the position of the first character and the length of the encoded unit string in EB 128 must also be determined and retained; this information allows access into the encoded unit in EB 128 so that the unit may be edited and updated. Next, the information that defines the extent and location of the unit must be calculated and stored. The required extent and location values include the maximum and minimum x and y values and maximum length of the unit. It should be noted that these values are calculated with the assumption that the first character of the unit starts at geographic location 0,0; this allows the baseline of the character to be located anywhere upon the page or line, including upon line fraction increments.

It should be further noted that certain information is required to locate a line, that is, a sequence of units, relative to other lines on the page. These include the current resize and font and the starting location and number of characters in EB 128, thereby allowing access into EB 128 to edit and update the line data. It should be noted that character information is not required for a line. Finally, information regarding the dimensions and location of the line must be determined and stored; this information is stored in the same structure is the unit information, that is, in USs 136.

Finally, as previously described, the line or lines of equation or expression are displayed to the user in one or more "screens". For these purposes, a screen in regarded as a higher order line, that is, as a form of implicit line split, and allows the display or printing of the equation to begin "off screen" in case a current line is split into so many pieces that that it spans more than one screen. The start position and current location of the screen must thereby be determined and stored. It should be noted that the screen start location may be off the actual displayed screen, and the current location indicating actual position on the screen will thereby indicate where display or printing will actually start.

As previously described, the resolution of encoded unit to generate unit structures and the construction of unit structures, that is, USs 136, containing the above described information is performed by Parser 148. In performing these operations, Parser 148 effectively makes three "passes" through the encoded units and corresponding USs 136. In this regard, the USs 136 may be considered as comprising a "tree" structure wherein the USs 136 are linked together, by the pointers residing in Structural Pointers Groups 514 of the USs 136, in a structure reflecting the logical and physical relationships of the units to each other individually and as elements in the lines, and thereby reflecting the relationships of the lines to one another. Parser 148 makes a first "pass" along the tree, following each "branch" to each of the units in turn to parse the units and construct their corresponding USs 136, including determining the extents and properties of the individual units. Parser 148 then makes a second "pass" in the reverse direction along the branches to determine their maximum y (vertical) dimensions. Finally, Parser 148 makes a third "pass" in the same direction as the first to determine the locations of the units on the page and in the lines thereof. In a last, fourth pass, Parser 148 reads and reads the unit information to VDI 150 for display.

It should be noted, with respect to the following description, that Parser 148 may follow either of two valid paths in making passes through the tree of units. Firstly, Parser 148 may make each pass through the tree as a whole. That is, in the first pass Parser 148 would start at the beginning and follow each branch to its tip, or last unit. In the second pass, Parser 148 would start at the tip of each branch and follow the branches back to the start and, in the third pass, follow the same path as in the first, that is, from the start to the end of each branch in turn. Secondly, and alternatively, Parser 148 could make all three passes for each branch in turn before going on to the next branch. These methods of passing through the tree of units could respectively be called "tree as a whole" and "branch at a time". In the following example, the "tree as a whole" method is illustrated as being the most easily understood. In the presently preferred implementation, however, the "branch at a time" method is used.

This operation of Parser 148 will now be illustrated with the aid of Equation 4E as represented in FIG. 4E. As previously described, this equation takes the encoded form in EB 128 of:

[e][op-supscr][2][x][PRET][y][+]...

[op-resizoncntr][p-+2][(][op-resizoncntr]...

[p--2][op-Insplt][p-1][2][+][y][PRET]...

[1][+][x][PRET][op-resizoncntr][p-+2][)]...

[op-resizoncntr][p--2][PRET]

The example contains 28 words and contains the units "e", "2x", "y+(", "2+y", "1+x" and ")". As described, the units will be constructed on the first pass and the size of each unit determined; on the second pass their maximum y dimensions will be determined, and on the third pass their actual locations will be fixed and they will be displayed. It should be noted that, for the purposes of the following illustration, the standard character height and width will be assumed to be 10 "units".

Parser 148 will then execute the following steps, which, being similar to those previously described, are expressed in abbreviated form:

Start and initialize the first unit (unit 1), including the US 136;

Get [e]; add into unit 1; determine maximum (max) and and minimum (min) x and y extents (max x, min x; max y, min y) to be (0, 7; 0, 10);

Get [op-supscr]; end current unit and start next unit (unit 2);

Get [2]; add into unit 2; max/min extent=(0, 3.5; 0, 5) (note that scripts are half standard height);

Get [x]; no terminator operator comes next so add "x" into present unit; max/min extent=(0, 7; 0, 5);

Get [PRET]; terminate unit;

Start new unit (unit 3);

Get [y]; add "y" into unit 3; max/min extent=(0, 7; 0, 10);

Get [+]; no terminator operator follows next, so add "+" into unit 3; max/min extent=(0, 13; 0, 10);

Get [op-resizoncntr]; prepare to change current environment, that is, resize characters;

Get [p- +2]; change current environment (state) for characters to be 2 standard characters high, that is, 1+(2*½) characters high;

Get [(]; not terminator next so add "(" to unit 3; max/min extent=(0, 23; 0, 15);

Get [op-resizoncntr]; prepare to change current environment state;

Get [p- −2]; change current environment state to characters one standard character high, that is, reduced by −2 from previous two standard character height;

Get [op-Insplt]; no new characters may go in unit 3; prepare for line split;

Get [p- 1]; loop through the two line split segments and note to place a fraction bar between the lines of the line split;

Start unit 4;

Get [2]; add "2" to unit 4; max.min extent=(0, 7; 0, 10);

Get [+]; no terminator operator follows so add "+" to unit 4; max/min extent=(0, 13; 0, 10);

Get [y]; no terminator operator follows so add "y" to unit 4; max/min extent=(0, 20; 0, 10);

Get [PRET]; terminate unit 4; go to second line of line split;

Start unit 5;

Get [1]; add "1" to unit 5; max/min extent=(0, 6; 0, 10);

Get [+]; no terminator operator follows so add "+" to unit 5; max/min extent=(0, 12; 0, 10);

Get [x]; no terminator operator follows so add "x" to unit 5; max/min extent=(0, 17; 0, 10);

Get [PRET]; terminate unit 5; return to baseline;

Start unit 6;

Get [op-resizoncntr]; prepare to change current environment state;

Get [p- +2]; change environment state for characters 2 standard characters high;

Get [)]; this is the first character or unit 6 so add ")" to unit 6; max/min extent=(0, 10; 5, 15);

Get [op-resizoncntr]; prepare to change current environment state;

Get [p- −2]; change current environment state for characters one standard character high;

Get [PRET]; terminate unit 6; First Pass Completed; Begin Second (Y Dimensions) Pass;

Define Max Y dimensions for unit 6; (−5, 15);
Define Max Y dimensions for unit 5; (0, 10);
Define Max Y dimensions for unit 4; (0, 10);
Define Max Y dimensions for unit 3; (−5, 15);
Define Max Y dimensions for unit 2; (0, 5);
Define Max Y dimensions for unit 1; (−5, 15); Second Pass Completed; Begin Third (Locate) Pass;

Start at tip of page as (0, 0); all extents must be justified to top of page to be on the page fully without extending outside of the logical page; this operation is performed before mapping onto the screen;

Locate/Display unit 1 at (0, 15); this brings the max Y dimension within the page;

Locate/Display unit 2 at (7, 8); this positions the script according to its location with respect to the base character "e";

Locate/Display unit 3 at (14, −15); this positions unit 3 after unit 2, the script unit;

Locate/Display unit 4 at (37, −10); unit 4 is the line split numerator unit and is positioned over the denominator unit;

Locate/Display unit 5 at 38.8, −20); the non-even location coordinates arise from the centering of the terms in the fraction; this locates numerator unit 5;

Locate/Display unit 6 at (57, −15); the final ")" need not be located as the location follows automatically; Parser 148 Operations Completed.

Finally, an abbreviated summary of the data stored in the unit structures, that is, USs 136, corresponding to units 1 to 6 of the present example are tabulated in FIG. 7 for each unit of the example.

Having described the data structures and mechanisms directly associated with the text to be created and edited, certain data structures used by the text editing system in the text creation and editing processes will be described next below, followed by descriptions of certain text creation and editing operations.

E. DETAILED DESCRIPTION OF EDITOR OPERATION DATA STRUCTURES (FIGS. 8A AND 8B, 9, 10 AND 11)

As previously described, in addition to the above described data structures directly associated with the text, the present system includes certain data structures which are associated with the overall operation of the system, including the text creation and editing processes. As will be described below, these system data structures include, but are not limited to, a System State Structure (SSS) 160, one or more Line Data Structures (LDSs) 162, one or more Screen Data Structures (SDSs) 164 and one or more Insert/Hide Data Arrays (IHDAs) 166.

As described, SSS 160 contains information relating to the present state of operations of the editor and used by the editor in performing the current operation or operations. LDS 162 in turn contains information relating to a present line being operated within while SDS 164 contains information relating to the present screen. Finally, IHDA 166 contains information relating to the insert and Hide editing operations, which will be described in further detail below.

E. 1 SYSTEM STATE STRUCTURE (SSS) 160 (FIGS. 8A AND 8B)

Referring first to System State Structure 160, a diagrammic representation of SSS 160 is shown in FIG. 8A and 8B, the figure being presented in two sheets because of the number of elements appearing therein. As indicated therein the information fields of SSS 160 are structured into eleven major groups. These groups include Profiles 802, Font Information 804, Equation Information 806, Current Screen 808, Current Operational State 810, Display State 812, Current Environment 814, Current Functional State 816, Location Values 818, Parameters 820, Screen Dimensions 822 and Unit Information Group 887 (note: reference number out of sequence due to editing.). These groups of fields, and the contents of each field, will be described below in the order named. The purposes of certain fields will be apparent from their descriptions and from the previous descriptions of the text editor. The purposes and operations of certain other fields will be described in following descriptions of certain editor operations.

As indicated, the information fields of SSS 160 include, but are not limited to:

PROFILES GROUP 802

SYSTEM PROFILE POINTER 824—a field containing a pointer to information identifying the character/symbol fonts presently available in the system and to the presently available keyboards, that is, the sets of fonts which may be associated with the keys of KB 144;

SYSTEM DOCUMENT PROFILE POINTER 825—a field containing a pointer to the default document profile; and, DOCUMENT PROFILE POINTER 826—a field containing a pointer to DP 126;

FONT INFORMATION GROUP 804

FONT MAP 827—a field containing the names of the sub-fonts presently available;

KEYBOARD 828—a field containing a list of keyboard names and a mapping of the available sub-fonts to KB 114 for each keyboard;

CHARACTER PROPERTIES 829—a field identifying the properties of certain characters, such as whether a given character is a strikeover character, a diacritic and so on; and, FONT IDENTIFICATION 830—a field containing information linking VDI 150 to the available sub-fonts so that VDI 150 is informed, for each character to be displayed, which sub-font will provide the character;

EQUATION IDENTIFICATION GROUP 806

EQUATION NAME 831—a field containing a pointer to the name of the equation or expression currently being created or edited;

EQUATION FILE NAME 832—a field containing a pointer to the name of the file containing the equation or expression currently being operated upon;

CHARTER FILE NAME 833—a field containing a pointer to the name of a file in which the equation file resides; and, EQUATION EXTENT 834—a field containing the physical dimensions, width and height, allocated for present equation or expression in a document in which the equation or expression is to appear;

THIS EQUATION 835—a field containing a pointer to the start of EB 128;

CURRENT SCREEN GROUP 808

SCREEN DATA POINTER 836—a field containing a pointer an array of current screens, that is, to the array of SDSs 164;

CURRENT SCREEN 837—a field containing an index into the array of screens pointed to by the SCREEN DATA POINTER 836 pointer and identifying, from the array of screens, the screen presently being displayed, that is, the SDS 164 of the current screen;

NUMBER OF LINES 838—a field containing the number of lines in the present screen;

LINE DATA POINTER 839—a field containing a pointer to an array of lines, that is, to an array of LDSs 162, in the present document;

CURRENT LINE INDEX 840—a field containing an index into the array of lines pointed to by LINE DATA POINTER 839 and identifying, in the array of lines, the line currently being operated upon, that is LDS 162 of the current line;

AVAILABLE UNIT 841—a field containing an index to the next available, unused US 136 in LUS 130;

UNIT DATA POINTER 842—a field containing a pointer to an array of present USs 136 in LUS 130; and, CURRENT UNIT DATA POINTER 843—a field containing a pointer to the US 136 presently being operated within or upon;

CURRENT OPERATIONAL STATE GROUP 810

CURRENT KEYBOARD 844—a field identifying the current keyboard;

CURRENT KEYSTROKE 845—a field containing the current keystroke code input;

PREVIOUS KEYSTROKE 846—a field containing the previous keystroke code input;

AUTOMATA INSTATE 847—a field defining the present or input state of the editor (automata);

AUTOMATA INPUT 848—a field defining the present input to the editor (automata);

AUTOMATA FUNCTION 849—a field identifying the function presently being executed by the editor (automata);

AUTOMATA FUNCTION RETURN 850—field identifying the expected return from the function presently being executed by the editor (automata); and, CURRENT USER OPERATION 851—a field identifying the present operation selected by the user of the editor;

DISPLAY STATE GROUP 812

CURRENT CHARACTER BUFFER POSITION 852—a field containing the offset into EB 128 of a current character;

CURRENT CHARACTER BUFFER BEGINNING 853—a field containing the offset into EB 128 of the beginning of data related to the current character;

CURRENT CHARACTER BUFFER END 854—a field containing the offset into EB 128 of the end of data relating to the current character;

CURRENT BEGINNING OF TEXT 855—a field containing the offset from the start of EB 128 of the start of editable text;

CURRENT END OF TEXT 856—a field containing the offset from the start of EB 128 of the end of the present text, that is, to the last used position in EB 128, thereby indicating the start of the available space for new EU 134's as at the next location after that indicated by CURRENT END OF TEXT 856;

END OF UNUSED BUFFER 857—a field ocntaining the offset from the start of EB 128 of the last available space in EB 128;

CURRENT BUFFER POSITION 858—a field containing the offset from the start of EB 128 of the cursor, that is, to the next position to be operated upon;

CURRENT CHARACTER 859—a field containing the code for the current character;

CURRENT CHARACTER ATTRIBUTE 860—a field indicating whether the current character is a diacritic character;

CHARACTER POSITION 861—a field containing the absolute coordinates of the position of a character on the current page, usually the current character;

OVERSTRUCK CHARACTER 862—a field for holding a character which has just been overstruck;

OVERSTRUCK CHARACTER FLAG 863—a field indicating whether the visual length of a unit has changed when the characters of the unit have changed, for example, in an overstrike;

CHARACTER IN UNIT FLAG 864—a field containing a flag indicating whether the current character belongs in the current unit rather than the next unit; and, CURRENT CURSOR POSITION 865—fields containing the absolute x and y start and end points of the cursor on the page;

CURRENT ENVIRONMENT GROUP 814

CURRENT FONT ID 866—a field identifying the current font;

CURRENT SIZE ON BASELINE 867—a field specifying the number of steps by which the environment must change the size of text around the baseline;

CURRENT SIZE AROUND CENTER 868—a field specifying the number of steps by which the environment must change the size of text around center;

CURRENT ITALIC STATE 869—a field containing a flag indicating whether the text is in italic; and, CURRENT SCRIPT DEPTH 870—a field specifying the number of levels of script the current position is from the baseline;

CURRENT FUNCTIONAL STATE GROUP 816

INSERT LEVEL 871—a field containing the number of levels of inserts to this point;

INSERT POINTS POINTERS 872—a field containing a pointer to an array of IHDAs 166, one for each insert, hide, new script, or inserted linesplit;

NOTE: the following four fields are used to delimit, within EB 128, a portion of text bounded by two visually displayed characters respectively referred to as the begin delimit character and the end delimit character; it should be noted that the two ends may be coincident, that is, refer to the same character or symbol;

BEGIN DELIMIT 873—a field containing the offset from start of EB 128 of the first code in EB 128 that is associated with the begin delimit character;

END DELIMIT 874—a field containing the offset from start of EB 128 to the last code in EB 128 that is associated with the end delimit character;

BEGIN DELIMIT END POSITION 875—a field containing the offset from start of EB 128 to the last code in EB 128 that is associated with the begin delimit character; and, END DELIMIT END POSITION 876—a field containing the offset from start of EB 128 of the last code in EB 128 that is associated with the end delimit character;

LOCATION VALUES GROUP 818

CHARACTER TO POSITION TO 877—a field containing an offset to a position in EB 128; used by the cursor and other functions;

LOCATE TYPE 878—a field identifying the purpose of the value presently in CHARACTER TO POSITION TO 877; and, REQUIRED REFRESH 879—a field indicating what portion of the present screen must be redrawn due to a present operation;

PARAMETERS GROUP 820

CURRENT VECTORS 880—two x-y vectors defining two adjacent edges of the CURRENT CHARACTER BOX 881;

CURRENT CHARACTER BOX 881—a field defining the box containing the current character, symbol or diacritic; and, CURRENT BASE BOX 882—a field defining the current base box, that is, the base character or symbol, and all diacritics associated with or added to the base character or symbol to that point; and,

SCREEN DIMENSIONS GROUP 822

SCREEN EXTENTS 883—a field defining the x and y dimensions of the screen relative to 0,0 on the screen, rather then absolute on the page;

FORMAT LINE HEIGHT 884—a field containing the height of the format line; used as a correction factor in display in that the first line on the screen must begin below the format line;

FORMAT CHARACTER WIDTH 885—a field containing the width of the tab character; used as a standard measure to keep all characters in a format line of equal width; and, FORMAT SCREEN Y POSITION 886—the y coordinate of the format line one the screen.

UNIT INFORMATION GROUP 887

LOCATION OF EARLIEST OVERSTRIKE UNIT 888—a field containing the location of the unit containing the first overstrike in the line;

EQUATION BASE CHARACTER DESCENDER 889—a field containing the descender for the default size of the character for the equation;

UNFINISHED LINE SPLIT ON LAST LINE 890—a field used to determine whether the current insert level may be closed;

DEFINED ALIGNMENT STEP NUMERATOR 891—a field containing a numerator defining the size of the division upon which to align text line baselines, in pixels;

DEFINED ALIGNMENT STEP DENOMINATOR 892—a field containing a denominator defining the division upon which to align text line baselines, in pixels APPEND BLOB DIMENSIONS 893—fields containing the x and y coordinates of the append blob if the append blob is on the current screen; and APPEND BLOB DIMENSIONS 894—fields containing the x and y dimensions of the append blob if the append blob is on the current screen.

E.2 LINE DATA STRUCTURE (LDS) 162 (FIG. 9)

As previously described, EDS 158 includes an array of one or more LDSs 162 wherein each LDS 162 contains fields containing information pertaining to a present line being operated upon by or with the editor, there being an LDS 162 for each such line.

Referring to FIG. 9, therein is presented a diagrammic representation of an LDS 162. As indicated, the fields of an LDS 162 include, but are not limited to:

START POSITION 902—a field containing the offset into EB 128 of the first data element, that is, character or operator code, that starts the first unit of a line;

START UNIT OF LINE POINTER 904—a field containing a pointer to the first unit of the line;

START LOCATION 906—a field containing the x and y starting positions for the section of the line relative to the start of the page; this is the x and y locations of the upper left corner of the line;

LINE DIMENSIONS 908—a field containing the relative dimensions of a line around the line's baseline, rather than around the line's START LOCATION;

FONT 910—a field identifying the font at the start of the line;

FONT RESIZE ON BASELINE 912—a field containing the resizing factor around baseline at the start of the line;

FONT RESIZE AROUND CENTER 914—a field containing the resizing factor around center at the start of the line;

ITALIC FLAG 916—a field containing a flag indicating italics; and,

FORMAT LINE 918—a field containing an index to the format line for this line in EB 128.

E.3 SCREEN DATA STRUCTURE (SDS) 164 (FIG. 10)

As previously described, EDS 158 contains an array of one or more SDSs 164 wherein each SDS 164 contains fields containing information pertaining to the present screen, there being an SDS 164 for each screen of a current document.

Referring to FIG. 10, therein is presented a diagrammic representation of an SDS 164. As indicated, the fields of an SDS 164 include, but are not limited to:

START POSITION 1002—a field containing the offset into EB 128 from start of EB 128 of the first text element of the screen;

SCREEN TOP 1004—a field containing the absolute Y position on the page of the top of the screen;

START LOCATION 1006—a field containing the absolute x and y positions on the page of the start of the screen;

CURRENT LOCATION 1008—a field containing the current relative x and y positions of the screen origin (O,O); not used in the present implementation of the editor but planned for possible use in a later implementation;

FONT 1010—a field containing an identification of the font being used;

FONT RESIZE ON BASELINE 1012—a field containing the resizing factor on baseline for the present string;

FONT RESIZE AROUND CENTER 1014—a field containing the resizing factor around center for the present string;

ITALIC FLAG 1016—a field containing a flag indicating italics; and,

FORMAT LINE POINTER 1018—a field containing an index to the format line for the present screen.

E.4 INSERT/HIDE DATA ARRAY (IHDA) 166 (FIG. 11)

As previously described, EDS 156 includes one or more IHDAs 166 wherein each IHDA 166 contains fields containing information relating to the insert and Hide editing operations, which will be described in further detail below, and wherein there is an IHDA for each insert or hide operation.

Referring to FIG. 11, therein is presented a diagrammic representation of an IHDA 166. As indicated, the fields of an IHDA 166 include, but are not limited to:

LOCATION FROM END 1102—as will be described in the following, the string of character/symbol, operator, parameter and terminator codes in EB 128 is broken at the point where an insert or hide operation is to be performed, the portion of the string following that point is "moved" to the end of EB 128, the insert performed, and the "moved" portion of the string moved back from the end of EB 128 and to the end of what was inserted; the moved portions of the encoded string are thereby stored in EB 128 so as to fill EB 128 from the end of EB 128 forward; LOCATION FROM END 1102 is a field containing a pointer to the start of moved text relative to the beginning of EB 128;

POSITION OF BREAK 1104—a field containing a pointer to the character code position in EB 128 at which an insert or hide is to be performed;

PRESERVATION POSITION 1106—a field containing a pointer to the start of all EB 128 codes related to the character code pointed to by POSITION OF BREAK 1104; for example, a particular character code may have an associated italic operator code which would appear in EB 128 before the character code and which must be "moved" with the character code to be preserved;

INSERT TYPE 1108—a field containing a flag indicating whether the insert break occurred from a script insertion, a regular insert operation, a hide operation, a linesplit or a regular overstrike;

SAVE RESIZE ON BASELINE 1110—a field containing the value of the resize on baseline operator following a script being inserted;

SAVE RESIZE AROUND CENTER 1112—a field containing the value of the resize around center operator following a script being inserted;

BEGINNING OF TEXT 1113—a field containing the starting position of the text that is accessable due to this operation;

PRELOCATION LINE HEIGHT 1114—a field containing the amount of space occupied by the text before the break; used to optimize refreshing of the screen;

POST LOCATION LINE HEIGHT 1116—a field containing the amount of space occupied by the text after the break; used to optimize refreshing of the screen;

PRELOCATION SUBLINE HEIGHT 1117—a field containing the amount of space that the text before the break point takes so the correct amount of space can be detected so that the refresh of the screen may be optimized;

POSTLOCATION SUBLINE HEIGHT 1118—a field containing the amount of space that the text following the break point takes so the correct amount of space can be detected so that the refresh of the screen may be optomized;

NUMBER PRESERVED LINESPLIT RETURNS 1118—a field indicating the number of returns in a linesplit that are being preserved by a hide or insert operation; and, MINOR LAST LINESPLIT 1120—a field containing a flag indicating that the last line in a linesplit had only a simple append "blob" rather than text.

Having described certain of the data structures used by ER 156, the operation of the present editor, together with certain further aspects of the operation of EE 146 and Parser 148 with EB 128 and LUS 130, will be further illustrated by following descriptions of certain editor operations.

F. DETAILED DESCRIPTION OF CERTAIN EDITOR OPERATIONS AND MECHANISMS (FIGS. 12A and 12B, 13A to 13F, 14, 15 and 16A to 16C)

The following will describe certain mechanisms used by the editor in operating upon and with documents by describing certain editor operations which are particularly unique to the present editor. Among these operations will be a description of cursor movement and of the construction of units and lines on a page, including the construction of characters or symbols having attached diacritics. The execution of insert and hide operations will also be described. As will be described, the present editor uses and interacts with both the document data structures and the editor operation data structures in performing these operations, so that the function and operation of these data structures will be further illustrated in the following descriptions of editor operations.

F. 1 CURSOR MOVEMENT (FIGS. 12A AND 12B)

As is well known, text processing systems utilize some form of cursor indicator or symbol which may be moved through the displayed text by the system user to both indicate and select characters and portions of text to be operated upon. It is apparent from the above descriptions and discussions, however, that the cursor operations of the present text editor must differ substantially from those of the conventional text processing systems of the prior art.

That is, in most conventional text processing systems the characters are of generally uniform size and proportion and are located in a screen and document within a uniform, rectangular grid, so that the cursor may be moved from character to character or from any position to any other position merely by incrementing and decrementing its x and y coordinate positions. Certain text processing systems provide proportional spacing of text, but are little more complex in terms of cursor positioning than are the uniform grid systems. The data structures containing the text in most conventional text processing systems is similarly a uniform, linear structure generally containing only character codes and a limited range of displayed control character codes, reflecting the structure of the text itself, and the correlation of screen position to character position is simple and straightforward.

In the types of text with which the present editor is intended to operate, the characters and symbols are not of uniform size or proportion and are not located in a screen or document, or in relationship to one another, in a uniform, predictable or regular manner. Similarly, and as described, the text with which the present editor is intended to operate is either multi-dimensional or multi-directional, or both, and the data structure containing the text, while being essentially a string in one aspect, is not necessarily a uniform, linear structure, again reflecting the structure of the text. The cursor may therefore not be moved among character and symbol positions simply by incrementing and decrementing the cursor x and y coordinates within a rectangular, uniform grid and the relationship between cursor position in the screen and cursor position in the text data structure position is neither direct nor simple.

Considering briefly the user interface to the editor, the user indicates positions in the text where editing operations are to be performed, or portions of text upon which editing operations are to be performed, by means of the cursor. The user indicates such positions in the text, or portions of the text, by placing the cursor upon the character/symbol position where the operation is to be performed or upon the character/symbol positions delimiting the portion of text to be operated upon. In order to do so, the user must be able to controllably move the cursor through the text from character/symbol position to character/symbol position.

User control of cursor movement is generally by means of cursor keys on KB 114, which allow the user to select and indicate that the cursor is to move up, down, right or left (or north, south, east or west) through the text relative to its present position. The editor receives these control key inputs and must move the cursor from position to position through both the visual representation of the text on the screen and the text data in EB 128 and LUS 130 in the manner indicated by the user and in such a manner that the position of the cursor on the screen corresponds to the location of the cursor in the text data. The displayed cursor position on the screen indicates cursor position to the user while the cursor position within the text data indicates cursor position to the editing operation routines of the editor.

Considering the movement of the cursor through the text data in the present text editor, as previously described the text data resides in two separate but closely coupled data structures, EB 128 and the USs 136 of LUS 130. As described, EB 128 stores a logical representation of the text in an "encoded" form as a string of character, operator and terminator codes. This string of codes in EB 128 is in turn logically comprised of a string of Encoded Units (EUs) 134, wherein each EU 134 contains a string of character, operator and terminator codes defining a single unit and wherein a unit is defined as a string or group of characters with associated properties that may be positioned in the document as an entity.

LUS 130, in turn, stores information relating to the physical and visual representation of the text. LUS 130 contains, for each unit stored in encoded form in EB 128, a corresponding Unit Structure (US) 136 which contains information required to form a visual representation of the associated unit stored in EB 128. As described, the USs 136 of LUS 130 are not stored as a string but as individual data structures linked through pointers in a manner reflecting the physical and logical relationships of the units comprising the text. Each US 136 is in turn linked to its associated encoded unit in EB 128 through pointers.

It is thereby apparent, from the above description of the document data structure of the present editor, that the editor cursor routines must traverse both the document logical data structure, that is, EB 128, and the document physical data structure, that is, the USs 136, when positioning the cursor in the text and corresponding visual image of the text. The cursor routines must also determine and provide information identifying the physical position of the cursor on the present screen. These operations will be described next below, thereby further illustrating the document and editor operation data structures of the present editor.

The following will first describe cursor location in the document data structures and on the screen for a steady state condition, that is, when the cursor is not moving. The motion of the cursor within a unit will then be described next, followed by a description of cursor movement between units. Finally, cursor movement between lines will be described.

F.1.a Determination of Cursor Position—Static

Considering first the case wherein the cursor is at rest, which is effectively the initial condition for all cursor movement, the present location of the cursor with respect to the data structure in EB 128 is identified by the CURRENT CHARACTER BUFFER POSITION 852, CURRENT CHARACTER BUFFER BEGINNING 853 and CURRENT CHARACTER BUFFER END 854 fields of SSS 160. These fields identify, respectively and relative to the contents of EB 128, the offsets relative to the start of EB 128 of the character code corresponding to cursor position and the locations in EB 128 of the first and last data elements, whether character codes, operator codes, parameter codes or terminator codes, of the encoded unit (EU 134) containing that character. In certain instances, wherein due to an operation being performed, the cursor is not located at a character code in EB 128, the CURRENT BUFFER POSITION 858 field identifies the cursor location in EB 128.

Having identified the location of the cursor relative to the EB 128 data structure, the US 136 corresponding to that EU 134 is identified through SSS 160's CURRENT UNIT DATA POINTER 843 field. As previously described, the US 136 contains all information required to construct a physical and visual representation of the unit in which the cursor is located. The cursor routines will then call Parser 148 which will in turn read the encoded unit information from EB 128 and the unit structure information from the corresponding US 136 to determine the physical location and dimensions on the page of each character or symbol in the unit.

As will be described in a following description of the construction of diacritics, ER 156 includes routines which in turn use this information to construct a "current character box" and a "base box" which describe the physical dimensions on the page of a "box" containing, respectively, a current character and that current character with all extensions, such as attached diacritic characters. In this case, the "current character" is the character at the cursor position, so that the values of the "box" which determine the location and dimensions of the lower edge of the "box" serve to identify the location and dimensions of the cursor on the page. This information may in turn be stored in SSS 160's CURRENT CURSOR POSITION 865 field.

Having now determined the locations of the cursor relative to the data structures in both EB 128 and the USs 136, and the absolute location and dimensions of the cursor on the page, the position and dimensions of the cursor on the present screen must be determined through use of the information contained in LDSs 162. As described above, each LDS 162 contains information regarding a line relative to the present page.

The present line, that is, the LDS 162 of the present line, is located through SSS 160's CURRENT LINE POINTER 840 field. The START POSITION 902, START UNIT OF LINE POINTER 904 and START LOCATION 906 fields of the present LDS 162 may then be used, in conjunction with the above described information identifying the absolute location and dimensions of the cursor on the page, to determine the location and dimensions of the cursor on the present screen.

F.1.b Cursor Movement Within a Unit

Having described how the position and dimensions of the cursor are determined relative to the EB 128 and LUS 130 data structures and to the present screen for static case, the determination of these factors for the case of cursor movement within a unit will be described next below. It should be noted that, for the purpose of the following description, it will be assumed that the particular unit which the cursor is traversing contains more than one character or symbol; if the unit contains only one character or symbol, the case becomes one of cursor movement between units, which will be discussed in a following description.

In this case, the editor must first locate the next character code in the unit in EB 128 in the direction indicated by the user through the cursor keys in KB 114, and must then construct the "box" of that character or symbol as described above. As described, the character/symbol, operator, parameter and terminator codes comprising a given unit residue adjacent to one another in a string in that unit's EU 134.

As described above, the present location of the cursor with respect to the data structure in EB 128 is identified by the CURRENT CHARACTER BUFFER POSITION 852, CURRENT CHARACTER BUFFER BEGINNING 853, CURRENT CHARACTER BUFFER END 854 and CURRENT BUFFER POSITION 858 fields of SSS 160. These fields respectively identify the offsets, relative to the start of EB 128, of the character code corresponding to the cursor position and of the first and last data elements, whether character codes, operator codes, parameter codes or terminator codes, associated with that character code.

Assuming, for example, that the user has instructed that the cursor is to be moved to the next character after the CURRENT CHARACTER BUFFER END 854, that is, to the right in the string of codes, the desired cursor movement, that is, increment to the right by one character/symbol, is stored in CHARACTER TO POSITION TO 877 field and the reason for the move stored in LOCATE TYPE 878 field.

As described above, the initial cursor position information is stored in the CURRENT CHARACTER BUFFER POSITION 852, CURRENT CHARACTER BUFFER BEGINNING 853, CURRENT CHARACTER BUFFER END 854 and CURRENT BUFFER POSITION 858 fields of SSS 160. The offset initially residing in the CURRENT CHARACTER BUFFER BEGINNING 853 field is replaced by the offset residing in the CURRENT CHARACTER BUFFER END 854 field, incremented by one. The new offset in the CURRENT CHARACTER BUFFER BEGINNING 853 field thereby points to the first code associated with the next character/symbol code; this first code may be the next character/symbol code itself, or an operator code. Parser 148 will then read onwards from this point to find the offset value to be placed in the CURRENT CHARACTER BUFFER POSITION 852 field, to point to the next character/symbol code, and to find the last code associated with the next character/symbol code and to place the appropriate offset into the CURRENT CHARACTER BUFFER END 854 field. The offset written into CURRENT CHARACTER BUFFER POSITION 852 field may also be written into the CURRENT BUFFER POSITION 858 field.

If the user had instructed the cursor to be moved leftwards through the string of codes in EB 128, the operation would differ from that described just above. In this case, the editor would move to the beginning of the current EU 134, as determined by the STARTPOS 516 and STARTCHAR 518 fields of the corresponding US 136. The editor would then read the codes of the EU 134 from the beginning until it reached a character code whose CURRENT CHARACTER BUFFER END 854 was one less than the CURRENT CHARACTER BUFFER BEGINNING 853 of the character from which the cursor started. The editor would then determine the CURRENT CHARACTER BUFFER POSITION 852 and CURRENT CHARACTER BUFFER BEGINNING 852 corresponding to this new CURRENT CHARACTER BUFFER END 854, with the new CURRENT CHARACTER BUFFER POSITION 852 corresponding to the new cursor location and being written into the CURRENT BUFFER POSITION 858 field.

It should be noted that this method of moving the cursor backwards through EB 128 is selected to provide full generality in terms of the code structures and sequences in EB 128, thereby allowing the codes and their sequences in EB 128 to be modified without requiring extensive modification to all functions of the editor. In an alternated embodiment, the traversal of the cursor backwards through EB 128 may be performed in a manner similar to that described above for forward movement, that is, to the right. In this case, the offset in the CURRENT CHARACTER BUFFER END 854 field would be replaced with the offset from the CURRENT CHARACTER BUFFER BEGINNING 853 field decremented by one, thereby pointing to the end of the previous group of codes associated with the previous character/symbol code. Parser 148 would then read backwards, or leftwards, from from this point to find the new offsets to be placed in the CURRENT CHARACTER BUFFER POSITION 852, CURRENT CHARACTER BUFFER BEGINNING 853 and CURRENT BUFFER POSITION 858 fields.

The above steps have identified the new cursor position relative to the EB 128 data structure. The US 136 corresponding to that EU 134 remains the same and is identified through SSS 160's CURRENT UNIT DATA POINTER 843 field. As previously described, the US 136 contains all information required to construct a physical and visual representation of the unit in which the cursor is located. The cursor routines again call Parser 148 to read the encoded unit information from EB 128 and the unit structure information from the corresponding US 136 to determine the physical location and dimensions on the page of the character or symbol in the unit at the new location of the cursor.

As will be described below, ER 156 constructs a "current character box" and a "base box" which describe the physical locations and dimensions on the page of the "box" containing the character or symbol at the new cursor position. Again, the values of the "box" which determine the location and dimensions of the lower edge of the "box" identify the location and dimensions of the cursor on the page and this information may in turn be stored in SSS 160's CURRENT CURSOR POSITION 865 field.

Having now determined the new locations of the cursor relative to the data structures in both EB 128 and the USs 136, and the absolute location and dimensions of the cursor on the page, the position and dimensions of the cursor on the present screen are again determined through use of the information contained in SDSs 164. As described above, each SDS 164 contains information regarding a screen relative to the present page. The present screen, that is, the SDS 164 of the present screen, is located through SSS 160's CURRENT SCREEN POINTER 837 field. The SCREEN TOP 1004, START LOCATION 1006 and CURRENT LOCATION 1008 fields of the present SDS 164 may then be used, in conjunction with the above described information identifying the new absolute location and dimensions of the cursor on the page, to determine the new location and dimensions of the cursor on the present screen.

Figure 12A:
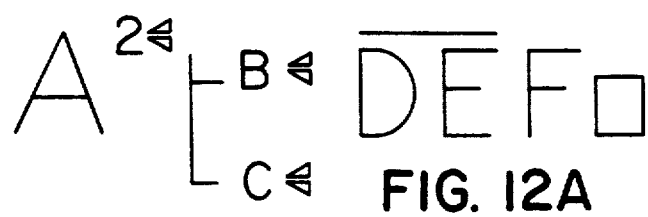
FIGS. 12A and 12B illustrate the traversal of a cursor through the unit structures of an exemplary expression.
Figure 12B:
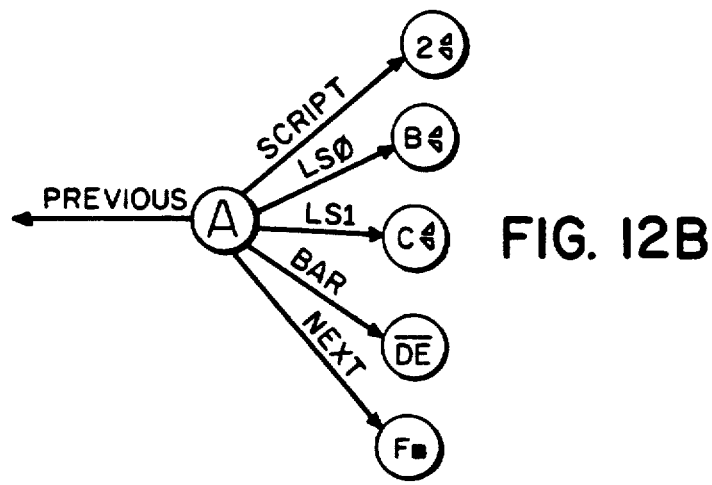

F.1.c Cursor Movement Between Units (FIGS. 12A and 12B)

The movement of the cursor from one unit to another will occur, for example, if the character/symbol at which the cursor is presently located is the last character/symbol in the unit in the direction in which the cursor is to move, or, in a particular instance of this case, if the unit has only one character/symbol. In further example, the cursor may also move from one unit to another if the cursor is directed to move in a direction other than along the baseline of the original unit, for example, from a character to a script attached to that character.

As described above, in the initial step the inputs representing the direction the cursor is to move and the reason for the move are stored, respectively, in the CHARACTER TO POSITION TO 877 and LOCATE TYPE 878 fields.

The editor must then determine whether there is another character/symbol code within the present unit in the direction in which the cursor is directed to move, that is, whether the move is within a unit or from one unit to another. The editor performs this operation by comparing the position and extent within EB 128 of the group of codes comprising the character/symbol code at the present location of the cursor and any other codes associated with that character/symbol code to the position and extent within EB 128 of the unit containing that character/symbol code.

Again as described above, the position and extent of the group of codes which include or are associated with the character/symbol code at the current cursor position are identified with respect to the data structure in EB 128 by the CURRENT CHARACTER BUFFER POSITION 852, CURRENT CHARACTER BUFFER BEGINNING 853 and CURRENT CHARACTER BUFFER END 854 fields. The position and extent within EB 128 of the unit containing that character/symbol code are identified by the STARTPOS 516, STARTCHAR 518 and ELTLENGTH 520 fields of the corresponding US 136.

If the comparison indicates that the unit contains further codes in the direction of cursor movement than those contained within the group of codes which include or are associated with the character/symbol code at the current cursor position, the editor will search for further character/symbol codes in that direction, as described above with respect to cursor movement within a unit. If the editor finds further character/symbol codes within the unit in the direction of cursor movement, the editor will move the cursor to that next character/symbol code in the manner described above with respect to cursor movement within a unit.

If the comparison indicates that there are no more character/symbol codes in the unit in the direction of cursor movement, or if the indicated cursor movement is not along the baseline of that unit, then the cursor is to move to another unit and that unit must be located. As previously described, each unit's US 136 contains a group of pointers to all other units, that is, USs 136, associated with the unit. The USs 136 and the pointers thereby effectively comprise a tree of USs 136 linked by the pointers thereby effectively comprise a tree of USs 136 linked by the pointers and the editor may locate a next unit by traversing this tree of USs 136, following the pointers linking the USs 136.

Before discussing the mechanics of cursor movement through the tree of USs 136, it is necessary to describe the cursor key convention adopted in the present implementation of the editor as the cursor convention will determine, in part, the path traversed through the tree of USs 136 by the cursor. The cursor key convention, in turn, will depend upon the particular structure of the text being operated upon. It is also necessary to consider the user interface to the system through KB 114, both generally and with particular regard to the editor, as this interface will effect all operation of the user with regard to the editor, including cursor movement.

Considering first the effects of the text structure upon the user interface in general and cursor movement in particular, in English text, for example, lines of text run horizontally across a page from left to right and successive lines appear on the page from top to bottom. Because of this text structure, the standard keyboard for use with text following this general convention is provided with four cursor keys, that is, a right (east) key, a left (west) key, an up (north) key and a down (south) key. In general, the right (east) and left (west) cursor keys are used to move the cursor right and left across a line and the up (north) and down (south) keys are used for vertical movement between lines. In other conventions, for example wherein the lines of text run from top to bottom on the page and successive lines appear from right to left, the up and down cursor keys would cause cursor movement along the lines of text and the right and left keys would cause movement between lines. The following descriptions and examples will assume that the editor is operating with standard English text structure, that is, wherein lines of text run horizontally across a page from left to right and successive lines appear on the page from top to bottom. It will be apparent to those of ordinary skill in the art that the editor may be readily adapted to other text structures, for example, by reassignment of the cursor keys as described above.

In the present convention, therefore, the general rule is that the right (east) and west (left) cursor keys direct movement respectively forward or backward along the present baseline while the north (up) and south (down) keys correspondingly direct upwards and downwards movement of the cursor from line to line, including movement from line to line within a linesplit.

Further considering movement along a baseline, as directed by the right and left cursor keys, the present baseline along which the cursor moves may be that of the present line or that of a script or a line of a linesplit. If the cursor reaches the end of the current baseline by movement along the baseline, the cursor will move to the next lower or higher baseline, depending upon the direction of cursor movement. If the cursor is within a line of a linesplit, the next lower or higher line may be the next lower or higher line of the linesplit. If, however, there is not next lower or higher line in the linesplit to go to, the cursor will move to the next following or preceding unit. Finally, if the cursor is within a script unit and reaches the end of the script baseline, the cursor will move to the base unit of the script unit.

As described above, the up and down cursor keys direct the cursor to move vertically from line to line. If the cursor is within a linesplit, the up and down keys will cause the cursor to move from line to line within the linesplit. If, however, the cursor is moving within a linesplit and reaches the top or bottom line, the next vertical move will be, respectively, to the next higher or lower line on the page. Again, script units are an exception to this general rule; if a vertical move in either direction is indicated while the cursor is in a script unit, the cursor will move to the base unit of the script unit.

In addition to the usual text structural elements encountered, for example, in standard English text, the present editor allows the the creation and editing of script units and diacritic characters, as well as linesplits and bar units. These text structures, which are unusual in terms of standard English text, effect both the general user interface to the system and editor through KB 114 and, in particular with regard to the present discussion, the movement of the cursor. As will be described further below, and as has been described previously, the editor and the editor's cursor mechanism treats script units and diacritic characters differently from linesplits and bar units. The case of script units will be discussed next below, followed by a further description of general cursor movement, which includes the cases of linesplits and bar units. The particular case of diacritics will be discussed separately in a following description of the construction of characters with associated diacritics.

Referring first to the script unit exception to the general rules of cursor movement described above, movement of the cursor to a script position is directed in a manner similar to that by which the editor is directed to create a script unit. That is, the editor moves the cursor to a script position in the same manner in which the user directs the editor to create a script unit, by means of an operator code entered through KB 114 by the user, the operator code being generated by KB 114 in response to the activation or depression of certain keys thereupon by the user.

As is well known in the art, there are many methods and schemes by which keyboard keys may be the assigned to generate particular input codes to a system. In most systems, the majority of keys are permanently assigned to generate codes corresponding to the most frequently used characters and symbols, such as the alphanumeric characters and numbers and standard symbols seen on most keyboards. Certain other keys may be added to the keyboard and assigned to certain frequently used operations. For example, in a system largely used for word processing, certain additional dedicated function keys may be assigned to generate the input control codes corresponding, for example, to the INSERT, DELETE, PREVIOUS PAGE, NEXT PAGE, PAGE, INDENT COPY and MOVE operations, and so forth. Finally, certain additional programmable keys or combinations of keys may be assigned to certain functions by the program presently being executed.

The present implementation of the present editor is an example of this latter use of certain of the KB 114 programmable function keys. For example, one programmable function key on KB 114 is assigned by the editor to generate a SCRIPT code when actuated by the user. When the SCRIPT key is depressed by itself, a lower script code indicating a presubscript, underscript or subscript, is generated. When the SCRIPT key is depressed in combination with the SHIFT key, an upper script code indicating a presuperscript, overscript or superscript is generated. Having selected either a lower or upper script by use, respectively, of the SCRIPT or SCRIPT and SHIFT keys, the user then selects among the three possibilities in each case by use of the cursor keys. If, for example, the use has selected an upper script, the user then selects between a presuperscript, an overscript or a superscript by actuating, respectively, the left, up or right cursor keys. Similarly, if the user has selected a lower script, the user may then select between a presubscript, an underscript or a subscript by actuating, respectively, the left, down or right cursor keys. The user may direct the cursor to an already existing script position in the same manner, that is, by indicating movement to a lower or upper script position through the SCRIPT or SCRIPT and SHIFT keys, and then movement to a particular upper or lower script position by use of the cursor keys.

Having moved the cursor to a script position, the use may then move along the baseline of the script unit by use of the right and left cursor keys, as described above. The up and down cursor keys do not, however, cause movement to a next higher or lower line. Instead, the actuation of the up or down cursor keys while in a script position will cause the cursor to return to the script's base unit. Having described the general cursor convention of the present editor and an important exception to the general convention, that is, movement to and from script units, the general movement of the cursor between units, including bar units and linesplits, will be further illustrated with the aid of FIGS. 12A and 12B. FIGS. 12A and 12B respectively represent an exemplary portion of a text and a diagrammatic representation of the corresponding tree of USs 136.

Referring first to FIG. 12A, this exemplary portion of text is comprised of 6 units. The first unit contains the character "A". The second unit is a superscript unit from the first unit and contains the character "2"; it should be noted that the terminator operator for the second unit, a pseudoreturn is shown as it may be displayed upon a screen. The third and fourth units are the line units of a linesplit of two lines, the first line unit containing the character "B" and the second containing the character "C". It should be noted that the linesplit operator is indicated as it may appear upon a screen, that is, by a vertical line with two horizontal lines extending to the right and indicating the baselines of the line units of the linesplit and with each line unit terminated by a pseudoreturn. The fifth unit is a bar unit with the characters "D" and "E" with an over-bar. It should be noted with respect to the bar unit that the existance of the bar over the "D" and "E" characters denotes the position of the start and end bar operators as, respectively, just before the "D" and just after the "E". The sixth unit contains the character "F" and the Append Blob, thereby indicating that, at present, further text will be entered following the character "F".

Referring to FIG. 12B, as indicated therein each US 136 of the exemplary portion of text is represented by a circle with each US 136 circle containing a representation of the displayable characters or symbols contained in the unit. The pointers linking the units are indicated by arrows with the name of the pointers, for example, SCRIPT or LINESPLIT (LS) 0 or 1, indicated along the corresponding arrow. It should be noted that the sixth unit, containing the "F" and Append Blob, is the NEXT unit and that the first unit, that is, the unit containing "A", is further shown as having a PREVIOUS pointer to the previous unit, which is not itself shown. It should be further understood that, although not expressly shown, each unit has a PREVIOUS pointer back to the previous unit to that unit. For example, the second unit, that is, the script unit, will have a PREVIOUS pointer back to the first unit, as will the third, fourth, fifth and sixth units. It should also be noted, for purposes of the following discussion, that if the sixth unit, that is, "F", were followed by further text, the sixth unit would have further pointers to the following units, that the Append Blob would appear in one of these following units, and that one of the following units would have a PREVIOUS pointer back to the sixth unit.

Assuming for purposes of discussion that the cursor is initially at the "A" of the first unit and that the user has indicated a rightwards movement of the cursor, that is, forwards through EG 128, the editor must determine the next unit with respect to the first unit, that is, with respect to "A". In terms of the visual display of the text, as illustrated in FIG. 12A, either the second unit, containing superscript "2", the third unit, containing "B", or the or fourth unit, containing "C", could be regarded as the next unit. In terms of the tree structure of USs 136, however, as illustrated in FIG. 12B, any one of the second, third, fourth, fifth or sixth units may be regarded as the next unit.

As described above, cursor movement to and from script units is selected and controlled directly by the user through KB 114, so that the question of whether a script unit is the next unit is resolved directly by the user. Selection among linesplit units, bar units and previous and next units as the next unit for purposes of cursor movement is, however, resolved by the editor in the present implementation of the editor, as described next below.

As previously described, the US 136 of each unit contains pointers to all other units associated with the unit in STRUCTURAL POINTERS GROUP 514. The ordering of the pointers in STRUCTURAL POINTERS GROUP 514 is used by the present editor, together with the direction of cursor movement indicated by the user, to determine which of the units associated with the unit in which the cursor presently resides will be the next unit for purposes of cursor movement. That is, and assuming that the indicated cursor movement is forwards through EB 128 (rightwards in the present example), the editor will read the LINESPLITUNIT 562, BARUNIT 564, NEXTUNIT 566 and PREVUNIT 568 fields of the US 136 of the present unit, in that order, to determine, in each case, whether there is such a unit associated with the present unit. The first associated unit which is found when reading STRUCTURAL POINTERS GROUP 514 of the present unit in the given order is determined by the editor to be the next unit.

When the editor has found the "next" unit through this procedure, the editor will read the appropriate pointer from the current US 136's STRUCTURAL POINTERS GROUP 514, and that pointer will be loaded into SSS 160's CURRENT UNIT DATA POINTER 843 field, the "next" unit then becoming the current unit. The editor will then read that unit's US 136 STARTPOS 156, STARTCHAR 518 AND ELTLENGTH 520 fields and, through Parser 148, will read and parse the corresponding encoded unit, that is, EU 134, from EB 128 to determine the offsets into EB 128 of the first and last data characters and first character/symbol code of the first group of group of codes in that EU 134. This information will then be written into SSS 160's CURRENT CHARACTER BUFFER POSITION 852, CURRENT CHARACTER BUFFER BEGINNING 853 and CURRENT CHARACTER BUFFER END 854 fields to determine the first position of the cursor in the unit the cursor has moved into. The editor then builds the character/symbol "boxes" as described below, and will determine the location and dimensions of the cursor on the page and screen, also as described above. Cursor movement may then continue within the new unit, as previously described, and, if necessary, may continue to another unit, as just described above.

Applying the above described procedure to the present example, an indicated cursor movement to the right from the first unit of FIGS. 12A and 12B, that is, from the "A", would result in a movement to the topmost line unit of the linesplit, that is, to the unit containing "B". If there had been no linesplit associated with the first unit, the editor would have moved the cursor to the "D" of the bar unit and, if there had been no linesplit or bar units, to the "NEXT" unit, which contains "F" and the Append Blob.

Continuing with the present example with the cursor presently located in the topmost line unit of the linesplit, as previously described continued right movement along the baseline of this line unit would eventually read the end of the baseline and the cursor should move down to the next line unit of the linesplit or to the next unit if there is no next line unit in the linesplit. The editor accomplishes this operation by again following the above described procedure. That is, the editor will read the STRUCTURAL POINTERS GROUP 514 fields of the present unit's US 136 in the describe order and will determine the first associated unit to be located to be the next unit. In the present example, the cursor is presently within the US 136 of the topmost line unit of the linesplit and the editor will seek the "next" unit by reading the STRUCTURAL POINTERS GROUP 514 fields of this unit. As illustrated in FIG. 12B and described above, the US 136 of the topmost line unit of the linesplit is the last unit along this branch of the US 136 tree and will contain no pointers except a PREVUNIT 568 pointer back to the first unit. The editor will thereby follow the PREVUNIT pointer back to the US 136 of the first unit and will determine the "next" unit by finding, in the first unit's STRUCTURAL POINTERS GROUP 514, the next available pointer following the pointer to the unit just returned from. This next pointer will, in the present example, be to the second line unit of the linesplit and the second line unit of the linesplit will thereby become the "next" unit moved to be the cursor, as described above. To summarize, when the editor reaches the end of a branch in the tree of USs 136, the editor will follow the previous unit pointer or pointers back to the first available branch point in the tree structure, that is, to the first US 136 having a branch which has not be traversed, and will find and follow that next available branch to find the next unit.

Following this procedure for continued rightward movement of the cursor through the example of FIGS. 12A and 12B, the editor would continue rightward cursor movement to the end of the first unit of the linesplit and then would return to the first unit to find and follow the next available branch in the ordered sequence of pointers in the first unit's STRUCTURAL POINTERS GROUP 514 fields. This next branch would be to the second line unit of the linesplit and would be pointed to by the LS1 pointer in the linesplit pointers of the first unit's STRUCTURAL POINTERS GROUP 514. With continued rightward movement of the cursor, the editor would find the end of the second line unit of the linesplit and return to the first unit to find the next available branch, that is, to the bar unit pointed to by the pointer in the first unit's BARUNIT 564 field. Continuing rightwards cursor movement to the end of the bar unit, the editor would return to the first unit to again find the branch to next available unit in the sequence, this next unit would be the unit containing the "F" and Append Blob and would be pointed to by the pointer in the first unit's NEXTUNIT 566 field, and so on. If, as discussed previously, the unit containing the "F" were not the last unit in the text, the editor would continue rightwards movement of the cursor by following the tree of pointers and USs 136 onwards from the "F" unit in the manner described above.

Finally, in the case of cursor movement backwards through EB 128, that is, leftwards in the present example of FIGS. 12A and 12B, the operation of the editor is similar to that described above except that the traversing of branches is in the reverse order. That is, the direction is given to move the cursor backwards from a given unit, the editor will follow that unit's PREVUNIT pointer back to the preceding unit and will continue to do so until a unit is reached that has multiple forward branches, such as the first unit in the present example. When such a unit is reached, the editor will search through that unit's STRUCTURAL POINTERS GROUP 514 in reverse order, that is, in the order BARUNIT 564 and the possible LINESPLITUNIT 562 pointers, to find the pointer next preceding the pointer to the unit the editor has just come from.

Considering the present example, and assuming that the cursor is initially in the last unit of FIG. 12A, that is, in the unit containing "F" and the Append Blob, a cursor direction to move leftwards would cause the cursor to read the PREVUNIT 568 pointer of this unit to find the US 136 pointed to, that is, the US 136 of the first unit. As described, the first unit has multiple forward branches and the editor must determine which branch is to the unit next preceding the unit in which the cursor was initially located.

As indicated in FIG. 12B, the possible branches are indicated by the BARUNIT pointer to fifth unit, containing the bar unit, the LS1 pointer to the second line unit of the linesplit, and the LS0 pointer to the first line unit of the linesplit. The editor will search the first unit's STRUCTURAL POINTERS GROUP 514 fields in reverse order to that searched for forward cursor movement to find the pointer next preceding the NEXT pointer to the unit the cursor is just moving from. In this example, the editor will find the BARUNIT pointer to the bar unit and will move the cursor to the last character in the bar unit, that is, to the "E". If the cursor is directed to move further in the backwards direction, the editor will move the cursor backwards through the character and symbols of this unit until the first character or symbol of the unit is reached, in this case the "D" of the bar unit. If the cursor is moved backwards again, the editor will follow the bar unit's PREVUNIT pointer back to the first unit's US 136 and again will search backwards through the first units STRUCTURAL POINTERS GROUP 514 field, locating the LS1 pointer to the second line unit of the linesplit and moving the cursor to the second line of the linesplit. With continued backward movement of the cursor, the editor will move the cursor backwards through the second line unit of the linesplit to the start of the linesplit second line unit. The editor will then follow the second line unit's PREVUNIT pointer back to the first unit's US 136 and will again search backwards through the first unit's pointers from the pointer to the second line unit of the linesplit. The next pointer is, as described, to the first line unit of the linesplit. This operation to move the cursor backwards through the text will continue until the editor has exhausted all of the forward branches from the first unit. If further backward movement of the cursor is commanded, the editor will then follow the first units PREVUNIT pointer back to the unit preceding the first unit, and so on as described.

Having described cursor movement within a unit and among units, in both directions through EB 128, the following will next describe cursor movement between lines of text. Cursor operations with regard to diacritics will be described in a following description of the construction of diacritics.

F.1.d Cursor Movement Between Lines

Movement between lines of text may occur, for example, due to direct instruction by the user or as a result of a cursor movement along one line which reaches the end of that line and is directed to continue onwards to the next character/symbol, which will be on another line. As described previously, however, the text with which the present editor is intended to operate is either multi-dimensional or multi-directional, or both, and the characters and symbols are not necessarily of uniform size or proportion and are not necessarily located in a screen or document, or in relationship to one another, in a uniform, predictable or regular manner. Because of this, cursor movement between lines of text cannot be performed merely by moving the cursor vertically to another line. That is, the baseline of a next line is not at a fixed, readily known distance from a present line and the characters/symbols are not necessarily vertically aligned with respect to one another from line to line.

For the above reasons, cursor movement from one line to another is not performed by direct vertical movement in the present editor. Instead, a cursor move from one line to another line is to the start of the line moved to, the cursor then being moved along the new line to the desired position.

In the initial step, the editor must determine that a cursor move to a new line is required. The editor may determine this from the user cursor command input, for example, that the cursor is to move up or down from the present line, or by determining that the indicated cursor movement will go past the end of the present line. In this latter case, the editor will detect the end of the line while traversing the cursor through the tree of USs 136 comprising the line, as described above, when it locates the last unit in the tree, that is, when it reaches a point where there is no further forward or backward path through the tree structure, depending upon the direction of cursor movement.

If a cursor move to another line is indicated, the editor must locate the next line and the first unit of the next line. As indicated in FIGS. 8A and 8B, and previously described, SSS 160 includes in Current Screen Group 808 a set of LINE DATA POINTERS 839 which contain pointers to the LDSs 162 of the present page. These pointers, and the LDSs 162, comprise an ordered array, so that a next line may be located by incrementing and decrementing through the LINE DATA POINTERS 839 and corresponding LDSs 162. It should be noted that in certain cases there may be no next line to go to. This case may arise when the cursor is moving backwards through the first line or forwards through the last line. The first case is detected by the editor when it reaches the start of the first unit of the line and in the second case by the presence of the Append Blob at the end of the last unit in the tree. In the latter case, the user may either continue the present line by appending further text or initiate a new line. It should be noted, with regard to the previous, that a move to a next or a previous line may also require a move to the next or preceding screen.

The LDS 162 corresponding to the next line in turn contains, as previously described, a START POSITION 902 field containing an offset pointer to the start of the first unit (EU 134) of that line in EB 128 and a START UNIT OF LINE POINTER 904 field containing a pointer to the corresponding first US 134 of the line. This pointer is written into the CURRENT UNIT DATA POINTER 843 field of SSS 160. The cursor is then moved into and displayed in the first unit in the new line in the manner described above with reference to movement between units. In this process the CURRENT CHARACTER BUFFER POSITION 852, CURRENT CHARACTER BUFFER BEGINNING 853 and CURRENT CHARACTER BUFFER END 854 fields will updated for the new unit now occupied by the cursor, the CURRENT CHARACTER BOX 881 AND CURRENT BASE BOX 882 fields will be constructed for the character/symbol at the new cursor position, and the cursor will be located and dimensioned on the page and present screen.

It should be noted that the new line may not, in fact, be "constructed", that is, it may exist in EB 128 but the corresponding USs 134 may not exist in LUS 130 when the cursor is to be moved into the line. In this case, the editor will call Parser 148, which in turn will read the EUs 134 of the line from EB 128 and construct the corresponding USs 136, as previously described. The editor will then write the START UNIT OF LINE POINTER 904, START LOCATION 906 and LINE DIMENSIONS 908 information into the line's LDS 162, and proceed with the steps described just above.

In the case wherein the new line does not yet exist, the editor must first create the first US 136 of the new line as the codes of the EU 134 are entered into EB 128, as previously described, and must create a new LDS 162 with corresponding entries into the LINE DATA STRUCTURES POINTERS 832 of SSS 160. The editor will move the cursor into the new unit as it is created, in the manner as described just above.

Having described the cursor operations of the present editor, certain text creation and editing operations will be described next below. Among the operations described in the following descriptions of editor text creation and editing operations will be the construction of units, including the construction of characters having attached diacritic characters, and the construction of an exemplary segment of text comprised of a plurality of units and the assembly of these units into a segment of a text line on a page. Finally, the insert and hide operations executed by the editor will be described.

F.2 Diacritic Characters (FIGS. 13A to 13F)

As previously described, while diacritic characters, symbols or marks are treated in many respects as are other characters and symbols, they are treated differently from scripts. That is, diacritic characters, symbols or marks are associated directly with a single base character and become a part of the definition of the base character rather than being treated as a unit linked to a base unit.

Referring to FIGS. 13A through 13F, therein is represented the construction of a base character having three attached diacritics. This example, and the following description, follow the general convention of English text, that is, of text running horizontally from left to right, for the convenience of the average reader. It must be noted that, as described with regard to the preceding examples of editor operation, other text conventions may be adapted to readily by the present editor.

Figures 13A, 13B, 13C, 13D, 13E, 13F:
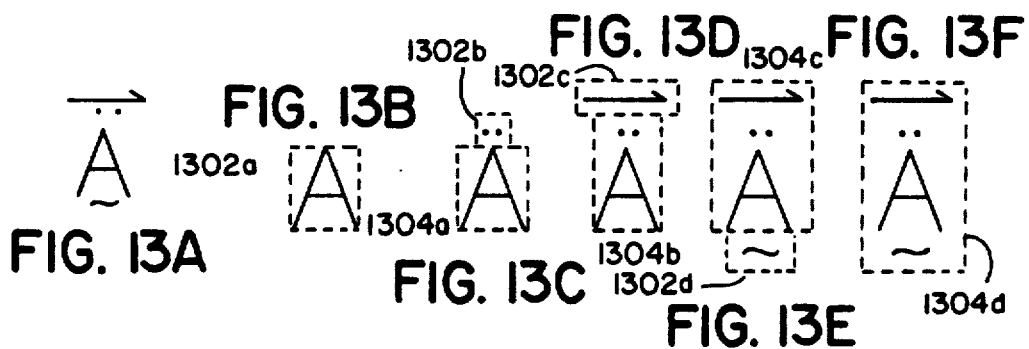
FIGS. 13A, 13B, 13C, 13D, 13E, and 13F illustrate a single character unit with attached diacritic characters the construction of such a unit.

As shown in FIG. 13A, the final result of the construction is to be the base character "A" with two over-diacritics and one under-diacritic. The first over-diacritic is shown as being a double dot, for example representing the second derivative of "A", while the second over-diacritic is shown as a a vector sign; the expression thus far may, for example, represent a vector which is the second derivative of the vector function "A". The under-diacritic is shown as a tilde.

As previously described, SSS 160 includes, in Parameters Group 820, a CURRENT CHARACTER BOX 881 field and a CURRENT BASE BOX 882 field. During the construction of a character which contains a base character with attached diacritic characters, the CURRENT BASE BOX 882 field contains, at each step in the construction, the dimensions, that is, the x and y extents, of a "box" enclosing the base character plus all diacritics which have been attached to the base character at that point. The CURRENT CHARACTER BOX 881 field contains, at each step, the dimensions of the character being added to the construction at that step. In the following description, the contents of the CURRENT CHARACTER BOX 881 and CURRENT BASE BOX 882 fields will be graphically represented in FIGS. 13A through 13F by, respectively, a Current Character Box 1202 and a Current Base Box 1204. It should be noted in the following that the origin point of the character construction is the left beginning baseline point of the character or, in other characters or symbols, for example, scripts, a similar designated reference point. In the present example, the left beginning baseline point is at the lower left hand corner of the base character from which the diacritics are attached, that is, the lower left hand corner of the box enclosing the base character, and all dimensions are measured from this point.

In the first step, illustrated in FIG. 13B, the character "A" is entered as the first and current character of the construction and the x and y dimensions of "A" are written into the CURRENT CHARACTER BOX 881 to define a Current Character Box 1302a which encloses "A" within its bounds. Because "A" is the only character at this point, the x and y dimensions of the Current Base Box 1302, which were effectively zero at the beginning of the present operation, now becomes those of "A".

In the second step, illustrated in FIG. 13C, the the first over-diacritic is to be added to the base character "A". The initial Current Base Box 1304a for this step is that of the box enclosing base character "A", as described above. The first over-diacritic is the new current character and the x and y extents of the first over-diacritic are thereby written into the CURRENT CHARACTER BOX 881 field to define the extents of a new Current Character Box 1302b which encloses the first over-diacritic character. The addition of the first diacritic to the base character "A" in this step results in a new Current Base Box 1304b which, as indicated in FIG. 13D, encloses base character "A" and the first over-diacritic and these extents are written into the CURRENT BASE BOX 882 field.

In the third step, illustrated in FIG. 13D, the second over-diacritic is to be added to the construction, which at this point contains the base character "A" and the first over-diacritic. As described above, the extents stored in the CURRENT BASE BOX 882 field at the start of this step are the maximum x and y dimensions of the base character "A" plus the extensions required to enclose the first over-diacritic, defining Current Base Box 1304b. The new current character in this step is, of course, the second over-diacritic, so that the x and y extents of the second over-diacritic are written into the CURRENT CHARACTER BOX 881 field to define a new Current Character Box 1302c for this step. The addition of the second diacritic to the construct comprising the the base character "A" plus the first over-diacritic results in a new Current Base Box 1304c which, as indicated in FIG. 13E, encloses base character "A" and the first and second over-diacritics. The extents of the new Current Base Box 1304c are written into the CURRENT BASE BOX 882 field to define the extents of the total construction to this point.

In the fourth step, illustrated in FIG. 13E, the under-diacritic is to be added to the construction comprising the base character "A" plus the first and second over-diacritics. As described above, the extents stored in the CURRENT BASE BOX 882 field at the start of this step are the maximum x and y dimensions of the base character "A" plus the extensions required to enclose the first and second over-diacritics, defining Current Base Box 1304c. The new current character is the under-diacritic, so that the x and y dimensions of the box enclosing the under-diacritic are written into the CURRENT CHARACTER BOX 881 field to define Current Character Box 1302d. The addition of the under diacritic to the construct comprising the the base character "A" plus the first and second over-diacritics results in a new Current Base Box 1304d which, as indicated in FIG. 13F, encloses base character "A", the first and second over-diacritics and the under diacritic. The extents of the new Current Base Box 1304d are written into the CURRENT BASE BOX 882 field to define the extents of the total construction to this point. At this point, there are no further diacritic characters to be added to the construction, so that operation is completed.

As described previously with reference to the document data structures, and in particular the USs 136 and the operation of Parser 148, the US 136 of a unit contains UNITDIMS 524 and EXTENDEDDIMS 526 fields which describe the x and y extents of the unit. These extents are in turn used, as previously described, to locate a unit within a line and upon a page. The extents of a base character with attached diacritics, as determined as described above, are used by the editor in these determinations of the base and extended extents of the unit containing a character with attached diacritics.

Finally, and as previously described, the present editor provides a mechanism by which the user may designate diacritics for editing operations. As described just above, however, diacritics are treated differently from, for example, base characters and script and bar units, in that they are associated directly with and are a part of a base character rather than being separate units in themselves. The means by which the user designates a diacritic for an editing operation accordingly differs from the cursor operations described previously and reflects the treatment of the diacritics as being associated with and constructed as part of a base character.

As previously described, all operator, parameter, terminator and other codes associated with a character are located in association with that character's character code in EB 128. If a given character code is located in EB 128 by the CURRENT CHARACTER BUFFER POSITION 852 field which defines the current cursor position, the associated codes, including any diacritic operator and character codes, may be also located by reading the codes in the portion of EB 128 defined by the CURRENT CHARACTER BUFFER BEGINNING 853 and CURRENT CHARACTER BUFFER END 854 fields, as previously described.

In the present editor, therefore, the user begins an operation with respect to a diacritic by moving the cursor, as described above, to the diacritic's base character. The diacritic itself and the operation to be performed may then be designated in any of a plurality of manners. For example, the user may enter a diacritic command, either as single function keystroke or as a combination of control keystrokes, as described above with respect to scripts, and may then designate the specific diacritic, if there is more than one, by use of the cursor keys or by means of a diacritic character keystroke. The command designating the operation to be performed, for example, a DELETE, may be entered either before or after the specific diacritic character is identified, depending upon the chosen editor convention.

In the present implementation of the editor, the diacritics are, as described, associated directly with a character and are treated, in this respect, as comprising a part of the style associated with the character in a manner analogous to a font, italic or size designation. Accordingly, the user, positions the cursor under the base character, enters the command for the operation to be performed, for example, DELETE, and enters a STYLE keystroke command. The editor responds by listing, in a menu-like display imposed on DISPLAY 116, all style characteristics associated with that character, including all associated diacritics. The user may then pick the diacritic from the menu, for example, using the cursor keys, and the editor will perform the indicated operation upon the indicated diactritic.

Having described the operation of the editor with respect to cursor movement and the creation and editing of diacritics, the general operation of the editor in constructing units will be described next below.

F.3 EXEMPLARY CONSTRUCTION OF UNITS (FIG. 14)

The particular manner in which a base character with attached diacritics is constructed has been described above and the general operation of Parser 148 in constructing text, that is, units assembled into lines, has been described previously. The following will further illustrate the operation of the editor by describing the construction of an exemplary segment of text comprised of a plurality of units, and a following description will further illustrate the operation of the present editor in structuring units into lines of text.

Certain conventions will be adopted in the following descriptions and figures for clarity of presentation and understanding. First, the text used in the example will be assumed to run from right to left and the x-y coordinate system used to refer to locations on a page will assume that x is the horizontal axis with a positive values rightwards from the x origin while y is the vertical axis with positive values upwards from the y origin. These coordinates are chosen for the following examples because the examples use, for ease of understanding by the typical reader, the English language convention that text lines are written and read from left to right and successive lines written and read from top to bottom. Secondly, the following descriptions and figures show the construction of units with boxes and lines outlining the dimensions of the unit and their baselines. The following figures will be shown as slightly "exploded" views, so that lines which would otherwise be superimposed upon each other will appear in a close, side by side relationship.

As previously described, the logical structure and contents of each unit are stored in an EU 134 in EB 128 while the information required to describe the physical and visual characteristics of the unit are stored in a corresponding US 136 in LUS 130. As described, the US 136 for a unit includes information describing the starting position of the corresponding EU 134 in EB 128 (STARTPOS 516), the location of the first character or symbol in EB 128 (STARTCHAR 518) and the length of the EU 134 (ELTLENGTH 520), so that the character/symbol, operator, parameter and terminator codes comprising the unit in EU 128 may be located by Parser 148.

Among the information stored in the corresponding US 136 is a STARTLOC 522 comprised of two fields containing the absolute x and y location on the page for the start of the section of line containing the unit. A UNITDIMS 524 contains a group of 4 fields containing the maximum and minimum x and y extents of the unit in each direction around STARTLOC, that is, the dimensions of the unit. A EXTENDEDDIMS 526 contains a group of 4 fields which contain the maximum and minimum x and y extents, that is, dimensions, of the unit plus the next unit, all scripts, line splits and bar units associated from the unit, to the end of the current baseline, in each direction around STARTLOC. The remaining fields of the US 136 contain, for example, information regarding font resize factors at the beginning and end of the unit, structural flags and pointers to all associated units connected from that unit. These associated units include the preceding and following units, all script units and the units comprising the individual lines of an associated linesplit.

Figure 14:
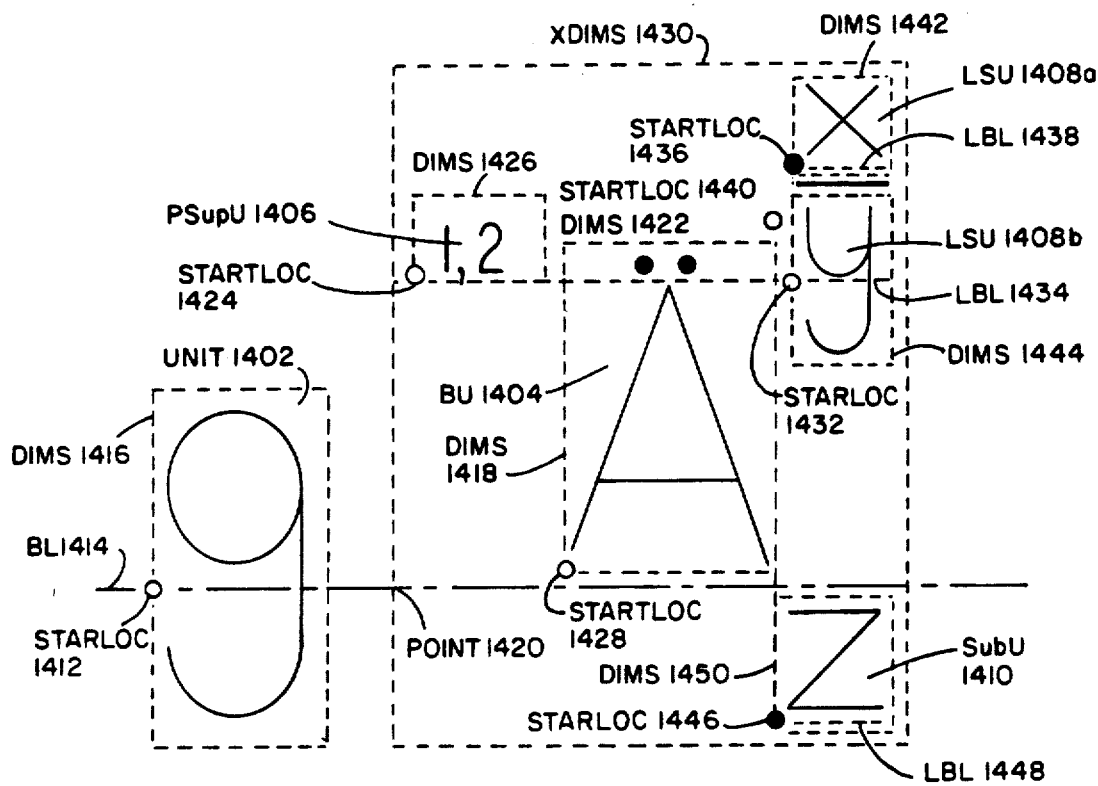
FIG. 14 is an illustration of the construction of a portion of a line with multiple units.

Referring to FIG. 14, therein is represented, for purposes of illustration, a portion of a line of text which includes seven units. It should be noted that FIG. 14 differs from the previous illustrative example of text in FIG. 12A in that the editorial and formatting symbols, such as the linesplit symbol, have been omitted for clarity of presentation and discussion. The Append Blob is also not shown, for the same reasons, as the location of the Append Blob would change during the course of the following discussion of the construction of the text. The example of FIG. 14 thereby appears as the text would appear in finished form on a printed page, rather than as on Display 116 during editing.

The first unit shown in FIG. 14 is designated as Unit 1402 and is comprised of a single character, the lower case "g". The second unit is a Base Unit designated as Base Unit (BU) 1404 and is comprised of a single character, the upper case "A", with an associated over-diacritic. The third unit is a Presuperscript Unit (PSupU) 1406 associated from BU 1404.

The fourth, fifth and sixth units together comprise a linesplit unit in the superscript position with respect to BU 1404. The linesplit unit has a parameter value of n=1, thereby indicating a LINESPLIT into two lines with a fraction line imposed in the interline spacing between the two lines. As previously described, each line of a linesplit is comprises of at least a separate unit and the two units of this exemplary linesplit are designated as Linesplit Unit (LSU) 1408a and Linesplit Unit (LSU) 1408b. As described below, a linesplit is always based upon a local baseline. In this case, wherein the linesplit is in the superscript position, the local baseline for the linesplit is provided by a superscript unit. This superscript unit is not explicitly shown in FIG. 14 because the primary manifestation of the superscript unit is as a baseline for LSU 1408a and LSU 1408b.

The final unit of FIG. 14 is a subscript unit from BU 1404 and is designated as Subscript Unit (SubU) 1410.

Considering first Unit 1402, as previously described Parser 148 will determine the STARTLOC 522 y coordinate of the first character or symbol of a unit to be upon the present baseline unless another baseline is commanded by the user, for example, by indicating that the first character is the first character of a script unit. Parser 148 will determine the STARTLOC 522 x coordinate of the first character or symbol as an offset from the last preceding character or unit, the offset being determined by the inter-character pitch information from DP 126. This is represented in FIG. 14 by STARTLOC 1412 for Unit 1402. While the last character or symbol for the unit preceding Unit 1402 is not represented in FIG. 14, it should be noted that the STARTLOC 522 y coordinate for "g" has been determined so that the main body of the "g" rests upon Baseline (BL) 1414, that is, the baseline for the segment of text represented in FIG. 14. As indicated, the character "g" has a descender, that is, the tail of the "g" which extends below the BL 1414.

As described, Parser 148 determines the extents of a unit, in this case of the character "g", from the character pitch information in DP 126, the FT 144 information for that character or symbol, any applicable resize factors as determined by the fields of the preceding unit's US 136's UNIT BEGINNING STATE SUB-GROUP 508, and any resize factors commanded by the user. The extents of Unit 1402, as defined by Parser 148 and written into UNITDIMS 524 fields of Unit 1402's US 136, are represented in FIG. 14 by UNITDIMS Box (DIMS) 1416. As indicated, the x extents of UNITDIMS 524 for Unit 1402 extend only in the positive direction, that is, for the purposes of this illustration, to the right of STARTLOC 1412. The extents of Unit 1402, however, extend in both the positive (upwards) and negative (downwards) directions from STARTLOC 1412, encompassing, respectively, the main body and the tail of the character "g".

Considering now the construction of BU 1404 and its associated script units, the operation of Parser 148 is more complex. Essentially, Parser 148 will first construct BU 1404 alone and then, while constructing each of PSupU 1406, LSUs 1408a and 1408b with their baseline superscript unit, and SubU 1410, modify the PROPERTY IDENTIFICATION GROUP 504 fields of BU 1404's US 136.

In the first step, that is, when Parser 148 is constructing the text elements which eventually become BU 1404, the character "A" and its associated diacritics are examined to be included within Unit 1402 because no operation has yet taken place which would require placing the "A" and diacritics in a separate unit. That is, and unlike, for example, a script, the diacritics become a part of the definition of the character "A" and thus the "A" with associated diacritics may be included in the present UNIT 1402. In this step, therefore, Parser 148 operates as previously described in constructing the character "A" with associated diacritics and the unit dimensions of UNIT 1402 are expanded as required to include the "A" with diacritics. It should be noted that the "A" is not put into UNIT 1402 because the script operator is detected immediately following the "A"; until that the script operator is reached, however, the "A" is treated as though it will go into UNIT 1402.

The next step, wherein PSupU 1406 is written into the presuperscript position relative to the character "A", requires that the character "A" with associated diacritics be placed in a separate unit from from UNIT 1402 to become the base unit for PSupU 1406. Parser 148 accordingly initiates a new unit, BU 1404, to contain the "A" with associated diacritics and determines the UNITDIMS 524 extents of BU 1404 to be those of the character "A" with associated diacritics, as indicated by the DIMS Box 1420. Parser 148 also, at this time, defines UNIT 1402 to contain the character "g" alone, as indicated in FIG. 14, and determines the STARTLOC 522 of BU 1404 to be at Point 1420.

It should be noted that when the editor determines the STARTLOC 522 of BU 1404 to located BU 1404 on the page relative to Unit 1402, the editor will determine the y coordinate of BU 1404's STARTLOC 522 such that the STARTLOC 522 of BU 1404 is aligned with the STARTLOC 522 of Unit 1402 in the y dimension, that is, on BL 1414. As will be further described in the following description of the construction of a line and the location of the units of a line relative to other lines, all "base units" of a line, that is, all units of the line which are not located in a script position or in a linesplit, will be located on the page such that their START-LOCs 522 are aligned with one another in the y dimension and thereby located upon the baseline of the line. In effect, the STARTLOCs 522 of the line's base units define the baseline of the line.

Before continuing the description of the construction of PSupU 1406, LSUs 1408a and 1408b and SubU 1410, it should be further noted that, for purposes of speed and simplification in parsing, all scripts appearing in EB 128 in an EU 134 reside therein in a preferred order and are written therein in that order by EE 146, regardless of there order of entry by the user. That is, EE 146 will reorder the operators in an Eu 134, as the operators are entered by the user, into the preferred order. In the presently preferred embodiment of the editor, that order is, presuperscript, presubscript, overscript, underscript, superscript and subscript. It should be further noted that, in alternate embodiments, this order may be changed or, by performing more complex decoding of the operator codes by Parser 148, there need be no order in the operators in a EU 134.

Considering now the operations of Parser 148 with respect to PSupU 1406, as previously described Parser 148 reads character/symbol, operator, parameter and terminator codes as they are entered by the user and responds as necessary to each code. The entry of the operator code for a presuperscript will inform Parser 148 that a new unit is required and that this unit is to be a presuperscript from BU 1404. Parser 148 will then initialize a US 136 for PSupU 1406, writing a corresponding pointer into the PRESUPERSCRIPTUNIT 554 field of BU 1404's US 136, and will determine the fields of the US 134 as the character/symbol, operator, parameter and terminator codes comprising PSupU 1406's EU 134 are entered, including the STARTPOS 516, STARTCHAR 518 and ELTLENGTH 520 fields which locate the codes of PSupU 1406's EU 134 in EU 128.

PSuP 1406 is a prescript and is therefore the leftmost character or group of characters in the units associated with BU 1404 and thereby occupies the leftmost position with respect to preceding units.

Parser 148 will thereby respond to the presuperscript operator code for PSupU 1406 by determining that the x coordinate of PSupU 1406's STARTLOC 522 field is to be located in the same position in the x dimension as Point 1420, that is, at the leftmost possible position with respect to the preceding Unit 1402. The y coordinate of PSupU 1406's STARTLOC 522 fields is determined from DP 126's SCRIPTLOCATION 207 field, which determines, as previously described, whether scripts are located above the base characters or at ⅜ of the base character's height above the baseline of the base character, together with LDS 162's START LOCATION 906 field, which determines the y coordinate of BL 1414 on the page. The resulting STARTLOC for PSupU 1406, as entered in PSupU 1406's STARTLOC 522 fields, is indicated in FIG. 14 as STARTLOC 1424.

The initial extents of PSupU 1406 will, of course, be those of the Append Blob because the user has not yet entered the characters to appear in PSupU 1406. As the user enters each PSupU 1406 character, Parser 148 and EE 146 will respond to each character code by writing the character code into PSupU 1406's EU 134, determining the extents of PSupU 1406 as necessary to enclose the characters entered, and displaying the characters of PSupU 1406 on Display 116.

That is, when the user enters the first character of PSupU 1406, a "1", the character code for "1" is written into PSupU 1406's EU 134, the extents of PSupU 1406 are increased to enclose the "1", and a "1" is displayed in the presuperscript position relative to BU 1404. The user then enters the second character, a ",", the code for "," is written into EB 128, the extents of PSupU 1406 enlarged to enclose the group to characters entered to this point, that is, "1, [append blob]", and the "1,[append blob]" displayed in the presuperscript position relative to BU 1404. The user then enters the final character, "2[append blob]", the code for "2" is written into EB 128, the extents of PSupU 1406 again enlarged to enclose the group of characters entered to this point, that is, "1,2[append blob]", and the "1,2[append blob]" displayed in the presuperscript position relative to BU 1404. Finally, PSupU 1406 is terminated when the user enters a pseudo-return, thereby concluding the unit "1,2[pseudoreturn]".

The final x and y extents of PSupU 1406 as written into PSupU 1406's UNITDIMS 524 fields are indicated in FIG. 14 by the DIMS Box 1426. It should be noted that PSupU 1406, being a script, does not have extended dimensions different from its unit dimensions unless there are, for example, other scripts or linesplits connected from PSupU 1406. If there were scripts or linesplits connected from PSupU 1406, PSupU 1406 would be a base unit with respect to these scripts or linesplits and the extended dimensions of PSupU 1406 due to these scripts and linesplits would be written into PSupU 1406's EXTENDEDDIMS 526 fields.

It is apparent from the above and from FIG. 14 that BU 1404 must, in effect, be pushed to the right to make room for PSupU 1406 between Unit 1402 and BU 1404. This is a general and recurring operation in the forms of text with the present editor is intended to operate. It must be noted that this process and the similar processes described below in the construction of the text of the present example are dynamic processes, but that the specific manner in which the process is executed is dependent upon the capabilities of the system in which the editor is implemented. That is, the editor and system must provide an acceptable response time to user inputs and this, in turn, is dependent upon the upon the processing speed of CPU 112 in executing editor operations and upon the relative complexity of editor operations.

In the most preferred mode of operation, the determination of text extents and the modification of the display to reflect the user operations are continuous, that is, the extents are determined and the screen updated with each character entered or deleted by the user. For example, in the above described operations, Parser 148 would "move" BU 1404 to the right dynamically as each PSupU 1406 character or symbol is entered by the user by increasing the value in the x coordinate field of BU 1404's STARTLOC 522 by the same amount that the current x extent of SupU 1406 is increased as each of the PSupU 1406 characters are entered. The visual effect to the user is that BU 1404 will successively move to the right as each PSupU 1406 character is entered. The final resulting x and y coordinate location fields of BU 1404's STARTLOC 522 are indicated in FIG. 14 by STARTLOC 1428.

In the present embodiment of the editor, however, wherein the CPU 112 is an Intel 8086 microprocessor, the time required for CPU 112 to perform these operations character by character is too long for an adequate user response. The present embodiment of the editor therefore does not perform these operations continuously and character by character, but at intervals or points determined by the user operations as selected by the implementers. Considering the present example, the editor would redetermine the location of Bu 1404, and regenerate the text image shown on Display 116, when the user concludes the construction of PSupU 1406 by entering the pseudoreturn. Because of this, the user may enter a few or many characters, depending upon the operation, before the text and display are updated and the displayed image of the text will not accurately reflect the true appearance of the text during this period. The user is provided, however, with the ability to request that the screen be refreshed and made accurate upon his own judgement.

In the present example, for example, the characters of PSupU 1406 would appear to overwrite BU 1404 while PSupU 1406 was being constructed and a final image of the text would not be presented until the construction of PSupU 1406 was completed. At this point the editor will perform the location operations previously described to determine the locations and appearance of all elements of the text. At this time, BU 1404 would appear to be moved to the right, as described above, and Unit 1402, BU 1404 and PSupU 1406 would appear as shown in FIG. 14.

It should be noted that the editor follows a preferred sequence when locating text elements. This sequence differs from the previously described preferred sequence for parsing due to the different object of the operation, that is, the location of text elements on the page, and is, in order of location, overscript, underscript, presuperscript, presubscript, ssuperscript and subscript.

Finally, and before continuing with the description of the construction of text elements, it should be noted that the following description, and others, have adopted a narrative convention for convenience and clarity in presentation. That is, the following descriptions are presented as if the construction of text elements, that is, the building of each elements and the determination of the extents and location of each element, were a continuous, element by element and character by character process. Due to the limitations of the processor used in the present implementation of the editor, the present editor actually follows, in the present implementation, a process similar to that previously described with respect to the construction of units. That is, the editor and parser first build all elements of the text, then determine the extents of the elements, and finally locate the elements on the page. For example, if the text to be entered had five elements, the user and editor would build units 1 through 5, in that order; the editor would then determine the extents of unit 5 through 1, again in that order, and would then locate units 1 through 5 on the page, again in that order. In an alternate implementation, with a faster and more power processor, the editor could be implemented to perform these processes continuously and repetitively for each element and character; again, this convention has been adopted for clarity of presentation in the following descriptions.

Continuing now with the description of the construction of the text of FIG. 14, the addition of PSupU 1406 as a presuperscript has resulted in an extension to the dimensions of BU 1404 and the extended dimensions of BU 1404 must be written into the EXTENDEDDIMS 526 fields of BU 1404's US 134. Again, in the convention adopted for purposes of descriptive clarity, this is a dynamic process, with the extended dimensions of BU 1404 being increased by Parser 148 as necessary to enclose both BU 1404, that is, DIMS 1422, and PSupU 1406 as each character of PSupU 1406 is entered by the user. The final extended dimensions of BU 1404 at the conclusions of the steps described herein, that is, the addition of PSupU 1406, LSUs 1408a and 1408b and SubU 1410 to BU 1404 are indicated in FIG. 14 by the Extended Dimensions Box (EDIMS) 1430. At this point in the construction, however, XDIMS 1430 would extend in the x dimension from STARTLOC 1424, that is, the left side of DIMS 1426, to the rightmost point of BU 1404, that is, the right side of DIMS 1422. XDIMS 1430 would extend in the y dimension from the lower side of DIMS 1422 to the upper side of DIMS 1426. It should be noted that the attachment of PSupU 1406 to Bu 1404 has resulted in an extension of the dimensions of BU 1404 in the negative x direction, that is, to the left, since PSupU 1406 extends in the x dimensions to the left of STARTLOC 1428, and in the negative y dimension, that is, upwards, since PSupU 1406 extends above BU 1404.

In the next sequence of steps, the user will create LSUs 1408a and 1408b by entering the operator code for a superscript, to provide a baseline for the lineplit, and then the operator code and parameter for LSUs 1408a and 1408b. As described above, a linesplit with n=1 results in a linesplit of two lines with a bar appearing in the interline spacing between the lines. As also described above, each line of the linesplit is treated and generated as at least a separate unit, so that the appearance of this linesplit operator and parameter will cause Parser 148 to initialize and position two new units, that is, LSU 1408a and LSU 1408b. The bar between the lines does not comprise a unit, but is a property of this particular operator and parameter. It should be noted, with respect to the initialization of LSU 1408a and LSU 1408b, that the first is created initially having only an append blob and that the second is created only when the pseudoreturn terminating the first is entered.

Before proceeding with the description of the construction of LSUs 1408a and 1408b, the general case of linesplits will first be described next below to aid in understanding the following descriptions of LSUs 1408a and 1408b.

As described, in a linesplit a base line is split into a group of two or more parallel lines with each line being parallel to the original baseline and the group of lines being centered on the original baseline. Each line of the linesplit is at least one unit and one or more characters or symbols, of any dimensions selected by the user, may appear upon each of the lines of the linesplit. Each line unit of the linesplit has a STARTLOC 522 and the y dimensions of each of the line units are determined, relative to one another, by the y extents, that is, dimensions, of the characters and symbols appearing in the line units. The linesplit has the further property, however, that the linesplit as a whole is, in effect, a unit. That is, the group of line units comprising a linesplit is treated as a unit by the editor when locating the individual line units of the linesplit on the page.

For example, considering the simplest case of a linesplit, that of a linesplit centered upon the baseline of the current line, for example, BL 1414, Parser 148 determines the y dimensions, that is, heights, of each of the lines from the character size and resize information previously described and may determine the interline spacing from SSS 160's INTERLINE SPACING 887 field. Parser 148 will make the initial assumption that all characters appearing upon the lines will be of the size specified at the start of the first line of the linesplit and will accordingly determine an initial starting location for the linesplit as a whole. This initial location for the linesplit is similar to the STARTLOC 522 of a unit, which, as described, identifies the x and y coordinates of the left end of the baseline of the unit. In the case of a linesplit, the starting location x coordinate identifies the x coordinate on the page of the leftmost edge of the group of lines in the linesplit. The y coordinate of the starting location in this example, however, identifies the y coordinate on the page of the mid-point of the total height of the group of lines comprising the linesplit.

The x and y coordinates of this starting location for the group of lines is written into the LINESPLITLOC 530 field of the US 136 of the base unit form which the linesplit is connected and the number of lines in the linesplit is written into the base unit's LINESPLITNUM 528 field.

Parser 148 initiates a US 136 for each line unit of the linesplit and writes pointers to each of the line unit's USs 136 into the LINESPLITUNIT 562 fields of the base unit's US 136. Parser 148 will then use the character size and interline spacing information described above, to determine a STARTLOC 522 for each line unit and will write the x and y coordinates of the STARTLOCs into each of the line unit's STARTLOC 522 fields.

Should the user specify a change in character size while entering the characters into the lines of the linesplit, that change may require a change in the starting locations and dimensions of the lines relative to one another. Such a change may also mean that the starting location (LINESPLITLOC 530) of the linesplit be altered, so that the linesplit as a whole remains centered upon the original baseline. Parser 148 will detect such character size changes, and any other user actions altering the dimensions and locations of the lines, and will recalculate the line dimensions, line starting locations and linesplit starting location as required, writing the new dimension and location information into the appropriate fields of the base unit and line unit USs 136 as required. It should be noted that linesplits, as with any other text unit, may not extend into the area of another unit. The construction of a linesplit may therefore, as described in a following description of the construction of lines, require that lines be repositioned on a paged, relative to other lines, so that the lineplit does not intrude into other text.

In the case of a linesplit in a script position, as for example in FIG. 14, the operation of Parser 148 in constructing the linesplit and the units thereof is similar to that in the case described just above. The principle difference, however, is in the location of the starting location, that is, the local baseline, of the linesplit and of the line units comprising the linesplit. In these cases, the baseline from which the linesplit is constructed is that of a script unit in the desired location. Again, the linesplit must also be positioned in the y dimension so that the linesplit does not intrude into areas reserved for other units. That is, and for example, a linesplit in the overscript position must be placed so as not to extend downwards into the base character and linesplits in the presuperscript or superscript positions must be placed so as not to extend downwards into the subscript positions. This requirement also applies to linesplits in the under- and sub-script positions, except that the linesplits must be positioned so that they do not extend upwards into the base character or superscript positions.

Considering the case of a linesplit in the superscript position, the group of line units comprising the linesplit are positioned in the y dimension so that the baseline of the lowest unit in the linesplit is located vertically at the position normally occupied by the baseline of a normal superscript unit. The linesplit extends upwards from that point, with the starting positions of each of the line units and of the linesplit being determined accordingly. Should the user command some operation or change, for example, in character size, that would effect the dimensions or spacing of the line units or the location and dimensions of the linesplit, Parser 148 will again detect these changes and modify the starting positions and dimensions of the line units and linesplit accordingly. In this case, however, the baseline of the lowest line unit would remain fixed and the linesplit would expand or contract in the y dimension relative to this fixed baseline.

The operation of Parser 148 is similar in the case of a linesplit in the overscript position, except that the baseline of the lowest line unit is fixed to remain above the top of the base character. The operations of Parser 148 are again similar in the case of a linesplit in the underscript or subscript positions except that the baseline of the topmost line unit is fixed to avoid interference with other units and the linesplit expands or contracts in the vertical direction downwards from this fixed baseline.

Returning now to the example presented in FIG. 14 of a linesplit in the superscript position, and remembering the narrative convention described above adopted in the present descriptions, Parser 148 will, at the direction of the user, initiate a US 136 for the superscript unit which will provide a baseline for LSUs 1408a and 1408b and USs 136 for LSUs 1408a and 1408b and will determine starting locations for LSUs 1408a and 1408b and for the linesplit. It should be noted that the superscript unit providing the baseline for the linesplit will not, in itself, contain characters or symbols but serves only as a base for the linesplit.

The STARTLOC 522 for LSU 1408b is determined first and is indicated in FIG. 14 by STARTLOC 1432. As indicated, LSU 1408b's STARTLOC 1432 is located relative to BU 1404 in the position normally occupied by the starting location of the baseline of a superscript and LSU 1408b's Local Baseline (LBL) 1434 is located in the position normally occupied by the baseline of the superscript. LSU 1408a's starting point is then located by Parser 148 at the position indicated as STARTLOC 1436 and LSU 1408a's local baseline is located as indicated by LBL 1438. The starting location of the linesplit is determined as being at the position indicated as STARTLOC 1440. The starting locations of LSUs 1408a and 1408b are written into the STARTLOC 522 fields of their USs 136. The number of lines in the linesplit, the starting location of the linesplit and the pointers to the USs 136 of LSUs 1408a and 1408b are written into, respectively, the LINESPLITNUM 528, LINESPLITLOC 530 and LINESPLITUNIT 562 fields of BU 1404's US 136.

The user then enters the characters to appear in the line of the first linesplit unit, that of LSU 1408a and terminates the first line with a pseudoreturn. In this case, the first line contains only the character "x". At the pseudoreturn ending the first line, Parser 148 goes to the second line unit of the linesplit and the user enters the characters to appear therein, in this case the character "y", and terminates the unit with a pseudoreturn.

It should be emphasized that, within the narrative convention adopted for these conventions, Parser 148 executes the above process dynamically, but that the specific process again depends upon the capabilities of the specific system in which the editor operates. In the present implementation of the editor, the three pass procedure of building units, determining unit dimensions and locating the units is followed to provide an acceptable speed of operation to the user. In the preferred mode, each character of the linesplit is entered and displayed as it is entered by the user. Similarly, any necessary changes in line unit location or dimensions and any necessary changes in linesplit location or dimensions are performed by Parser 148 on a character by character basis as the characters are entered by the user. The visual representation presented to the user would thereby change dynamically with the users actions, so that the user is always presented with a current, character by character, representation of the users activities. In the present embodiment, however, these operations will be performed at descrete points determined by the operations being performed.

The dimensions of LSUs 1408a and 1408b would, in the preferred mode, also be determined dynamically and character by character as the characters of these units are entered by the user. The dimensions of LSUs 1408a and 1408b at the conclusion of the construction of LSUs 1408a and 1408b, as stored in the UNITDIMS 524 fields of the USs 136 of LSUs 1408a and 1408b, are represented in FIG. 14 by, respectively, Dimension Boxes (DIMS) 1442 and 1444.

The construction of LSUs 1408a and 1408b have again extended the dimensions of BU 1404 and the extended dimensions of BU 1404 are, in the preferred embodiment, again modified dynamically and character by character as the characters of LSUs 1408a and 1408b are entered by the user. At the conclusion of the construction of LSUs 1408a and 1408b, the extended dimensions of BU 1404 would be increased in the positive x direction to the right edges of DIMS 1442 and 1444 and in the negative y direction to the upper edge of DIMS 1442.

In the final series of steps, the subscript SubU 1410 is added to the construction. Parser 148 responds to the Subscript operator entered by the user by initiating a new unit for SubU 1410, writing an appropriate pointer into the SUBSCRIPTUNIT 552 field of BU 1404's US 1136. Parser 148 then determines the STARTLOC and local baseline of SubU 1410 to be located at START-LOC 1446 and LBL 1448, as indicated in FIG. 14, and enters the x and y coordinates of STARTLOC 1446 into the STARTLOC 522 of SubU 1410's US 136.

It should be noted that, being a subscript, the x coordinate of SubU 1446's STARTLOC is located in the x dimension in line with the right edge of BU 1404's DIMS 1422, that is, the rightmost edge of BU 1404. The y coordinate of SubU 1410's STARTLOC is determined, as previously described, by the current character size and resize information and in relationship to BL 1414, that is, the lower edge of BU 1404's DIMS 1422, so that the upper edge of SubU 1410's dimension box for the current character size will not intrude into another unit's area.

The user then enters the characters to appear on LBL 1448 and terminates SubU 1410 with a pseudoreturn at the end of the characters. It should be noted that Parser 148 is again dynamically responsive to the character by character entries of the user and will display the characters and extend the dimensions of SubU 1410 as required as each character is entered, including relocating STARTLOC 1446 as required by character size changes. At the conclusion of the construction of SubU 1410, the dimensions of SubU 1410 as stored in SubU 1410's UNITDIMS 524 fields are as represented in FIG. 14 by Unit Dimension Box (DIMS) 1450.

The addition of SubU 1410 to the construction has again extended the dimensions of BU 1404 and the extended dimensions of BU 1404 are again modified dynamically and character by character as the characters of SubU 1410 are entered by the user. At the conclusion of the construction of SubU 1410, the extended dimensions of BU 1404 would be extended in the positive y direction to the lower edge of DIMS 1450. The x dimension of Bu 1404's extended dimensions would not be increased unless DIMS 1450 were to extend further to the right than did DIMS 1442 and 1444. At this time, the extended dimensions of BU 1404 as stored in the EXTENDEDDIMS 526 field of BU 1404's US 136 would be as represented by XDIMS 1430 in FIG. 14.

This completes the description of the construction of a portion of a line containing exemplary units. The following will next describe certain aspects of the operation of the editor with respect to lines.

F.4 THE CONSTRUCTION OF LINES (FIG. 15)

As described above and in previous descriptions, the individual units which comprise a line of text are individually located on a page through the unit start location, dimension and extended dimension information stored in the STARTLOC 522, UNITDIMS 524 and EXTENDEDDIMS 526 fields of the unit's USs 136. Each line is in itself located on a page and the dimensions of the line, that is, the total extents of all units of the line, identified through the fields of a Line Data Structure (LDS) 162 associated with the line. The LDS 162 of a line also contains, as also previously described, pointers to the first US 136 of the line and to the first data element of the line in EU 128, an identification of the current font, font resize information, italic information and a pointer to a format line for the line.

The pointers to the LDSs 162 for all lines on a page are contained, in turn, in an ordered array in the LINE DATA POINTERS 839 fields of SSS 160 and an offset to the LDS 162 of the current line is stored in SSS 160's CURRENT LINE INDEX 840 field.

Figure 15:
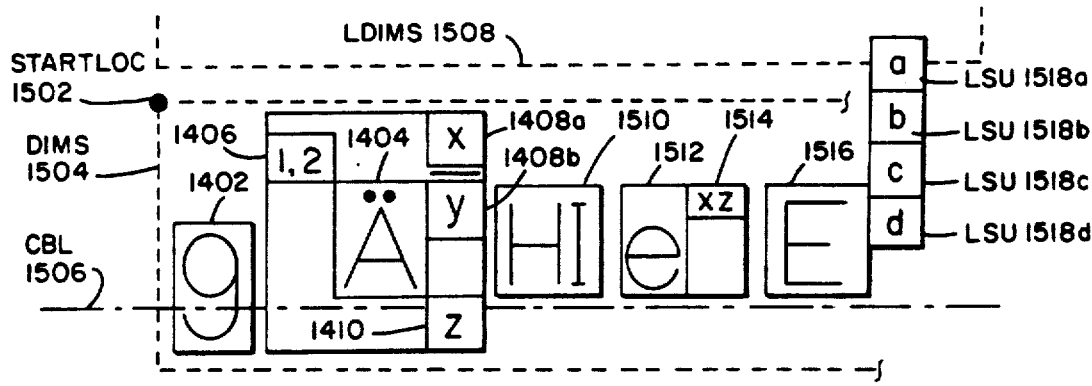
FIG. 15 is an illustration of the construction of lines.

The relationship between a line's starting location and dimensions and the units comprising the line and between the starting locations and dimensions of adjacent lines is illustrated herein with the aid of FIG. 15. In FIG. 15 therein is represented a current line with Line Starting Location (LSTARTLOC) 1502 and Line Dimensions Box (LDIMS) 1504 representing the values stored in the START LOCATION 906 fields and LINE DIMENSIONS 908 fields of the line's LDS 162. The baseline for the current line is represented in FIG. 15 by Line Baseline (LIBL) 1506. Also represented in FIG. 15 is the lower edge of the Line Dimensions Box (LDIMS) 1508 of the next preceding line above the present line.

Represented within the LDIMS 1504 of the present line are the units presently comprising the line with their dimension and extended dimension boxes represented with solid lines. As indicated, these units include Unit 1402, BU 1404, PSupU 1406, LSUs 1408a and 1408b, the superscript unit serving as a base for LSUs 1408a and 1408b, and SubU 1410 from the previous example. To these units have been added a Unit 1510, a Unit 1512 with associated Superscript Unit (SupU) 1514, and a Unit 1516 with an associated linesplit in the superscript position, the linesplit being comprised of Linesplit Units (LSUs) 1518a, 1518b, 1518c and 1518d and a superscript unit serving as a base for LSUss 1518a, 1518b, 1518c and 1518d.

As previously described, the dimensions of a line are defined by a rectangular line dimension box whose dimensions are such as to enclose all of the units comprising the line, that is, all of the dimension boxes of the individual units, as illustrated in FIG. 14. The starting location of the line is in turn defined as the origin, relative to page absolute, from which the line's dimensions are measured.

It is apparent from the above description of the construction of units, as illustrated in FIG. 14, that the dimensions of a line will change as the units of the line are constructed and may change, character by character, as the characters of the units are entered by the user. It is also apparent, as again illustrated in the above description of the construction of units, that the units of one line must not intrude into the units of preceding lines, that is, within the area defined by the starting location and dimensions of the preceding line.

The starting location and axis of the dimensions of a new line are therefore determined at the initiation of that line by the location and dimensions of the preceding line in such a manner that the units of the new line do not intrude into the area defined by the dimensions of the preceding line. That is, the starting location of the new line is fixed in a position adjacent to the area enclosed by the dimensions of the preceding line and at a distance apart from that area as defined by the interline spacing defined in SSS 160's INTERLINE SPACING 887 field. As described, the starting location is the origin from which the line dimensions are measured and the starting location and dimensional axes are fixed such that the dimensions of the new line will expand parallel to and away from the area enclosed by the dimensions of the preceding line. A further restriction upon the location and orientation of the starting location and dimensional axes is that they must be determined so that the baseline of the new line extends in the direction required by the particular text.

Referring to the example shown in FIG. 15, as described the present examples follow the English language convention that each line is written from left to right and successive lines entered from top to bottom. As also described, the dimensional extent of the line preceding the current line is represented by dimensional box LDIMS 1508 and the starting location of the current line by LSTARTLOC 1502. That is, LSTARTLOC 1502 is located adjacent and directly below the lower left corner of the preceding line area and spaced apart from the preceding line area in the y direction by the interline spacing. The x dimension axis is selected to that the current line will expand along its baseline to the right and parallel to the baseline of the preceding line and the y axis is selected so that the expansion in height of the current line is downwards and away from the preceding line. If the present text were one in which the lines were written from right to left, LSTARTLOC 1502 would be located below the lower right hand corner of the preceding line area and the x axis would run from right to left. In further example, if the text were such that the lines ran from top to bottom and successive lines were entered from right to left, the preceding line area would appear to the right of the current line area with its baseline running vertically from top to bottom. LSTARTLOC 1502 would be located at the top of the page and to the left of the preceding line area by the interline spacing while the dimensional axes would be selected so that the current line baseline would run downwards from the top of the page and the line would expand in "height" to the left.

In the present example, and referring to FIG. 15, the user has ended editing of the preceding line and is presently entering or editing the current line. When the user concluded editing of the preceding line, the current line and the first unit of the current line, that is, Unit 1402, were initiated by the editor. As described above, LSTARTLOC 1502 determined to be in the location illustrated in FIG. 15 and, at this point, the dimensions of the current line and of Unit 1402 would be those of the Append Blob because no characters or symbols have yet been entered.

The user would then enter the characters of Unit 1402, that is, the character "g", as previously described with reference to FIG. 14. At this point the dimensions of Unit 1402 would be as described in the above description of the construction of units. The dimensions of the current line would, at this point, no longer be those of the Append Blob only as the line now contains a unit having one or more characters in addition to the Append Blob. The dimensions of the current line would, in fact, be those of Unit 1402, with the Append Blob, since this is the only unit in the current line at this point. The x dimension of the line would extend to the right to the right edge of Unit 1402 and that the y dimension of the line would extend downwards from LSTARTLOC 1502 by the y dimension of Unit 1402. Unit 1402 would be located on the page, that is, within the line, with the top edge of Unit 1402 coincident with LSTARTLOC 1502, that is, vertically raised with respect to its position as shown in FIG. 15. LIBL 1506 would, at this point, be corresponding located coincident with the baseline of Unit 1402 in this raised position.

The user would continue entering the characters of the text as previously described with reference to FIG. 14 and descriptions of the contruction of units. As described previously, the character "A" with associated diacritics which follows the "g" in the text will not, at this point, result in the initiation of BU 1404 and the "A" with diacritics will initially go into UNIT 1402. As described, BU 1404 will be initiated and the "A" with diacritics placed in BU 1404 when the addition of PSupU 1406 requires the presence of BU 1404 as a base unit separate from UNIT 1402. It should be noted, however, that for purposes of clarity of discussion FIG. 15 is shown with the "A" and diacritics in BU 1404 and with the script units associated with BU 1404 constructed therefrom.

As shown, the character "A" with a attached diacritics is greater in the y dimension than is the character "g" of Unit 1402, so that the dimensions of the current line must be extended in both the x and y dimensions. The line's dimension in the x direction would be extended to the right edge of BU 1404, or what will be BU 1404, and in the y direction so that the y dimension of the line is that of BU 1404, or what will be BU 1404. At this point, the characters which will comprise BU 1404 will be located on the page such that the upper edge of what will be BU 1404's dimension box is located in the y dimension even with LSTARTLOC 1502.

As described, LIBL 1506 is the baseline of the current line and of both Unit 1402 and the character of what will be BU 1404. The editor will therefore move LIBL 1506 downwards in the y direction to be even with the baseline, that is, the bottom edge, of what will be BU 1404's dimension box, and will move Unit 1402 downwards by the same amount so that the baseline of Unit 1402 remains on LIBL 1506.

The user will then initiate and enter PsupU 1406 in the manner described above with reference to FIG. 14. This step will result in the initiation of BU 1404, to contain the character "A" with associated diacritics and to serve as the base unit for the script units associated therewith, and in the shift of BU 1404 to the right in the x direction. The addition of PSupU 1406 will again result in extensions to both the x and y dimensions of the line. The x dimension of the line will be extended to the right to the new location of the right edge of BU 1404 on the page and the y dimension of the line will be extended downwards to equal the total y dimension of the combination of BU 1404 and PSupU 1406. The addition of PSupU 1406 to the line will again require that the units already existing in the line, that is, Unit 1402 and BU 1404 together with LIBL 1506, be moved downwards in the y dimension, specifically so that the top edge of PSupU 1406's dimension box will be located in the y dimension even with LSTARTLOC 1502.

In the next step, again as described above with reference to FIG. 14, the user will add LSUs 1408a and 1408b to the line construction, together with the superscript unit which serves as a base unit for LSUs 1408a and 1408b. Again, this addition will require an extension of the line's dimensions in both the x and y directions. Also again, the addition of LSUs 1408a and 1408b will require that the units already present in the line construction be moved downwards so that the top edge of LSU 1408a's dimension box is located in the y dimension even with LSTARTLOC 1502.

At this point, Unit 1402, BU 1404, PSupU 1406, LSUs 1408a and 1408b, the script base unit for LSUs 1408a and 1408b, and LIBL 1506 will be in the locations in the x and y dimensions that are shown in FIG. 15. The line x dimension will extend to the right edges of LSUs 1408a and 1408b and the line y dimension will extend to the lower edge of Unit 1402.

In the next step, wherein SubU 1410 is added to the construction, there will be no extension of the line's dimensions. As described above with reference to FIG. 14, the dimension box of SubU 1410 is encompassed within the extended dimensions of the already existing units and therefore within the existing dimensions of the line.

The subsequent additions of Units 1510, 1512, 1514 and 1516 will require that the line's dimensions be extended in the x direction, but will require no extension of the line's y dimension. The line's dimensions at this point are as indicated by LDIMS 1508.

In the next step, the user is to add a four line linesplit in the superscript position to Unit 1516. As indicated in FIG. 15, this linesplit is comprised of LSUs 1518a, 1518b, 1518c and 1518d and requires a script unit in the superscript position with respect to Unit 1516 to serve as a base unit for LSUs 1518a, 1518b, 1518c and 1518d. As indicated in FIG. 15, LSUs 1518a and 1518b would again extend above the upper edge of the line's dimension box, with LSU 1518a extending into the area of the dimension box of the preceding line. Again, this addition will require that LIBL 1506 the existing units of the line be moved downwards in the y direction in the manner as described above, and a corresponding extension to the line's dimensions.

The above operations will continue until either the user terminates the line or the editor indicates that the user has reached the end of the line. This occurrence, that is, the end of the line, is detected by the editor, which compares the present line dimensions, as each character is entered into the line, with the maximum allowed dimensions of the line as determined by the format line identified by the FORMAT LINE POINTER 918 field in the line's LDS 162.

Due to the particular characteristics of the text with which the present editor is intended to operate, and in particular scientific text, the editor indicates to the user when the end of the present line is reached rather than "word-wrapping" the continuing text onto the next line. This allows the user to select the point in the text at which the line is to be terminated. In alternate embodiments, an automatic "word-wrap" may be implemented, or the ability to select or deactivate an automatic "word-wrap" may be provided.

Finally, it should be noted that a user may return to a preceding line and perform further editing operations in that line. If these operations should result in a change in the y dimension of that line, the editor will redetermine the locations of the LSTARTLOCs of all following lines and the locations of all units in those lines.

F.5 INSERT AND HIDE OPERATIONS (FIGS. 16A, 16B AND 16C)

Figure 16A:
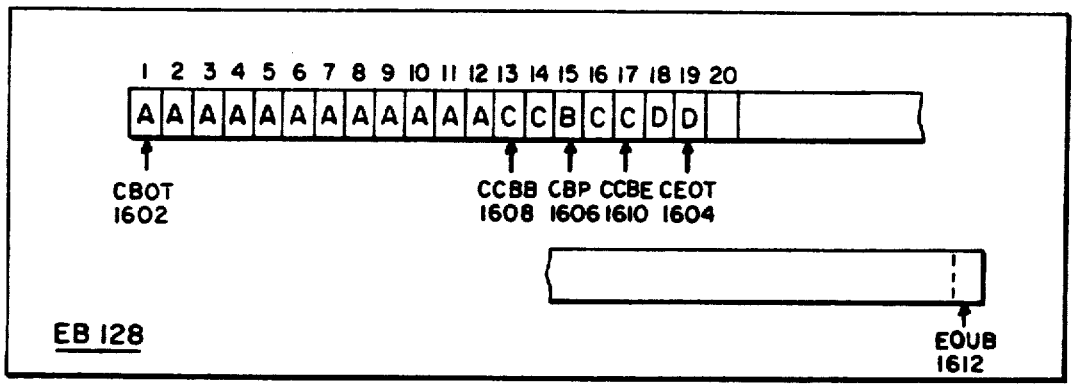
FIGS. 16A, 16B and 16C illustrate the insert, hide, copy and move operations of the present editor.
Figure 16B:
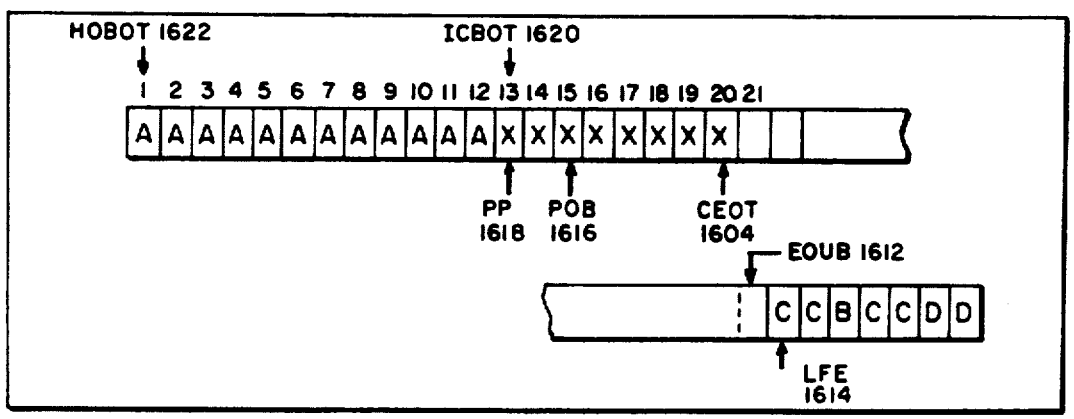
Figure 16C:
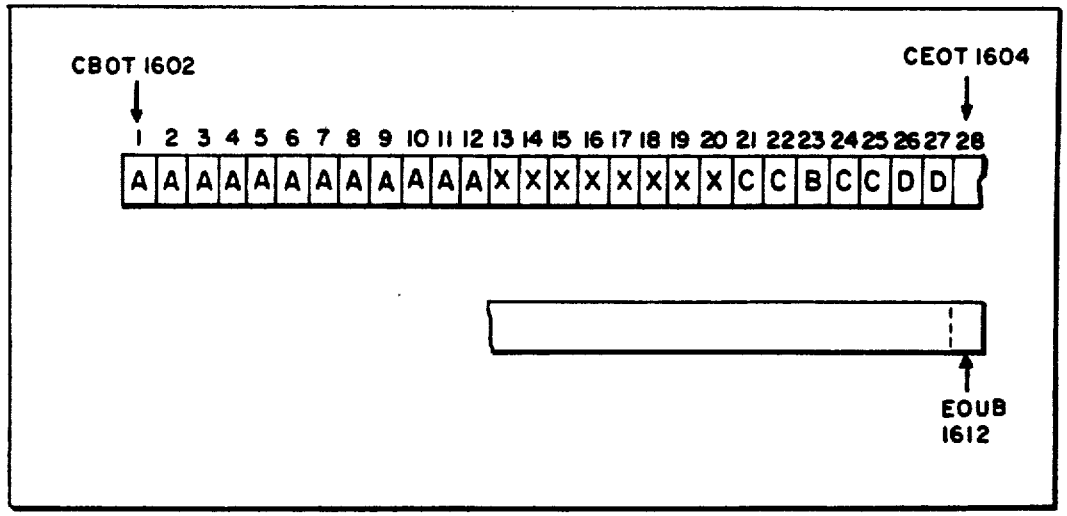

As a final illustration of the operations of the present text editor, the following will, with the aid of FIGS. 16A, 16B and 16C, describe the operation of the editor in executing insert and hide operations and the related copy and move operations.

Referring to FIG. 16A, therein is presented a diagrammic representation of EB 128 at the start of an insert or hide operation. The string of character/symbol, operator, parameter and terminator codes comprising the text of the present document are represented therein as a string of boxes representing code word memory locations with codes stored therein. For purposes of reference in the following descriptions, the codes in the word locations are represented by alphabetic characters, such as "A", "B", "C", "D", and "X" and certain of the word locations are numbered above their representations, for example, as locations "1", "2", "3" and so on.

As previously described, SSS 160 contains a Current Beginning Of Text Offset (CBOT) 1602 stored in the CURRENT BEGINNING OF TEXT 855 field and pointing to the first code of the text in EB 128 and a Current End Of Text Offset (CEOT) 1604 stored in the CURRENT END OF TEXT 856 field and pointing to the last code of the text in EB 128, at location 19, thereby delimiting the current accessable text in EB 128. The character presently indicated by the cursor is indicated by a Current Buffer Offset (CBO) 1606 stored in the CURRENT BUFFER POSITION 852 field. The first code related to the character currently indicated by the cursor is indicated by a Current Character Buffer Beginning Offset (CCBB) 1608 stored in the CURRENT CHARACTER BUFFER BEGINNING 853 field and the last code related to the character currently indicated by the cursor is indicated by a Current Character Buffer End Offset (CCBE) 1610 stored in the CURRENT CHARACTER BUFFER END 854 field. The end of the unused space in EB 128 is indicated by a End Of Usable Buffer Offset (EOUB) 1612 stored in the END OF UNUSED BUFFER 857 field.

As previously described, the editor maintains certain data structures used in insert and hide operations. In particular, each time an insert or hide operation is initiated the editor initiates a corresponding IHDA 166 in the array of Insert Structures of the INSERT POINT STRUCTURES 872 fields and the information in a INSERT LEVEL 871 field is increased by one level.

F.5.a The Insert Operation

For the purposes of the present descriptions, it is assumed that the user wishes to insert further text at the position in the text presently indicated by the cursor. In order to perform an insert operation or, as described below, a hide operation, it is necessary to preserve the data associated with and following the point of insert so that this data may be placed back into the text string after the new text has been inserted. In the present editor, this data to be saved is stored at the end of the EB 128 space during the insert or hide operation.

Referring to FIG. 16A, the words preceding the words which will be involved in the insert operation are designated by the characters "A" and occupy EB 128 locations 1 to 12. The character at the point of the insert operation, that is, the character presently pointed to by the cursor and by CBP 1606, is indicated by the character "B" and occupies EB 128 location 15. The words related to or associated with that character are indicated by the characters "C" and occupy EB 128 locations 13, 14, 16 and 17. The words following the point of insert, but not directly associated with the character "B" at the point of insert, are indicated by the characters "D" and occupy EB 128 locations 18 and 19.

When the user initiates the insert operation, the editor, as described above, initializes a corresponding IHDA 166 and writes the corresponding information into an INSERT POINT STRUCTURES 872 and INSERT LEVEL 871 fields.

As indicated in FIG. 16B, the editor then copies the string of text words associated with and following the point of insert, that is, those words designated by the characters "B", "C" and "D" and originally occupying EB 128 locations 13 to 19, to the end of the EB 128 space. The editor writes a Location From End Pointer (LFE) 1614 into the LOCATION FROM END 1002 field of the IHDA 166. LFE 1614 points to the new location in the end of EB 128 of the first word of the string of words copied thereto to be saved, that is, to the word designated by "C" and previously occupying EB 128 location 13. The editor also updates EOUB 1612 at this time to point to the new end of usable EB 128 space. In this case, EOUB 1612 now points to the EB 128 space or location just before that pointed to by LFE 1614.

The editor also writes a Position of Break Pointer (POB) 1616 into the IHDA 166's POSITION OF BREAK 1104 field and a Preservation Pointer (PP) 1618 into the IHDA 166's PRESERVATION POINTER 1106 field. The POB 1616 points to the location in EB 128 at which the insert was initiated, that is, the location originally indicated by CBP 1606 and the cursor and designated as EB 128 location 15 in FIGS. 16A and 16B. The PP 1618 points to the original location in EB 128 of the first word associated with the character at the point of the insert, that is, the EB 128 location designated as location 13 and which was indicated by CCBB 1608. POB 1616 and PP 1618 allow the "stacking" or "nesting" of insert and hide operations, that is, they allow, together with the array of IHDA 166 pointers stored in the array of INSERT POINT STRUCTURES 872 fields, the execution of insert and hide operations within insert and hide operations. POB 1616 and PP 1618 also allow, in further example, the restoration of the original text if the insert or hide operation is cancelled. PP 1618 is further used, for example, to save and restore the attributes associated with the character originally at the point of insert.

At this time the editor also fills in the remaining fields of the IHDA 166, which were previously described with reference to FIG. 11.

At this point it should be noted that the operation of the editor differs between the execution of an insert and the execution of a hide operation, which is described further below. In an insert operation, text is inserted into EB 128 at the point after the insert break, that is, the "editable text" resides in the EB 128 locations following the insert break.

As previously described, the location of the beginning of editable text in EB 128 is indicated by the Current Beginning Of Text Offset stored in the CURRENT BEGINNING OF TEXT 855 field and is generally indicated by the appearance of an Append Blob at that point in the text. The editor accordingly updates the CBOT 1602 previously stored in the CURRENT BEGINNING OF TEXT 855 field to contain an offset to the beginning of editable text for the insert operation. The new beginning of editable text offset is indicated in FIG. 16B as Insert Current Beginning Of Text Offset (ICBOT) 1620 and this offset is written in the CURRENT BEGINNING OF TEXT 855 field. The designation ICBOT 1602 is used, for clarity of presentation in the present description, to designate the new value of CBOT 1602 which is stored in the CURRENT BEGINNING OF TEXT 855 field at this point in the operation to indicate the new beginning of editable text in EB 128, that is, the point at which text is to be inserted into EB 128. In the case of the present insert example, this point is at EB 128 location 13, that is, the word location previously occupied by the first word of the string that was moved to the end of EB 128.

It should be noted that the editor also updates the Current End Of Text Offset (CEOT) 1604, which points to the last used EB 128 location, that is, to the location just before the next location which is available to receive text, to point to the EB 128 location just before the location where the new text is to begin to be inserted. In the present example of an insert operation, the new CEOT 1604 for the insert operation will initially point to EB 128 location 12, that is, to the EB 128 location just before the first available location in EB 128 for the text to be inserted.

The user then enters the new insert text, as is indicated in FIG. 16B by the characters "X" in EB 128 locations 13 through 20. It should be noted that CEOT 1604 is continually updated as the words of the inserted text are entered by the user, so that CEOT 1604 successively points to various EB 128 locations 12 to 20 as the words are entered. It should be noted that some positions may not appear as values in CEOT 1604 as a result of adding operator pairs or operator parameter sets.

At the conclusion of the insert, the text string which was moved to the end of EB 128 to make room for the inserted text must be "reattached" to the end of the string existing at the conclusion of the insert. That is, the saved string must be joined to the text string at the end of the inserted text.

This effect of this operation is illustrated in FIG. 16C. In this step, the editor determines the next location after the inserted text through CEOT 1604. The editor copies the previously saved string from the end of EB 128 so that the first character of the saved string, which is located by LFE 1614, is written into the next location after the location indicated by CEOT 1604 with the remainder of the saved string being written in order into the following locations in EB 128. As indicated in FIG. 16C, the saved string will now appear in EB 128 locations 21 to 27 and in the same order in which they originally appeared in locations 13 to 19.

Finally, the editor will again update CBOT 1602, CEOT 1604 and EOUB 1612 to the locations indicated in FIG. 16C, that is, and respectively, to the first word of the string, to the last word location at the end of the string, and to the last word location in EB 128.

Having described an insert operation, the hide operation will be described next below.

F.5.b The Hide Operation (FIG. 16B)

Considering first the purposes of the hide operation, it is apparent from the above descriptions of the editor that the editor data structures, as are many data structures, is essentially sequential. That is, the location and even the characteristics of data at any point in the structure depends upon the data preceding that point. It is further apparent that any operation upon preceding data will effect the following data, as has been illustrated above with the descriptions of unit and line construction and the insert operation.

There are also many operations which may be performed upon the data in a data structure which do not immediately and directly effect following data. The insert operation described above is an example of such an operation. It is therefore advantageous in such operations to, in effect, "hide" the following data from the immediate operation and to perform any necessary consequential operations upon the following data only after the immediate operation on the preceding data has been completed.

This is the intent and purpose of the hide operation, that is, it allows a portion of the text structure to be defined as an area wherein editing operations are to be performed and the text structures following this area to be "hidden" from the effects of the editing operations until the operations are completed. It should be noted, in this regard, that this method of operating upon a data structure is generally advantageous whenever operation are performed upon data in a data structure wherein the structure or characteristics of the following data is dependent upon the preceding data.

As previously described, the IHDAs 166 of the present editor, together with the array of IHDAs 166 stored in the INSERT LEVEL 871 and INSERT POINT POINTERS 872 fields of SSS 160, provide a mechanism for "nesting" or "stacking" insert operations. That is, a user may begin an insert operation, moving the saved string to the end of EB 128 as described above and creating an IHDA 166 containing all necessary information regarding the string and insert. The user may then initiate another insert in the text being inserted before the first insert is completed, again moving a string to be saved to the current end of EB 128 and creating a new IHDA 166, and so on for as many levels of insert as required.

As described below, the hide operation implemented in the present editor is a modified form of nested insert.

Referring again to FIG. 16C, and the above descriptions regarding FIG. 16C, it was described that the editor moved the string of text after the insert point to the end of EB 128 and generated a ICBOT 1620 to indicate that the present beginning of editable text was now at the insert break point. The insert text would then be inserted into EB 128 at and following the point indicated by ICBOT 1620.

It should be noted at this point in the description that the text string which was moved to the end of EB 128 is, in certain aspects, "hidden" from both the editing operations of the editor and the user. That is, the editor will perform no operations upon this "hidden" text except to rejoin the "hidden" text string with the editable portion of the text when the insert is completed.

A hide operation begins in the same manner as an insert operation except that, rather than indicating the point where an insert break is to occur, the location in the text indicated by the present cursor position delimits a portion of the text to be "hidden", that is, that the portion of text following that point is to be "hidden" from the operations of the editor. This also defines the portion of the text before the break point, that is, the portion of the text between the start of text and the break point, as being the portion of text accessible to the editor wherein editing operations may be executed.

As previously described in the insert operation, the editor "moves" the portion of the text string following the cursor or break location to the "hidden" area at the end of EB 128. Rather than then moving CBOT 1602 to the break point as an ICBOT 1620, however, as previously described in the insert operation, the editor leaves the Current Beginning Of Text Pointer at the start of the text string before the break point or moves it only so far as required to permit only legal operations occurring, that is, at the previous beginning of editable text point. In the present implementation, this point may be the start of the local baseline if the editor is operating on any baseline other than the current baseline for the line.

This operation is indicated in FIG. 16B, for clarity of presentation, as a Hide Current Beginning Of Text Offset (HCBOT) 1622. It should be remembered that the designations HCBOT 1622 and ICBOT 1620, from the description of the insert operation, are merely alternate designations for CBOT 1602 and are used only for clarity of presentation in illustrating the operation of CBOT 1602 in the insert and hide operations, respectively. The current beginning of text is, in fact, always indicated by the offset value stored in CURRENT BEGINNING OF TEXT 856 field and the three designations of this value used in the descriptions presented herein, that is, CBOT, ICBOT and HCBOT, are used as names to illustrate the changing value of this offset during the insert and hide operations.

As previously described, the current beginning of text offset points to the beginning of editable text, that is, to the text which is made accessible to the editor for editing operations. In effect, the current beginning of text offset grants access to portions of text to the editor by indicating to the editor the location of the start of the text to which it is to have access. In the hide operation, therefore, the editor is granted access to some of the portion of text between the start of the text string and the point at which the hide break was inserted. The editor may move freely to any point in this portion of the text string, as previously described in the descriptions of cursor movement, and may perform any desired editing operation in this area, including insert, further hide operations, and copy, move and delete operations.

At the conclusion of the hide operation, the text string which was moved and hidden at the end of EB 128 is returned to the end of the editable text string, as previously illustrated in FIG. 16C. Any operations that are necessary as a consequence of the operations performed upon the editable portion of the text during the hide operation are performed upon the previously hidden portion of the text at this time, such as relocation of the text in a line or on a page.

Finally, the above mechanisms may be used to also perform copy, move and delete operations with the additional aid of pointers, that is, offsets into EB 128, to delimit the portions of text to be copied, moved or deleted. These additional offsets are provided through the SSS 160 BEGIN DELIMIT 873, END DELIMIT 874, BEGIN DELIMIT END POSITION 875 and END DELIMIT END POSITION 876 fields previously described. These fields operate in conjunction with the cursor, in the manner previously described with reference to the CURRENT BUFFER POSITION 852, CURRENT CHARACTER BUFFER BEGINNING 853 and CURRENT CHARACTER BUFFER END 854 fields, to allow the user to identify and delimit portions of the text string to the editor.

In the case of a copy operation, for example, the user would delimit the portion of the text string to be copied and the limits of the text string would be noted by the editor. The user would then indicate the point where the copied portion of text string is to be inserted. The editor would then execute the insert operation by reading the delimited portion of text string and inserting a copy of the delimited portion of the text at the insert break point in the manner described above.

It must be noted that there the section of the text string which has been delimited for the copy operation may include structural or environmental operators. There also may be operators, in particular environmental operators, which are not included in the delimited section of the text string and which effect the characters and symbols in the delimited section. As previously described, many of these operators occur as related pairs of codes in the text string, that is, a first code initiating a structural feature or defining an attribute will be followed by another code terminating or changing the effect of the first code. For example, a bar start operator will be followed, at a later point in the text string, by a bar terminator operator and a resize operator will be followed by another resize operator which counteracts or modifies the effect of the first resize operator.

It is apparent that an operation upon a section of text, such as a copy or move, may result in undesirable effects upon the text string. For example, a section of the text string which is copied to another point in the text string may include a bar or italic start operator but may not include the corresponding bar or italic end operator. The appearance of the bar or italic start operator in the copied section of text will result in the bar or italic operator being applied to the portion of the text string following the insert point, rather than to just the copied section of the text.

When performing a copy operation, therefore, the editor must read the EB 128 text string in order to determine the structural operators and attributes that currently apply to the characters and symbols in the delimited portion of the text string. The editor must then similarly determine the operators and attributes which apply at the insert point and concatenate the two sets of operators and attributes in the copied portion of the text string. This concatenation must operate so that the copied portion of text has, at the end of the copy operation, the same properties as the originally delimited portion of the text string. In addition, the concatenation must operate so that no new properties or attributes are inadvertently applied to the portion of the text string which follows the copied portion of the text.

To illustrate by means of an example, assume that a resize factor of $-1$ applies to the delimited portion of the text string to be copied. If the text string at the insert point also has a resize factor of $-1$, then the editor will simply copy the characters and symbols of the delimited portion of text into the string at the insert point. If, however, a resize factor of $+1$ applied at the point of insert, the editor will concatenate the $-1$ resize factor with the $+1$ resize factor and will insert a resize factor of $-2$ at the start of the copied portion of text and a corresponding resize factor of $+2$ at the end of the copied portion of text. If, in further example, a resize factor of $-2$ applied at the point of insert, the editor would insert resize factors of $+1$ and $-1$ at, respectively, the beginning and end of the copied portion of text. In each case, therefore, the portion of text which had been copied would retain its original environmental operator, that is, a resize factor of $-1$.

It should be further noted that the concantentation must preserve the factors applying to the characters and symbols around the point at which the copied text is being inserted. For example, if the insert is occurring between two characters which are operated upon by a resize factor which appears before the first character, as would most often be the case, the leading resize factor may not be modified without effecting the character just before the insert point. In this case, the concantentation must preserve the leading resize factor, although it may effect a resize factor following the character after the point of insert.

In further example, if the copied portion of the text string contains a bar or italic start operator, or a bar or italic end operator, the editor must insert, respectively, a bar or italic end or start operator into the copied portion of the text in the required positions in the copied portion of the text string. These inserted operators then limit the area of effect of the operators originally appearing in the copied portion of the text string to only the copied portion of the text string.

Finally, the editor must generate new USs 136 to correspond with the copied portion of the EB 128 text string, as previously described, with appropriate EBP 140 pointers into the copied portions of the text string in EB 128. In this process, the editor must also link the new USs 136 with the already existing USs 136 through their USP 138 pointers, as previously described, modifying the USP 138 pointers of the previously existing USs 136 where necessary.

Next considering the delete operation, the CURRENT BUFFER POSITION 852, CURRENT CHARACTER BUFFER BEGINNING 853 and CURRENT CHARACTER BUFFER END 854 fields again allow the user to identify and delimit portions of the text string to be operated upon. In this case, the delimited portion of the text string is to be deleted and any portions of the original EB 128 text string which follows the deleted portion are to be moved forward in EB 128 to join the portion of the portion text string preceding the deleted portion.

Again, and as described above, there may be structural or environmental operators applying to a portion of a text string which has been delimited to be deleted. When performing a delete operation, therefore, the editor must, as in the copy operation, determine and concantenate or cancel the structural and environmental operators which occur in are apply to the delimited portion of the EB 128 text string so as to avoid inadvertent effects upon the undeleted portions of the text string.

In a delete operation, the editor makes a first "pass" through the delimited section of the LEB 128 text string, reading all character and symbol codes and all operator codes. In this first pass, all character and symbol codes in the delimited section of the EB 128 text string are replaced with "deleted text flag" codes. The "deleted text flag" codes now residing in each EB 128 location originally containing a character or symbol code indicate that the character and symbols codes originally residing in those EB 128 locations are deleted and that the locations are free for other use.

Also in the first "pass", the editor notes each operator codes code appearing in the delimited section of the EB 128 text string, and the location of each such operator code. The editor then concantenates the identified operator codes in a manner similar to that described above with reference to the copy operation, so that the effects of the operator codes which reside in the delimited section of text and which have effects outside of the delimited section of text are preserved. The editor may concantenate such operator codes by retaining codes, by deleting pairs of codes which have mutually cancelling effects, or by combining similar operator codes into single, equivalent codes.

For example, if the delimited section includes a bar or italic start or end operator, but not the corresponding end or start operator, the editor will retain the included operator, that is, the editor will not replace that operator code with a "deleted text flag" code. Likewis, if the delimited section of text includes, for example, a single resize operator, that operator will be retained. If the delimited section of text includes, for example, both a start bar or start italic operator and the corresponding end bar or end italic operator, in the proper pairing sequence, the editor will delete both such operator codes by replacing the codes with "deleted text flag" codes. In further example, if the delimited section of the EB 128 text string includes two or more resize operators of a common type, for example, resize around center or resize on baseline, the editor will combine the included resize operators of that type into a single resize operator of that type which has the total effect of all the included resize operators of that type.

As previously described, the sequence of appearance of operator codes in the EB 128 text string are significant in determining the effects of the operators. Having concantenated, retained or deleted the original operator codes as necessary, the editor then reorders the resulting operator codes into the necessary final sequence to give the desired properties and attributes.

Finally, the editor makes a second "pass" through the delimited section of the EB 128 test string. In the first part of this second "pass", the editor writes the sequence of operator codes resulting from the steps described above into the first available locations in the delimited section of EB 128 in the necessary order, incrementing the previously described offsets into EB 128 as necessary as each code is written into EB 128.

In the final part of the second "pass", the editor reads the character/symbol and operator codes of the portion of the original EB 128 text string which followed the delimited section, in order, and writes these codes, again in order, into the EB 128 locations following the concantenated operator codes remaining from the deleted section of the text string. This final part of the second "pass" effectively "moves" the portion of the EB 128 text string which followed the deleted portion of the text string forwards in EB 128 to join with the portion of the text string which preceded the deleted portion of the string, with the concantenated operator codes from the deleted section of the string appearing between the two uneffected portions of the string.

Again, the editor will conclude the delete operation by modification or reconstrution of the USs 136 as required to reflect the final construction of the text as it appears in the character/symbol and operator codes of EB 128, as previously described.

Finally, it will be apparent to those of skill in the art how the above described operations may be used to perform yet other text editing operations. For example, a move operation, that is, a move of a section of text from one place in the EB 128 text string to another, may be performed by a copy operation to copy the delimited section of text to the new location, followed by a delete operation to delete the delimited original section of the text which was copied.

The above completes the description of a presently preferred embodiment of the present invention. It should be noted that the invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In an information processing system including a keyboard, a display device, and an editing means, coupled to said keyboard and said display device, for editing both multidirectional and multidimensional text, the editing means comprising:
    memory means storing instructions for editing text, said text including said multidirectional and multidimensional text;
    input receiving means responsive to keystrokes from said keyboard representing text characters and editing commands for generating a string of codes defining a text;
    parser means responsive to said string of codes from the input receiving means and said instructions in said memory means for:
        reading the codes of the string and parsing the codes into encoded units, each of said encoded units being stored in said memory means as a data structure, each said encoded unit defining a different group of one or more characters and at least one of said encoder units defining a group of two or more characters that are positioned in an expression as a unit, said unit being delineated by predefined characters, and being comprised of codes which define the group, and
        generating for each said encoded unit a unit structure and storing said unit structure in said memory means, wherein each said unit structure is comprised of a data structure that contains information defining a visual representation of the corresponding encoded unit, said visual representation being such that said multidirectional text and said multidimensional text are represented for visual display; and
    display means for receiving and displaying said visual representation information from said memory means on said display device.

2. The text editing means of claim 1, wherein:
    the parser means is further responsive to operation of the input receiving means for
    reading unit structures and corresponding codes of the string and generating a visually displayable representation of the text.

3. The text editing means of claim 1, wherein the codes in the string of codes representing a text include:
    character codes representing the characters of the text, and
    operator codes defining properties of the text other than the characters from which it is constituted.

4. The text editing means of claim 3, wherein the operator codes comprise:
   prefix operators operating upon a following character, group of characters or unit or group of units,
   postfix operators operating upon a preceding character, group of characters or unit or group of units, and
   infix operators operating concurrently upon two characters, groups of characters or units or group of units.

5. The text editing means of claim 4, wherein an infix operator operates to define a relationship between the two characters, groups of characters or units or group of units operated upon by the operator.

6. The text editing means of claim 5, wherein an infix operator occurs in the string of codes between the two characters, groups of characters or units or group of units operated upon by the operator.

7. The text editing means of claim 3, wherein the operator codes comprise:
   structural operators defining organizational relationships between the units, and
   environmental operators defining attributes of the characters.

8. The text editing means of claim 7, wherein the structural operators comprise:
   unit operators defining spatial relationships between units of the text.

9. The text editing means of claim 8, wherein the structural operators comprise:
   initiating operators initiating corresponding units defined by the operators, and
   corresponding terminating operators terminating the units initiated by the initiating operators.

10. The text editing means of claim 7, wherein the structural operators comprise:
    associative operators defining an association between a character and another character such that the character becomes a part of the definition of the other character.

11. The text editing means of claim 10, wherein the associative operators include:
    diacritic operators which operate to signify a correspondence between a diacritic mark of the text characters with a base character of the text characters.

12. The text editing means of claim 7, wherein the environmental operators comprise:
    attribute switching operators which operate to turn on or turn off a corresponding attribute.

13. The text editing means of claim 7, wherein the environmental operators comprise:
    attribute modification operators which operate to modify a continuously existing attribute.

14. The text editing means of claim 3, wherein the operator codes comprise:
    script operator codes, wherein
      each script operator code defines a script unit of the encoded units located in a script position with respect to a base unit of the encoded units.

15. The text editing means of claim 14, wherein each script unit is defined as a unit having a baseline oriented with respect to the baseline of the base unit and offset from the baseline of the base unit by a selected distance and wherein the location of the script unit baseline relative to the base unit is determined by the script operator code.

16. The text editing means of claim 15, wherein the baseline of the script unit may be offset to either side of the baseline of the base unit.

17. The text editing means of claim 16, wherein the script is located in a position
    preceding the base unit,
    centered on a line passing vertically through the base unit, or following the base unit.

18. The text editing means of claim 15, wherein the script unit is located in a position
    preceding the base unit,
    centered on a line passing vertically through the base unit, or following the base unit.

19. The text editing means of claim 15, wherein the script operators include operators for a presuperscript, above script superscript, presubscript, below script and subscript locations.

20. The text editing means of claim 15, wherein the operator codes include:
    line split operator codes, wherein
      each line split operator code defines a group of N units wherein the group of N units are arranged along a line oriented at right angles to a baseline.

21. The text editing means of claim 20, wherein the group of N units are centered about the baseline.

22. The text editing means of claim 20, wherein the group of N units are centered about a line split starting location which is offset with respect to the baseline.

23. The text editing means of claim 22, wherein the baseline of the script unit may be offset to either side of the base unit.

24. The text editing means of claim 23, wherein the script unit is located in a position
    preceding the base unit,
    centered on a line passing vertically through the base unit, or following the base unit.

25. The text editing means of claim 22, wherein the script unit is located in a position
    preceding the base unit,
    centered on a line passing vertically through the base unit, or following the base unit.

26. The text editing means of claim 3, wherein certain ones of the operator codes include associated parameter codes further defining the operation to be performed.

27. The text editing means of claim 3, wherein certain ones of the operator codes are terminator codes which operate to terminate a preceding operator code.

28. The text editing means of claim 1, wherein each unit structure further comprises:
    structural identification fields containing information relating the unit structure to the group of codes in the text string comprising the encoded unit corresponding to the unit structure.

29. The text editing means of claim 28, wherein the unit structure further includes:
    structural flag fields containing information identifying a reason the present unit is separated from the parent or preceding unit.

30. The text editing means of claim 1, wherein each unit structure further comprises:
    structural pointers information fields containing information identifying other unit structures associated with the unit structure.

31. The text editing means of claim 1, wherein each unit structure further comprises:
    property identification fields containing information defining attributes which apply to the characters or symbols of the corresponding encoded unit.

32. The text editing means of claim 31, wherein the information residing in the property identification fields includes information describing the location and dimensions of the unit on a page.

33. The text editing means of claim 32, wherein the location and dimensional information residing in the property identification fields includes information identifying dimensions of all script, line split and bar units associated with the unit.

34. The text editing means of claim 1, wherein each unit structure further comprises:
   a location field containing information identifying the location of the corresponding encoded unit within a page of text that is currently being edited.

35. A computer implemented method performed by an editing means for editing and displaying text including both multidimensional and multidirectional text in an information processing system including a keyboard, a display device, and said editing means coupled to said keyboard and said display device, said editing means including memory means, input receiving means, parser means, and display means; said method comprising the steps of:
   a) receiving by said input receiving means a stream of said text as input from said keyboard, said text including said multidimensional and said multidirectional text;
   b) generating by said input receiving means a string of codes defining said text;
   c) reading the codes of the string and parsing said codes into encoded units by said parser means, each of said encoded units being stored in said memory means as a data structure, each said encoded unit defining a different group of one or more characters and at least one of said encoder units defining a group of two or more characters that are positioned in an expression as a unit, said unit being delineated by predefined characters, and being comprised of codes which define the group;
   d) generating by said parser means for each said encoded unit a unit structure and storing said unit structure in said memory means, wherein said unit structure is comprised of a data structure that contains information defining a visual representation of the corresponding encoded unit, said visual representation being such that said multidirectional and said multidimensional text are represented for visual display; and
   e) displaying by said display means on said display device said visual representation information from said memory means.

* * * * *